US008364715B2

(12) United States Patent
Schoknecht et al.

(10) Patent No.: US 8,364,715 B2
(45) Date of Patent: Jan. 29, 2013

(54) MANAGING CONSISTENT INTERFACES FOR AUTOMATIC IDENTIFICATION LABEL BUSINESS OBJECTS ACROSS HETEROGENEOUS SYSTEMS

(75) Inventors: Andreas Schoknecht, Linkenheim-Hochstetten (DE); Muhammad Alam, Sunnyvale, CA (US); Joachim Muenter, Bad Schoenborn (DE)

(73) Assignee: SAP AG, Walldorf (DE)

( * ) Notice: Subject to any disclaimer, the term of this patent is extended or adjusted under 35 U.S.C. 154(b) by 892 days.

(21) Appl. No.: 12/060,192

(22) Filed: Mar. 31, 2008

(65) Prior Publication Data

US 2009/0248431 A1 Oct. 1, 2009

(51) Int. Cl.
*G06F 7/00* (2006.01)
*G06F 17/30* (2006.01)

(52) U.S. Cl. ........ 707/791; 707/810; 705/323; 705/332; 705/348

(58) Field of Classification Search .................. 707/791, 707/796, 794, 810, 944; 709/203, 206; 705/26, 705/29, 37, 323, 332, 348
See application file for complete search history.

(56) References Cited

U.S. PATENT DOCUMENTS

| | | | | |
|---|---|---|---|---|
| 3,223,321 A | | 12/1965 | Baumgartner | |
| 5,126,936 A | | 6/1992 | Champion et al. | |
| 5,210,686 A | * | 5/1993 | Jernigan | 705/29 |
| 5,247,575 A | | 9/1993 | Sprague et al. | |
| 5,255,181 A | | 10/1993 | Chapman et al. | |
| 5,321,605 A | | 6/1994 | Chapman et al. | |
| 5,463,555 A | | 10/1995 | Ward et al. | |
| 5,787,237 A | | 7/1998 | Reilly | |
| 5,812,987 A | | 9/1998 | Luskin et al. | |
| 5,966,695 A | | 10/1999 | Melchione et al. | |
| 5,970,465 A | * | 10/1999 | Dietrich et al. | 705/7.22 |
| 5,970,475 A | | 10/1999 | Barnes et al. | |
| 5,983,284 A | | 11/1999 | Argade | |
| 6,047,264 A | | 4/2000 | Fisher et al. | |
| 6,073,137 A | | 6/2000 | Brown et al. | |
| 6,092,196 A | | 7/2000 | Reiche | |
| 6,104,393 A | | 8/2000 | Santos-Gomez | |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

N. Ilker Altintas, Mehmet Surav, Oguz Keskin and Semih Cetin—"Aurora Software Product Line", Cybersoft Information Technologies Co, 2005 (pp. 1-8).*

(Continued)

*Primary Examiner* — Anh Ly
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to an automatic identification label, an automatic identification label device, and/or an automatic identification label device observation business object.

3 Claims, 113 Drawing Sheets

U.S. PATENT DOCUMENTS

| | | | |
|---|---|---|---|
| 6,115,690 | A | 9/2000 | Wong |
| 6,125,391 | A | 9/2000 | Meltzer et al. |
| 6,138,118 | A | 10/2000 | Koppstein et al. |
| 6,154,732 | A | 11/2000 | Tarbox |
| 6,222,533 | B1 | 4/2001 | Notani et al. |
| 6,226,675 | B1 | 5/2001 | Meltzer et al. |
| 6,229,551 | B1 | 5/2001 | Huang |
| 6,311,165 | B1 | 10/2001 | Coutts et al. |
| 6,327,700 | B1 | 12/2001 | Chen et al. |
| 6,331,972 | B1 | 12/2001 | Harris et al. |
| 6,332,163 | B1 | 12/2001 | Bowman-Amuah |
| 6,424,979 | B1 | 7/2002 | Livingston et al. |
| 6,434,159 | B1 | 8/2002 | Woodward et al. |
| 6,438,594 | B1 | 8/2002 | Bowman-Amuah |
| 6,542,912 | B2 | 4/2003 | Meltzer et al. |
| 6,591,260 | B1 | 7/2003 | Schwarzhoff et al. |
| 6,725,122 | B2 | 4/2004 | Mori et al. |
| 6,738,747 | B1 | 5/2004 | Tanaka et al. |
| 6,745,229 | B1 | 6/2004 | Gobin et al. |
| 6,763,353 | B2 | 7/2004 | Li et al. |
| 6,775,647 | B1 | 8/2004 | Evans et al. |
| 6,868,370 | B1 | 3/2005 | Burbridge et al. |
| 6,937,992 | B1 | 8/2005 | Benda et al. |
| 6,970,844 | B1 | 11/2005 | Bierenbaum |
| 7,020,594 | B1 | 3/2006 | Chacon |
| 7,039,606 | B2 | 5/2006 | Hoffman et al. |
| 7,076,449 | B2 | 7/2006 | Tsunenari et al. |
| 7,131,069 | B1 | 10/2006 | Rush et al. |
| 7,206,768 | B1 | 4/2007 | deGroeve et al. |
| 7,249,157 | B2 | 7/2007 | Stewart et al. |
| 7,269,569 | B2 | 9/2007 | Spira et al. |
| 7,292,965 | B1 | 11/2007 | Mehta et al. |
| 7,321,864 | B1 | 1/2008 | Gendler |
| 7,363,271 | B2 | 4/2008 | Morimoto |
| 7,379,931 | B2 | 5/2008 | Morinville |
| 7,383,990 | B2 | 6/2008 | Veit |
| 7,406,358 | B2 | 7/2008 | Preiss |
| 7,481,367 | B2 | 1/2009 | Fees et al. |
| 7,509,278 | B2 | 3/2009 | Jones |
| 7,515,697 | B2 | 4/2009 | Eng et al. |
| 7,516,088 | B2 | 4/2009 | Johnson et al. |
| 7,536,697 | B2 | 5/2009 | Wiseman et al. |
| 7,574,383 | B1 | 8/2009 | Parasnis et al. |
| 7,617,328 | B2 | 11/2009 | Lewis et al. |
| 7,627,504 | B2 | 12/2009 | Brady et al. |
| 7,634,482 | B2 | 12/2009 | Mukherjee et al. |
| 7,788,319 | B2 | 8/2010 | Schmidt et al. |
| 7,805,383 | B2 | 9/2010 | Veit et al. |
| 7,853,491 | B2 | 12/2010 | Wittmer et al. |
| 7,865,426 | B2 | 1/2011 | Volpert |
| 7,873,965 | B2 | 1/2011 | Hayton et al. |
| 7,895,209 | B2 * | 2/2011 | Spence et al. .................. 707/740 |
| 7,941,236 | B2 | 5/2011 | Spearman |
| 2001/0042032 | A1 | 11/2001 | Crawshaw et al. |
| 2002/0013721 | A1 | 1/2002 | Dabbiere et al. |
| 2002/0026394 | A1 | 2/2002 | Savage et al. |
| 2002/0046053 | A1 | 4/2002 | Hare et al. |
| 2002/0052754 | A1 | 5/2002 | Joyce et al. |
| 2002/0072988 | A1 | 6/2002 | Aram |
| 2002/0087481 | A1 | 7/2002 | Harif |
| 2002/0087483 | A1 | 7/2002 | Harif |
| 2002/0099634 | A1 | 7/2002 | Coutts et al. |
| 2002/0107765 | A1 | 8/2002 | Walker |
| 2002/0112171 | A1 | 8/2002 | Ginter et al. |
| 2002/0138318 | A1 | 9/2002 | Ellis et al. |
| 2002/0147668 | A1 | 10/2002 | Smith et al. |
| 2002/0152104 | A1 | 10/2002 | Ojha et al. |
| 2002/0152145 | A1 | 10/2002 | Wanta et al. |
| 2002/0156693 | A1 * | 10/2002 | Stewart et al. .................. 705/26 |
| 2002/0156930 | A1 | 10/2002 | Velasquez |
| 2002/0157017 | A1 | 10/2002 | Mi et al. |
| 2002/0169657 | A1 | 11/2002 | Singh et al. |
| 2002/0184070 | A1 | 12/2002 | Chen et al. |
| 2002/0186876 | A1 | 12/2002 | Jones et al. |
| 2002/0194045 | A1 | 12/2002 | Shay et al. |
| 2003/0004799 | A1 | 1/2003 | Kish |
| 2003/0069648 | A1 | 4/2003 | Douglas et al. |
| 2003/0086594 | A1 | 5/2003 | Gross |
| 2003/0120502 | A1 * | 6/2003 | Robb et al. ........................ 705/1 |
| 2003/0120665 | A1 | 6/2003 | Fox et al. |
| 2003/0126077 | A1 | 7/2003 | Kantor et al. |
| 2003/0167193 | A1 | 9/2003 | Jones et al. |
| 2003/0171962 | A1 | 9/2003 | Hirth et al. |
| 2003/0172007 | A1 | 9/2003 | Helmolt et al. |
| 2003/0172135 | A1 | 9/2003 | Bobick et al. |
| 2003/0195815 | A1 | 10/2003 | Li et al. |
| 2003/0204452 | A1 | 10/2003 | Wheeler |
| 2003/0208389 | A1 | 11/2003 | Kurihara et al. |
| 2003/0212614 | A1 | 11/2003 | Chu et al. |
| 2003/0216978 | A1 | 11/2003 | Sweeney et al. |
| 2003/0220875 | A1 | 11/2003 | Lam et al. |
| 2003/0229522 | A1 * | 12/2003 | Thompson et al. ............... 705/4 |
| 2003/0229550 | A1 | 12/2003 | DiPrima et al. |
| 2003/0233295 | A1 | 12/2003 | Tozawa et al. |
| 2003/0236748 | A1 | 12/2003 | Gressel et al. |
| 2004/0015366 | A1 | 1/2004 | Wiseman et al. |
| 2004/0024662 | A1 | 2/2004 | Gray et al. |
| 2004/0034577 | A1 | 2/2004 | Van Hoose et al. |
| 2004/0039665 | A1 * | 2/2004 | Ouchi ............................ 705/28 |
| 2004/0073510 | A1 | 4/2004 | Logan |
| 2004/0083201 | A1 | 4/2004 | Sholl et al. |
| 2004/0083233 | A1 * | 4/2004 | Willoughby ............... 707/104.1 |
| 2004/0133445 | A1 * | 7/2004 | Rajan et al. ....................... 705/1 |
| 2004/0138942 | A1 | 7/2004 | Pearson et al. |
| 2004/0148227 | A1 | 7/2004 | Tabuchi et al. |
| 2004/0172360 | A1 | 9/2004 | Mabrey et al. |
| 2004/0187140 | A1 | 9/2004 | Aigner et al. |
| 2004/0220910 | A1 | 11/2004 | Zang et al. |
| 2004/0254945 | A1 | 12/2004 | Schmidt et al. |
| 2004/0267714 | A1 | 12/2004 | Frid et al. |
| 2005/0015273 | A1 | 1/2005 | Iyer |
| 2005/0021366 | A1 | 1/2005 | Pool et al. |
| 2005/0033588 | A1 | 2/2005 | Ruiz et al. |
| 2005/0038744 | A1 | 2/2005 | Viijoen |
| 2005/0049903 | A1 | 3/2005 | Raja |
| 2005/0071262 | A1 | 3/2005 | Kobeh et al. |
| 2005/0080640 | A1 | 4/2005 | Bhaskaran et al. |
| 2005/0108085 | A1 | 5/2005 | Dakar et al. |
| 2005/0131947 | A1 | 6/2005 | Laub et al. |
| 2005/0159997 | A1 | 7/2005 | John |
| 2005/0171833 | A1 | 8/2005 | Jost et al. |
| 2005/0182639 | A1 | 8/2005 | Dale |
| 2005/0187797 | A1 | 8/2005 | Johnson |
| 2005/0187866 | A1 | 8/2005 | Lee |
| 2005/0194431 | A1 | 9/2005 | Fees et al. |
| 2005/0194439 | A1 | 9/2005 | Zuerl et al. |
| 2005/0197849 | A1 | 9/2005 | Fotteler et al. |
| 2005/0197851 | A1 | 9/2005 | Veit |
| 2005/0197878 | A1 | 9/2005 | Fotteler et al. |
| 2005/0197881 | A1 | 9/2005 | Fotteler et al. |
| 2005/0197882 | A1 | 9/2005 | Fotteler et al. |
| 2005/0197886 | A1 | 9/2005 | Veit |
| 2005/0197887 | A1 | 9/2005 | Zuerl et al. |
| 2005/0197896 | A1 | 9/2005 | Veit et al. |
| 2005/0197897 | A1 | 9/2005 | Veit et al. |
| 2005/0197898 | A1 | 9/2005 | Veit et al. |
| 2005/0197899 | A1 | 9/2005 | Veit et al. |
| 2005/0197900 | A1 | 9/2005 | Veit |
| 2005/0197901 | A1 | 9/2005 | Veit et al. |
| 2005/0197902 | A1 | 9/2005 | Veit |
| 2005/0197928 | A1 | 9/2005 | Fotteler et al. |
| 2005/0197941 | A1 | 9/2005 | Veit |
| 2005/0209732 | A1 | 9/2005 | Audimoolam et al. |
| 2005/0210406 | A1 | 9/2005 | Biwer et al. |
| 2005/0216321 | A1 | 9/2005 | Veit |
| 2005/0216371 | A1 | 9/2005 | Fotteler et al. |
| 2005/0216421 | A1 | 9/2005 | Barry et al. |
| 2005/0222888 | A1 | 10/2005 | Hosoda et al. |
| 2005/0222896 | A1 | 10/2005 | Rhyne et al. |
| 2005/0222945 | A1 | 10/2005 | Pannicke et al. |
| 2005/0228821 | A1 * | 10/2005 | Gold ............................ 707/102 |
| 2005/0234754 | A1 | 10/2005 | Veit |
| 2005/0246240 | A1 | 11/2005 | Padilla |
| 2005/0256753 | A1 | 11/2005 | Veit et al. |
| 2006/0004934 | A1 | 1/2006 | Guldner et al. |
| 2006/0005098 | A1 | 1/2006 | Lotz et al. |
| 2006/0020515 | A1 | 1/2006 | Lee et al. |

| | | | |
|---|---|---|---|
| 2006/0026586 A1 | 2/2006 | Remmel et al. | |
| 2006/0036941 A1 | 2/2006 | Neil | |
| 2006/0047574 A1 | 3/2006 | Sundaram et al. | |
| 2006/0047598 A1 | 3/2006 | Hansen | |
| 2006/0059005 A1 | 3/2006 | Horn et al. | |
| 2006/0059059 A1 | 3/2006 | Horn et al. | |
| 2006/0059060 A1 | 3/2006 | Horn et al. | |
| 2006/0069598 A1 | 3/2006 | Schweitzer et al. | |
| 2006/0069629 A1 | 3/2006 | Schweitzer et al. | |
| 2006/0069632 A1 | 3/2006 | Kahn et al. | |
| 2006/0074728 A1 | 4/2006 | Schweitzer et al. | |
| 2006/0080338 A1 | 4/2006 | Seubert et al. | |
| 2006/0085336 A1 | 4/2006 | Seubert et al. | |
| 2006/0085412 A1 | 4/2006 | Johnson et al. | |
| 2006/0085450 A1 | 4/2006 | Seubert et al. | |
| 2006/0089885 A1 | 4/2006 | Finke et al. | |
| 2006/0095373 A1 | 5/2006 | Venkatasubramanian et al. | |
| 2006/0184435 A1 | 8/2006 | Mostowfi | |
| 2006/0212376 A1 | 9/2006 | Snyder et al. | |
| 2006/0280302 A1 | 12/2006 | Baumann et al. | |
| 2006/0282360 A1 | 12/2006 | Kahn et al. | |
| 2007/0027742 A1 | 2/2007 | Emuchay et al. | |
| 2007/0043583 A1 | 2/2007 | Davulcu et al. | |
| 2007/0055688 A1 | 3/2007 | Blattner | |
| 2007/0078799 A1 | 4/2007 | Huber-Buschbeck et al. | |
| 2007/0112574 A1* | 5/2007 | Greene | 705/1 |
| 2007/0124227 A1 | 5/2007 | Dembo et al. | |
| 2007/0129978 A1 | 6/2007 | Shirasu et al. | |
| 2007/0132585 A1* | 6/2007 | Llorca et al. | 705/1 |
| 2007/0150387 A1 | 6/2007 | Seubert et al. | |
| 2007/0150836 A1 | 6/2007 | Deggelmann et al. | |
| 2007/0156428 A1 | 7/2007 | Brecht-Tillinger et al. | |
| 2007/0156545 A1* | 7/2007 | Lin | 705/28 |
| 2007/0156552 A1 | 7/2007 | Manganiello | |
| 2007/0156690 A1 | 7/2007 | Moser et al. | |
| 2007/0165622 A1 | 7/2007 | O'Rourke et al. | |
| 2007/0214065 A1 | 9/2007 | Kahlon et al. | |
| 2007/0225949 A1 | 9/2007 | Sundararajan et al. | |
| 2007/0226090 A1 | 9/2007 | Stratton | |
| 2007/0255639 A1 | 11/2007 | Seifert | |
| 2007/0265860 A1 | 11/2007 | Herrmann et al. | |
| 2007/0265862 A1 | 11/2007 | Freund et al. | |
| 2007/0294159 A1 | 12/2007 | Cottle | |
| 2008/0005012 A1 | 1/2008 | Deneef | |
| 2008/0021754 A1* | 1/2008 | Horn et al. | 705/8 |
| 2008/0040243 A1* | 2/2008 | Chang et al. | 705/28 |
| 2008/0046104 A1 | 2/2008 | Van Camp et al. | |
| 2008/0046421 A1* | 2/2008 | Bhatia et al. | 707/5 |
| 2008/0120129 A1 | 5/2008 | Seubert et al. | |
| 2008/0120190 A1 | 5/2008 | Joao et al. | |
| 2008/0120204 A1 | 5/2008 | Conner et al. | |
| 2008/0133303 A1 | 6/2008 | Singh et al. | |
| 2008/0154969 A1 | 6/2008 | DeBie | |
| 2008/0162266 A1 | 7/2008 | Griessmann et al. | |
| 2008/0184265 A1 | 7/2008 | Kasi et al. | |
| 2008/0196108 A1 | 8/2008 | Dent et al. | |
| 2008/0215354 A1 | 9/2008 | Halverson et al. | |
| 2008/0243578 A1 | 10/2008 | Veit | |
| 2008/0288317 A1 | 11/2008 | Kakar | |
| 2009/0006203 A1 | 1/2009 | Fordyce et al. | |
| 2009/0063287 A1 | 3/2009 | Tribout et al. | |
| 2009/0077074 A1 | 3/2009 | Hosokawa | |
| 2009/0089198 A1 | 4/2009 | Kroutik | |
| 2009/0164497 A1 | 6/2009 | Steinmaier et al. | |
| 2009/0192926 A1 | 7/2009 | Tarapata | |
| 2009/0193432 A1 | 7/2009 | McKegney et al. | |
| 2009/0222360 A1* | 9/2009 | Schmitt et al. | 705/29 |
| 2009/0248431 A1 | 10/2009 | Schoknecht et al. | |
| 2009/0248547 A1 | 10/2009 | Doenig et al. | |
| 2009/0271245 A1 | 10/2009 | Joshi et al. | |
| 2009/0300578 A1 | 12/2009 | Neil | |
| 2009/0326988 A1 | 12/2009 | Barth et al. | |
| 2010/0014510 A1 | 1/2010 | Boreli et al. | |
| 2010/0070391 A1 | 3/2010 | Storr et al. | |
| 2010/0070395 A1 | 3/2010 | Elkeles et al. | |
| 2010/0106555 A1 | 4/2010 | Mneimneh et al. | |
| 2010/0161425 A1 | 6/2010 | Sideman | |
| 2011/0046775 A1* | 2/2011 | Bailey et al. | 700/224 |

FOREIGN PATENT DOCUMENTS

| | | |
|---|---|---|
| CN | 1632806 | 6/2005 |
| CN | 1767537 | 5/2006 |
| CN | 101174957 | 5/2008 |

OTHER PUBLICATIONS

Jon Himoff, Petr Skobelev and Michael Wooldridge—"MAGENTA Technology: Multi-Agent Systems for Industrial Logistics" AAMAS'05 Jul. 25-29, 2005, 2005 ACM (pp. 60-66:1-7).*

Newton's Telecom Dictionary; 18th Edition; 2002; pp. 347, 454.

Baker, Stacy; "Benefits of Assortment Planning"; Assortment Planning for Apparel Retailers—2005 Management Briefing; Just Style; Jun. 2005; 3 pages.

"Visual and Quantitative Assortment Planning Applications Drive Partnership and Profit"; PR Newswire; Jan. 12, 2006; 3 pages.

"DOTS Inc. Selects Compass Software's smartmerchandising for Merchandise Planning and Assortment Planning"; PR Newswire; Dec. 11, 2002; 2 pages.

Notice of Allowance issued in related U.S. Appl. No. 12/147,395 on Oct. 26, 2010; 10 pages.

Office Action issued in related U.S. Appl. No. 12/147,399 on Jan. 26, 2011; 16 pages.

Notice of Allowance issued in related U.S. Appl. No. 11/775,821 on Oct. 22, 2010; 4 pages.

Notice of Allowance issued in related U.S. Appl. No. 11/775,821 on Feb. 4, 2011; 4 pages.

Notice of Allowance issued in related U.S. Appl. No. 11/364,538 on Dec. 13, 2010; 5 pages.

Notice of Allowance issued in related U.S. Appl. No. 11/731,857 on Nov. 29, 2010; 4 pages.

Notice of Allowance issued in U.S. Appl. No. 12/323,139 on Mar. 4, 2011; 13 pages.

Notice of Allowance issued in related U.S. Appl. No. 11/864,832 on Aug. 23, 2010; 4 pages.

Notice of Allowance issued in related U.S. Appl. No. 11/864,832 on Dec. 3, 2010; 9 pages.

Office Action issued in related U.S. Appl. No. 11/864,871 on Oct. 1, 2010; 30 pages.

Office Action issued in related U.S. Appl. No. 12/059,971 on Nov. 4, 2010; 20 pages.

Office Action issued in related U.S. Appl. No. 12/060,149 on Aug. 26, 2010; 15 pages.

Office Action issued in related U.S. Appl. No. 12/060,149 on Feb. 4, 2011; 19 pages.

Notice of Allowance issued in related U.S. Appl. No. 12/060,178 on Dec. 6, 2010; 4 pages.

Office Action issued in related U.S. Appl. No. 12/060,171 on Jan. 26, 2011; 17 pages.

Notice of Allowance issued in related U.S. Appl. No. 11/145,464 on Nov. 1, 2010; 4 pages.

Notice of Allowance issued in U.S. Appl. No. 11/155,368 on Oct. 7, 2010; 4 pages.

Notice of Allowance issued in related U.S. Appl. No. 11/166,065 on Sep. 20, 2010; 6 pages.

Notice of Allowance issued in U.S. Appl. No. 11/166,065 on Mar. 8, 2011; 5 pages.

Office Action issued in related U.S. Appl. No. 11/864,866 on Feb. 3, 2011; 20 pages.

Office Action issued in U.S. Appl. No. 11/864,811 on Mar. 18, 2011; 10 pages.

He, Ning et al.; "B2B Contract Implementation Using Windows DNS"; 2001; pp. 71-79.

FSML-Financial Services Markup Language (Jul. 14, 1999) http://xml.coverpages.org/FSML-v1500a.pdf; pp. 1-159.

Statement in Accordance with the Notice from the European Patent Office dated Oct. 1, 2007 Concerning Business Methods—EPC; Official Journal of the European Patent Office; Munich; Nov. 1, 2007; pp. 592-593.

Lynn, Chris; "Sony Enters Brand Asset Management Market"; The Seybold Report; Analyzing Publishing Technologies; Aug. 4, 2004; <www.Seybold365.com>; 3 pages.

Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 11/145,464 on Aug. 5, 2009; 31 pages.
Office Action issued in related U.S. Appl. No. 11/145,464 on Feb. 5, 2010; 57 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
SAP Structured Entity Relationship Model (SAP-SERM) for R/3 System Release 4.0 Introduction and Index; Dec. 1998; 26 pages.
SAP Structured Entity Relationship Model (SAP-SERM) for R/3 System Release 4.0 (Part 1); Dec. 1998; 5954 pages.
SAP Structured Entity Relationship Model (SAP-SERM) for R/3 System Release 4.0 (Part 2); Dec. 1998; 7838 pages.
Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.
Medjahed, Brahim et al; "Business-to-Business Interactions: Issues and Enabling Technologies"; The VLDB Journal; vol. 12, No. 1; Apr. 3, 2003; pp. 59-89.
Medjahed, Brahim et al.; "Composing Web Services on the Semantic Web"; The VLDB Journal; vol. 12, No. 4, Sep. 23, 2003; pp. 333-351.
Born, Marc et al.; "Customizing UML for Component Design"; www.dot-profile.de; UML Workshop, Palm Springs, CA; Nov. 2000.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/cpconcreatingwebserviceproxy.htm; 3 pages.
Meltzer, Bart et al.; "XML and Electronic Commerce: Enabling the Network Economy"; SIGMOD Record; ACM Press; vol. 27, No. 4; Dec. 1998; pp. 21-24.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17$^{th}$ Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27$^{th}$ Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.

Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: an Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
Office Action issued in related U.S. Appl. No. 11/145,464 on Jan. 22, 2009; 49 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
"Header", Newton's Telecom Dictionary; 12th Edition, 2004; pp. 389-390).
Office Action issued in U.S. Appl. No. 11/640,422 on May 14, 2010; 12 pages.
Notice of Allowance issued in related U.S. Appl. No. 11/775,821 on Jul. 16, 2010; 4 pages.
Office Action issued in related U.S. Appl. No. 11/864,871 on Apr. 21, 2010; 20 pages.
Office Action issued in related U.S. Appl. No. 12/060,178 on May 25, 2010; 19 pages.
Office Action issued in related U.S. Appl. No. 12/060,171 on Jul. 1, 2010; 19 pages.
Advisory Action issued in U.S. Appl. No. 11/155,368 on Mar. 31, 2010; 3 pages.
Office Action issued in U.S. Appl. No. 12/147,414 on Apr. 14, 2011; 30 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Webster's Revised Unabridged Dictionary (1913+1828); Def. "merchandise", [online], <http://machaut,uchicago.edu/?resource=Webster%27s&word=merchandise&use1913=on&u>, retrieved on Sep. 1, 2009.
"UML in the .com Enterprise: Modeling CORBA, Components, XML/XMI and Metadata Workshop"; [online], <http://www.omg.org/news/meetings/workshops/uml_presentations.htm> retrieved on Mar. 17, 2005.
Proceedings of OMG Workshops; [online], <http://www.omg.org/news/meetings/workshops/proceedings.htm>, pp. 1-3. retrieved on Mar. 17, 2005.
Jaeger, Dirk et al.; "Using UML for Software Process Modeling"; pp. 91-108, 1999.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.
Communication Pursuant to Article 94(3) issued in European Application No. 05757432.9 on Apr. 12, 2011; 5 pages.
Notice of Allowance issued in U.S. Appl. No. 12/147,395 on May 4, 2011; 10 pages.

Notice of Allowance issued in related U.S. Appl. No. 12/147,449 on Apr. 28, 2011; 9 pages.
Office Action issued in related U.S. Appl. No. 12/334,175 on May 27, 2011; 12 pages.
Notice of Allowance issued in related U.S. Appl. No. 11/731,857 on Apr. 11, 2011; 8 pages.
Office Action issued in U.S. Appl. No. 12/147,378 on Jun. 17, 2011; 10 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/059,860 on Aug. 3, 2011; 15 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Notice of Allowance issued in related U.S. Appl. No. 11/145,464 on Feb. 23, 2011; 7 pages.
Notice of Allowance issued in U.S. Appl. No. 11/155,368 on Mar. 14, 2011; 7 pages.
Notice of Allowance issued in related U.S. Appl. No. 11/864,866 on Jul. 22, 2011; 6 pages.
Notice of Allowance issued in related U.S. Appl. No. 11/364,538 on Jul. 26, 2011; 6 pages.
Office Action issued in U.S. Appl. No. 11/864,811 on Jul. 26, 2011; 7 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Notice of Allowance issued in related U.S. Appl. No. 11/803,178 on May 17, 2011; 13 pages.
Communication Pursuant to Article 94(3) issued in European Application No. 05766672.9 on Jul. 14, 2011; 4 pages.
Notice of Allowance issued in related U.S. Appl. No. 11/731,857 on Dec. 14, 2011; 7 pages.
Office Action issued in U.S. Appl. No. 12/147,414 on Oct. 26, 2011; 27 pages.
Notice of Allowance issued in U.S. Appl. No. 12/147,378 on Nov. 9, 2011; 16 pages.
Office Action issued in U.S. Appl. No. 12/323,116 on Sep. 6, 2011; 8 pages.
Office Action issued in U.S. Appl. No. 12/571,140 on Sep. 26, 2011; 14 pages.
Office Action issued in related U.S. Appl. No. 12/060,054 on Dec. 7, 2011; 15 pages.
Office Action issued in U.S. Appl. No. 12/060,144 on Dec. 8, 2011; 18 pages.
Office Action issued in U.S. Appl. No. 12/059,804 on Nov. 14, 2011; 15 pages.
Notice of Allowance issued in related U.S. Appl. No. 12/060,178 on Sep. 2, 2011; 9 pages.
Office Action issued in related U.S. Appl. No. 12/060,155 on Oct. 21, 2011; 15 pages.
Notice of Allowance issued in U.S. Appl. No. 11/155,368 on Nov. 8, 2011; 7 pages.
Office Action issued in U.S. Appl. No. 12/815,698 on Jan. 20, 2012; 10 pages.
Office Action issued in U.S. Appl. No. 12/815,618 on Dec. 22, 2011; 8 pages.
Notice of Allowance issued in U.S. Appl. No. 11/775,821 on Sep. 21, 2011; 5 pages.
Notice of Allowance issued in U.S. Appl. No. 11/775,821 on Dec. 30, 2011; 5 pages.
Notice of Allowance issued in U.S. Appl. No. 11/864,811 on Nov. 14, 2011; 8 pages.
Office Action issued in related U.S. Appl. No. 11/864,863 on Dec. 22, 2011; 20 pages.
Notice of Allowance issued in U.S. Appl. No. 11/640,422 on Sep. 29, 2011; 7 pages.
Lockemann et al.; "Flexibility through Multi-Agent Systems: Solutions or Illusions"; SOFSEM 2004; pp. 41-56.
Mascolo et al.; "An Analytical Method for performance Evaluation of Kanban Controlled Production Systems"; Operations Research; vol. 44, No. 1; 1996; pp. 50-64.
Gable, Julie; "Enterprise Application Integration"; Information Management Journal; Mar./Apr. 2002; pp. 48-52.
"SAP Labs and HP Team to Advance Internet-Based Supply Chain Collaboration"; Business Editors and Technology Writers; business Wire; New York; Feb. 3, 2000; 4 pages.
Office Action issued in U.S. Appl. No. 12/323,116 on Jan. 27, 2012; 7 pages.
Notice of Allowance issued in U.S. Appl. No. 12/323,139 on Mar. 14, 2012; 10 pages.
Notice of Allowance issued in U.S. Appl. No. 12/571,140 on Mar. 20, 2012; 16 pages.
Office Action issued in U.S. Appl. No. 12/571,154 on Apr. 2, 2012; 13 pages.
Office Action issued in related U.S. Appl. No. 12/059,860 on Jan. 23, 2012; 16 pages.
Notice of Allowance issued in U.S. Appl. No. 12/060,062 on Mar. 20, 2012; 16 pages.
Office Action issued in related U.S. Appl. No. 12/060,171 on Mar. 1, 2012; 19 pages.
Notice of Allowance issued in related U.S. Appl. No. 11/145,464 on Feb. 6, 2012; 7 pages.
Notice of Allowance issued in U.S. Appl. No. 11/166,065 on Feb. 15, 2012; 7 pages.
Office Action issued in U.S. Appl. No. 12/816,293 on Apr. 25, 2012; 10 pages.
Notice of Allowance issued in related U.S. Appl. No. 11/864,866 on Mar. 13, 2012; 7 pages.
Notice of Allowance issued in U.S. Appl. No. 11/864,811 on Mar. 2, 2012; 8 pages.
Office Action issued in U.S. Appl. No. 11/864,786 on Mar. 30, 2012; 12 pages.
Notice of Allowance issued in related U.S. Appl. No. 11/864,832 on Jan. 9, 2012; 12 pages.

* cited by examiner

FIG. 27E
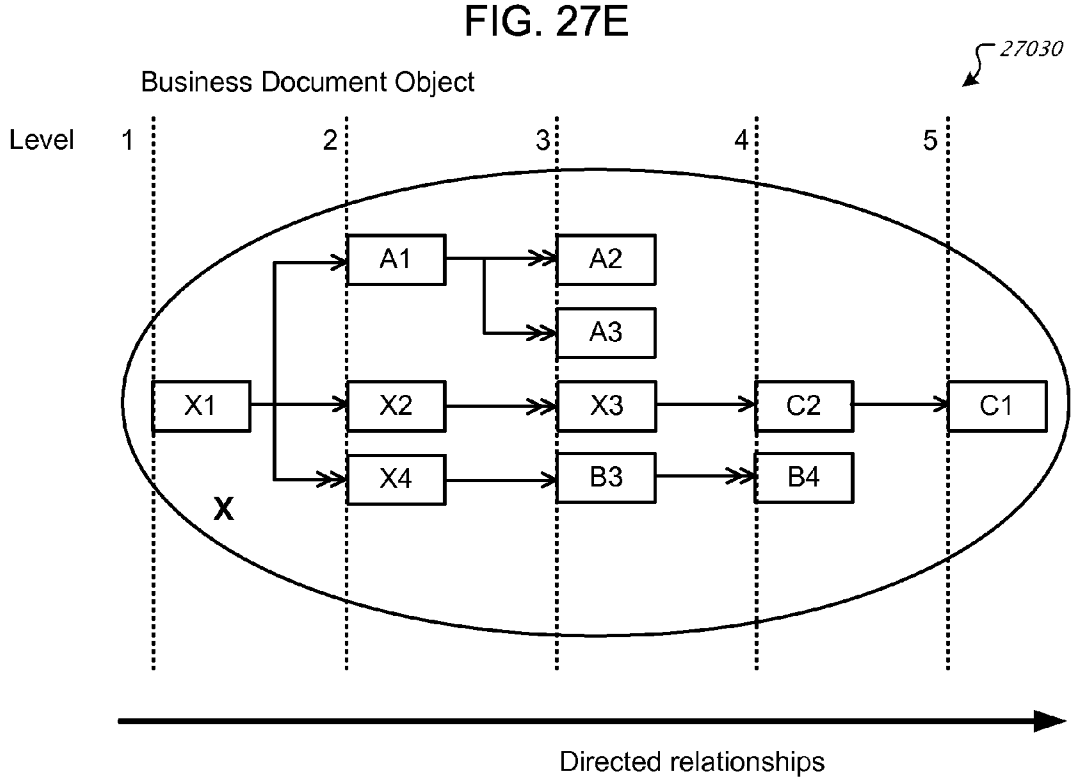
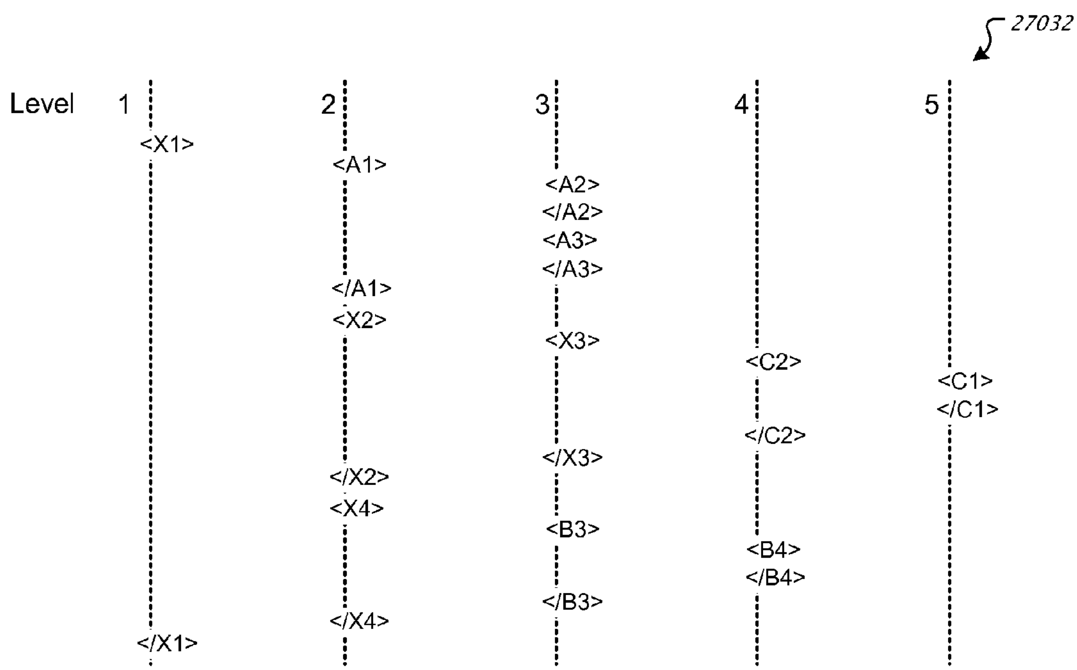

FIG. 49

| Package | level1 | level2 | level3 | Cardinality | Data Type Name |
|---|---|---|---|---|---|
| AutomaticIdentificationLabelDevice-ByElementsResponseMessage_sync 49000 | AutomaticIdentificationLabelDevice-ByElementsResponseMessage_sync 49002 | | | | AutomaticIdentificationLabelDevice-ByElementsResponseMessage_sync 49004 |
| AutomaticIdentificationLabelDevice 49006 | | AutomaticIdentifica-tionLabelDevice 49008 | | 0..N 49010 | |
| | | | ID 49012 | 1 49014 | DeviceID 49016 |
| | | | LocationID 49018 | 0..1 49020 | LocationID 49022 |
| Log 49024 | | Log 49026 | | 1 49028 | Log 49030 |

FIG. 50

| Package | level1 | level2 | level3 | Cardinality | Data Type Name |
|---|---|---|---|---|---|
| AutomaticIdentifica-tionLabelByElement-sQueryMessage_sync 50000 | AutomaticIdentificationLabelByE-lementsQueryMessage_sync 50002 | | | | AutomaticIdentificationLabelByE-lementsQueryMessage_sync 50004 |
| Selection 50006 | | AutomaticIdentificationLabel-SelectionByElements 50008 | | 1 50010 | |
| | | | HexadecimalAutomati-cIdentificationLabelID 50012 | 0..1 50014 | AutomaticIdentificationLabelID 50016 |
| | | | ReferenceObjectID 50018 | 0..1 50020 | ObjectID 50022 |
| | | | ReferenceObjectType 50024 | 0..1 50026 | BusinessObjectTypeCode 50028 |

FIG. 51-1

| Package | level1 | level2 | level3 | Cardinality | Data Type Name |
|---|---|---|---|---|---|
| AutomaticIdentificationLabelByElementsResponseMessage_sync 51000 | AutomaticIdentificationLabelByElementsResponseMessage_sync 51002 | | | | AutomaticIdentificationLabelByElementsResponseMessage_sync 51004 |
| AutomaticIdentificationLabel 51006 | | AutomaticIdentificationLabel 51008 | | 0..N 51010 | |
| | | | ID 51012 | 1 51014 | AutomaticIdentificationLabelID 51016 |
| | | | HexadecimalAutomaticIdentificationLabelID 51018 | 0..1 51020 | AutomaticIdentificationLabelID 51022 |
| | | | ReferenceObjectID 51024 | 0..1 51026 | ObjectID 51028 |
| | | | ReferenceObjectType 51030 | 0..1 51032 | BusinessObjectTypeCode 51034 |

FIG. 51-2

| Package | level1 | level2 | level3 | Cardinality | Data Type Name |
|---|---|---|---|---|---|
| Log 51036 | | Log 51038 | | 1 51040 | Log 51042 |

FIG. 52

| Package | level1 | level2 | level3 | Cardinality | Data Type Name |
|---|---|---|---|---|---|
| AutomaticIdentificationLabel-ByIDQueryMessage_sync 52000 | AutomaticIdentificationLabel-ByIDQueryMessage_sync 52002 | | | | AutomaticIdentificationLabelBy-IDQueryMessage_sync 52004 |
| Selection 52006 | | AutomaticIdentificationLabel-SelectionByID 52008 | | 1 52010 | |
| | | | ID 52012 | 1 52014 | AutomaticIdentificationLabelID 52016 |

FIG. 53-1

| Package | level1 | level2 | level3 | Cardinality | Data Type Name |
| --- | --- | --- | --- | --- | --- |
| AutomaticIdentificationLabel-ByIDResponseMessage_sync 53000 | AutomaticIdentificationLabel-ByIDResponseMessage_sync 53002 | | | | AutomaticIdentificationLabel-ByIDResponseMessage_sync 53004 |
| AutomaticIdentificationLabel 53006 | | AutomaticIdentificationLabel 53008 | | 0..1 53010 | |
| | | | ID 53012 | 1 53014 | AutomaticIdentificationLabelID 53016 |
| | | | HexadecimalAutomaticIdentificationLabelID 53018 | 0..1 53020 | AutomaticIdentificationLabelID 53022 |
| | | | ReferenceObjectID 53024 | 0..1 53026 | ObjectID 53028 |
| | | | ReferenceObjectType 53030 | 0..1 53032 | BusinessObjectTypeCode 53034 |

FIG. 53-2

| Package | level1 | level2 | level3 | Cardinality | Data Type Name |
|---|---|---|---|---|---|
| Log 53036 | | Log 53038 | | 1 53040 | Log 53042 |

FIG. 54

| Package | level1 | level2 | level3 | Cardinality | Data Type Name |
|---|---|---|---|---|---|
| AutomaticIdentificationLabel-ChangeConfirmationMessage_sync 54000 | AutomaticIdentificationLabel-CancelConfirmationMessage_sync 54002 | | | | AutomaticIdentificationLabel-CancelConfirmationMessage_sync 54004 |
| MessageHeader 54006 | | MessageHeader 54008 | | 1 54010 | |
| | | | BasicBusinessDocument-MessageHeader 54012 | 1 54014 | BasicBusinessDocumentMessageHeader 54016 |
| AutomaticIdentificationLabel 54018 | | AutomaticIdentificationLabel 54020 | | 0..1 54022 | |
| | | | ID 54024 | 1 54026 | AutomaticIdentificationLabelID 54028 |
| Log 54030 | | Log 54032 | | 1 54034 | Log 54036 |

FIG. 55

| Package | level1 | level2 | level3 | Cardinality | Data Type Name |
|---|---|---|---|---|---|
| AutomaticIdentificationLabel-CancelRequestMessage_sync 55000 | AutomaticIdentificationLabel-CancelRequestMessage_sync 55002 | | | | AutomaticIdentificationLabel-CancelRequestMessage_sync 55004 |
| MessageHeader 55006 | | MessageHeader 55008 | | 1 55010 | |
| | | | BasicBusinessDocument-MessageHeader 55012 | 1 55014 | BasicBusinessDocumentMes-sageHeader 55016 |
| AutomaticIdentificationLabel 55018 | | AutomaticIdentificationLabel 55020 | | 1 55022 | |
| | | | ID 55024 | 1 55026 | AutomaticIdentificationLabelID 55028 |

FIG. 56-1

| Package | level1 | level2 | level3 | Cardinality | Data Type Name |
|---|---|---|---|---|---|
| AutomaticIdentificationLabel-ChangeConfirmationMes-sage_sync 56000 | AutomaticIdentificationLa-belChangeConfirmationMes-sage_sync 56002 | | | | AutomaticIdentificationLabel-ChangeConfirmationMes-sage_sync 56004 |
| MessageHeader 56006 | | MessageHeader 56008 | | 1 56010 | |
| | | | BasicBusinessDocument-MessageHeader 56012 | 1 56014 | BasicBusinessDocumentMes-sageHeader 56016 |
| AutomaticIdentificationLabel 56018 | | AutomaticIdentificationLabel 56020 | | 0..1 56022 | |
| | | | ID 56024 | 1 56026 | AutomaticIdentificationLabelID 56028 |
| | | | HexadecimalAutomaticI-dentificationLabelID 56030 | 0..1 56032 | AutomaticIdentificationLabelID 56034 |

FIG. 56-2

| Package | level1 | level2 | level3 | Cardinality | Data Type Name |
|---|---|---|---|---|---|
| | | | ReferenceObjectID 56036 | 0..1 56038 | ObjectID 56040 |
| | | | ReferenceObjectType 56042 | 0..1 56044 | BusinessObjectTypeCode 56046 |
| Log 56048 | | Log 56050 | | 1 56052 | Log 56054 |

FIG. 57-1

| Package | level1 | level2 | level3 | Cardinality | Data Type Name |
|---|---|---|---|---|---|
| AutomaticIdentificationLabel-ChangeRequestMessage_sync 57000 | AutomaticIdentificationLabel-ChangeRequestMessage_sync 57002 | | | | AutomaticIdentificationLabel-ChangeRequestMessage_sync 57004 |
| MessageHeader 57006 | | MessageHeader 57008 | | 1 57010 | |
| | | | BasicBusinessDocumentMessageHeader 57012 | 1 57014 | BasicBusinessDocumentMessageHeader 57016 |
| AutomaticIdentificationLabel 57018 | | AutomaticIdentificationLabel 57020 | | 1 57022 | |
| | | | ID 57024 | 1 57026 | AutomaticIdentificationLabelID 57028 |
| | | | HexadecimalAutomaticIdentificationLabelID 57030 | 0..1 57032 | AutomaticIdentificationLabelID 57034 |

FIG. 57-2

| Package | level1 | level2 | level3 | Cardinality | Data Type Name |
|---|---|---|---|---|---|
| | | | ReferenceObjectID 57036 | 0..1 57038 | ObjectID 57040 |
| | | | ReferenceObjectType 57042 | 0..1 57044 | BusinessObjectTypeCode 57046 |

FIG. 58-1

| Package | level1 | level2 | level3 | Cardinality | Data Type Name |
|---|---|---|---|---|---|
| AutomaticIdentificationLabelCreateConfirmationMessage_sync 58000 | AutomaticIdentificationLabelCreateConfirmationMessage_sync 58002 | | | | AutomaticIdentificationLabelCreateConfirmationMessage_sync 58004 |
| MessageHeader 58006 | | MessageHeader 58008 | | 1 58010 | |
| | | | BasicBusinessDocumentMessageHeader 58012 | 1 58014 | BasicBusinessDocumentMessageHeader 58016 |
| AutomaticIdentificationLabel 58018 | | AutomaticIdentificationLabel 58020 | | 0..1 58022 | |
| | | | ID 58024 | 1 58026 | AutomaticIdentificationLabelID 58028 |
| | | | HexadecimalAutomaticIdentificationLabelID 58030 | 0..1 58032 | AutomaticIdentificationLabelID 58034 |

FIG. 58-2

| Package | level1 | level2 | level3 | Cardinality | Data Type Name |
|---|---|---|---|---|---|
| | | | ReferenceObjectID 58036 | 0..1 58038 | ObjectID 58040 |
| | | | ReferenceObjectType 58042 | 0..1 58044 | BusinessObjectTypeCode 58046 |
| Log 58048 | | Log 58050 | | 1 58052 | Log 58054 |

FIG. 59-1

| Package | level1 | level2 | level3 | Cardinality | Data Type Name |
|---|---|---|---|---|---|
| AutomaticIdentificationLabel-CreateRequestMessage_sync 59000 | AutomaticIdentificationLabel-CreateRequestMessage_sync 59002 | | | | AutomaticIdentificationLabel-CreateRequestMessage_sync 59004 |
| MessageHeader 59006 | | MessageHeader 59008 | | 1 59010 | |
| | | | BasicBusinessDocumentMessageHeader 59012 | 1 59014 | BasicBusinessDocumentMessageHeader 59016 |
| AutomaticIdentificationLabel 59018 | | AutomaticIdentificationLabel 59020 | | 1 59022 | |
| | | | ID 59024 | 1 59026 | AutomaticIdentificationLabelID 59028 |
| | | | HexadecimalAutomaticIdentificationLabelID 59030 | 0..1 59032 | AutomaticIdentificationLabelID 59034 |

FIG. 59-2

| Package | level1 | level2 | level3 | Cardinality | Data Type Name |
|---|---|---|---|---|---|
| | | | ReferenceObjectID 59036 | 0..1 59038 | ObjectID 59040 |
| | | | ReferenceObjectType 59042 | 0..1 59044 | BusinessObjectTypeCode 59046 |

FIG. 60-1

| Package | level1 | level2 | level3 | Cardinality | Data Type Name |
|---|---|---|---|---|---|
| AutomaticIdentificationLabelDecodeConfirmationMessage_sync 60000 | AutomaticIdentificationLabelDecodeConfirmationMessage_sync 60002 | | | | AutomaticIdentificationLabelDecodeConfirmationMessage_sync 60004 |
| MessageHeader 60006 | | MessageHeader 60008 | | 1 60010 | |
| | | | BasicBusinessDocumentMessageHeader 60012 | 1 60014 | BasicBusinessDocumentMessageHeader 60016 |
| AutomaticIdentificationLabel 60018 | | AutomaticIdentificationLabel 60020 | | 0..1 60022 | |
| | | | HexadecimalAutomaticIdentificationLabelID 60024 | 1 60026 | AutomaticIdentificationLabelID 60028 |
| | | | ID 60030 | 0..1 60032 | AutomaticIdentificationLabelID 60034 |

FIG. 60-2

| Package | level1 | level2 | level3 | Cardinality | Data Type Name |
|---|---|---|---|---|---|
| Log 60036 | | Log 60038 | | 1 60040 | Log 60042 |

FIG. 61

| Package | level1 | level2 | level3 | Cardinality | Data Type Name |
|---|---|---|---|---|---|
| AutomaticIdentificationLabelDecodeRequestMessage_sync 61000 | AutomaticIdentificationLabelDecodeRequestMessage_sync 61002 | | | | AutomaticIdentificationLabelDecodeRequestMessage_sync 61004 |
| MessageHeader 61006 | | MessageHeader 61008 | | 1 61010 | |
| | | | BasicBusinessDocumentMessageHeader 61012 | 1 61014 | BasicBusinessDocumentMessageHeader 61016 |
| AutomaticIdentificationLabel 61018 | | AutomaticIdentificationLabel 61020 | | 1 61022 | |
| | | | HexadecimalAutomaticIdentificationLabelID 61024 | 1 61026 | AutomaticIdentificationLabelID 61028 |

FIG. 62-1

| Package | level1 | level2 | level3 | Cardinality | Data Type Name |
|---|---|---|---|---|---|
| AutomaticIdentificationLabelEncodeConfirmationMessage_sync 62000 | AutomaticIdentificationLabelEncodeConfirmationMessage_sync 62002 | | | | AutomaticIdentificationLabelEncodeConfirmationMessage_sync 62004 |
| MessageHeader 62006 | | MessageHeader 62008 | | 1 62010 | |
| | | | BasicBusinessDocumentMessageHeader 62012 | 1 62014 | BasicBusinessDocumentMessageHeader 62016 |
| AutomaticIdentificationLabel 62018 | | AutomaticIdentificationLabel 62020 | | 0..1 62022 | |
| | | | ID 62024 | 1 62026 | AutomaticIdentificationLabelID 62028 |
| | | | HexadecimalAutomaticIdentificationLabelID 62030 | 0..1 62032 | AutomaticIdentificationLabelID 62034 |

FIG. 62-2

| Package | level1 | level2 | level3 | Cardinality | Data Type Name |
|---|---|---|---|---|---|
| Log 62036 | | Log 62038 | | 1 62040 | Log 62042 |

FIG. 63

| Package | level1 | level2 | level3 | Cardinality | Data Type Name |
|---|---|---|---|---|---|
| AutomaticIdentificationLabel-EncodeRequestMessage_sync 63000 | AutomaticIdentificationLabel-EncodeRequestMessage_sync 63002 | | | | AutomaticIdentificationLabel-EncodeRequestMessage_sync 63004 |
| MessageHeader 63006 | | MessageHeader 63008 | | 1 63010 | |
| | | | BasicBusinessDocumentMessageHeader 63012 | 1 63014 | BasicBusinessDocumentMessageHeader 63016 |
| AutomaticIdentificationLabel 63018 | | AutomaticIdentificationLabel 63020 | | 1 63022 | |
| | | | ID 63024 | 1 63026 | AutomaticIdentificationLabelID 63028 |

FIG. 64-1

| Package | level1 | level2 | level3 | Cardinality | Data Type Name |
|---|---|---|---|---|---|
| AutomaticIdentificationLabelPrint-ConfirmationMessage_sync 64000 | AutomaticIdentificationLabelPrint-ConfirmationMessage_sync 64002 | | | | AutomaticIdentificationLabel-PrintConfirmationMessage_sync 64004 |
| MessageHeader 64006 | | MessageHeader 64008 | | 1 64010 | |
| | | | BasicBusinessDocu-mentMessageHeader 64012 | 1 64014 | BasicBusinessDocumentMes-sageHeader 64016 |
| AutomaticIdentificationLabel 64018 | | AutomaticIdentifica-tionLabel 64020 | | 0..1 64022 | |
| | | | HexadecimalAutomaticI-dentificationLabelID 64024 | 1 64026 | AutomaticIdentificationLabelID 64028 |
| | | | DeviceID 64030 | 1 64032 | DeviceID 64034 |

FIG. 64-2

| Package | level1 | level2 | level3 | Cardinality | Data Type Name |
|---|---|---|---|---|---|
| Log 64036 | | Log 64038 | | 1 64040 | Log 64042 |

FIG. 65

| Package | level1 | level2 | level3 | Cardinality | Data Type Name |
|---|---|---|---|---|---|
| AutomaticIdentificationLabel-PrintRequestMessage_sync 65000 | AutomaticIdentificationLabel-PrintRequestMessage_sync 65002 | | | | AutomaticIdentificationLabelPrintRequest-Message_sync 65004 |
| MessageHeader 65006 | | MessageHeader 65008 | | 1 65010 | |
| | | | BasicBusinessDocu-mentMessageHeader 65012 | 1 65014 | BasicBusinessDocumentMessageHeader 65016 |
| AutomaticIdentificationLabel 65018 | | AutomaticIdentifica-tionLabel 65020 | | 1 65022 | |
| | | | HexadecimalAutomaticI-dentificationLabelID 65024 | 1 65026 | AutomaticIdentificationLabelID 65028 |
| | | | DeviceID 65030 | 1 65032 | DeviceID 65034 |

FIG. 77

| Package | level1 | level2 | level3 | Cardinality | Data Type Name |
|---|---|---|---|---|---|
| AutomaticIdentificationLabelDevice-ByElementsResponseMessage_sync 77000 | AutomaticIdentificationLabelDevice-ByElementsResponseMessage_sync 77002 | | | | AutomaticIdentificationLabelDevice-ByElementsResponseMessage_sync 77004 |
| AutomaticIdentificationLabelDevice 77006 | | AutomaticIdentifica-tionLabelDevice 77008 | | 0..N 77010 | |
| | | | ID 77012 | 1 77014 | DeviceID 77016 |
| | | | LocationID 77018 | 0..1 77020 | LocationID 77022 |
| Log 77024 | | Log 77026 | | 1 77028 | Log 77030 |

FIG. 78

| Package | level1 | level2 | level3 | Cardinality | Data Type Name |
|---|---|---|---|---|---|
| AutomaticIdentificationLabelDeviceByElementsQueryMessage_sync 78000 | AutomaticIdentificationLabelDeviceByElementsQueryMessage_sync 78002 | | | | AutomaticIdentificationLabelDeviceByElementsQueryMessage_sync 78004 |
| Selection 78006 | | AutomaticIdentificationLabelDeviceSelectionByElements 78008 | | 1 78010 | |
| | | | LocationID 78012 | 0..1 78014 | LocationID 78016 |

FIG. 79

| Package | level1 | level2 | level3 | Cardinality | Data Type Name |
|---|---|---|---|---|---|
| AutomaticIdentificationLabelDeviceByIDQueryMessage_sync 79000 | AutomaticIdentificationLabelDeviceByIDQueryMessage_sync 79002 | | | | AutomaticIdentificationLabelDeviceByIDQueryMessage_sync 79004 |
| Selection 79006 | | AutomaticIdentificationLabelDeviceSelectionByID 79008 | | 1 79010 | |
| | | | ID 79012 | 1 79014 | DeviceID 79016 |

FIG. 80

| Package | level1 | level2 | level3 | Cardinality | Data Type Name |
|---|---|---|---|---|---|
| AutomaticIdentificationLabelDeviceByIDResponseMessage_sync 80000 | AutomaticIdentificationLabelDeviceByIDResponseMessage_sync 80002 | | | | AutomaticIdentificationLabelDeviceByIDResponseMessage_sync 80004 |
| AutomaticIdentificationLabelDevice 80006 | | AutomaticIdentificationLabelDevice 80008 | | 0..1 80010 | |
| | | | ID 80012 | 1 80014 | DeviceID 80016 |
| | | | LocationID 80018 | 0..1 80020 | LocationID 80022 |
| Log 80024 | | Log 80026 | | 1 80028 | Log 80030 |

FIG. 81

| Package | level1 | level2 | level3 | Cardinality | Data Type Name |
|---|---|---|---|---|---|
| AutomaticIdentificationLabelDeviceCancelConfirmationMessage_sync 81000 | AutomaticIdentificationLabelDeviceCancelConfirmationMessage_sync 81002 | | | | AutomaticIdentificationLabelDeviceCancelConfirmationMessage_sync 81004 |
| MessageHeader 81006 | | MessageHeader 81008 | | 1 81010 | |
| | | | BasicBusinessDocumentMessageHeader 81012 | 1 81014 | BasicBusinessDocumentMessageHeader 81016 |
| AutomaticIdentificationLabelDevice 81018 | | AutomaticIdentificationLabelDevice 81020 | | 0..1 81022 | |
| | | | ID 81024 | 1 81026 | DeviceID 81028 |
| Log 81030 | | Log 81032 | | 1 81034 | Log 81036 |

FIG. 82

| Package | level1 | level2 | level3 | Cardinality | Data Type Name |
|---|---|---|---|---|---|
| AutomaticIdentificationLabelDeviceCancelRequestMessage_sync 82000 | AutomaticIdentificationLabelDeviceCancelRequestMessage_sync 82002 | | | | AutomaticIdentificationLabelDeviceCancelRequestMessage_sync 82004 |
| MessageHeader 82006 | | MessageHeader 82008 | | 1 82010 | |
| | | | BasicBusinessDocumentMessageHeader 82012 | 1 82014 | BasicBusinessDocumentMessageHeader 82016 |
| AutomaticIdentificationLabelDevice 82018 | | AutomaticIdentificationLabelDevice 82020 | | 1 82022 | |
| | | | ID 82024 | 0..1 82026 | DeviceID 82028 |

FIG. 83-1

| Package | level1 | level2 | level3 | Cardinality | Data Type Name |
|---|---|---|---|---|---|
| AutomaticIdentificationLabelDeviceChangeConfirmationMessage_sync 83000 | AutomaticIdentificationLabelDeviceChangeConfirmationMessage_sync 83002 | | | | AutomaticIdentificationLabelDeviceChangeConfirmationMessage_sync 83004 |
| MessageHeader 83006 | | MessageHeader 83008 | | 1 83010 | |
| | | | BasicBusinessDocumentMessageHeader 83012 | 1 83014 | BasicBusinessDocumentMessageHeader 83016 |
| AutomaticIdentificationLabelDevice 83018 | | AutomaticIdentificationLabelDevice 83020 | | 0..1 83022 | |
| | | | ID 83024 | 1 83026 | DeviceID 83028 |
| | | | LocationID 83030 | 0..1 83032 | LocationID 83034 |

| Package | level1 | level2 | level3 | Cardinality | Data Type Name |
| --- | --- | --- | --- | --- | --- |
| Log 83036 | | Log 83038 | | 1 83040 | Log 83042 |

| Package | level1 | level2 | level3 | Cardinality | Data Type Name |
|---|---|---|---|---|---|
| AutomaticIdentificationLabelDeviceChangeRequestMessage_sync 84000 | AutomaticIdentificationLabelDeviceChangeRequestMessage_sync 84002 | | | | AutomaticIdentificationLabelDeviceChangeRequestMessage_sync 84004 |
| MessageHeader 84006 | | MessageHeader 84008 | | 1 84010 | |
| | | | BasicBusinessDocumentMessageHeader 84012 | 1 84014 | BasicBusinessDocumentMessageHeader 84016 |
| AutomaticIdentificationLabelDevice 84018 | | AutomaticIdentificationLabelDevice 84020 | | 1 84022 | |
| | | | ID 84024 | 1 84026 | DeviceID 84028 |
| | | | LocationID 84030 | 0..1 84032 | LocationID 84034 |

FIG. 85-1

| Package | level1 | level2 | level3 | Cardinality | Data Type Name |
|---|---|---|---|---|---|
| AutomaticIdentificationLabelDeviceCreateConfirmationMessage_sync 85000 | AutomaticIdentificationLabelDeviceCreateConfirmationMessage_sync 85002 | | | | AutomaticIdentificationLabelDeviceCreateConfirmationMessage_sync 85004 |
| MessageHeader 85006 | | MessageHeader 85008 | | 1 85010 | |
| | | | BasicBusinessDocumentMessageHeader 85012 | 1 85014 | BasicBusinessDocumentMessageHeader 85016 |
| AutomaticIdentificationLabelDevice 85018 | | AutomaticIdentificationLabelDevice 85020 | | 0..1 85022 | |
| | | | ID 85024 | 1 85026 | DeviceID 85028 |
| | | | LocationID 85030 | 0..1 85032 | LocationID 85034 |

FIG. 85-2

| Package | level1 | level2 | level3 | Cardinality | Data Type Name |
|---|---|---|---|---|---|
| Log 85036 | | Log 85038 | | 1 85040 | Log 85042 |

FIG. 86

| Package | level1 | level2 | level3 | Cardinality | Data Type Name |
|---|---|---|---|---|---|
| AutomaticIdentificationLabelDeviceCreateRequestMessage_sync 86000 | AutomaticIdentificationLabelDeviceCreateRequestMessage_sync 86002 | | | | AutomaticIdentificationLabelDeviceCreateRequestMessage_sync 86004 |
| MessageHeader 86006 | | MessageHeader 86008 | | 1 86010 | |
| | | | BasicBusinessDocumentMessageHeader 86012 | 1 86014 | BasicBusinessDocumentMessageHeader 86016 |
| AutomaticIdentificationLabelDevice 86018 | | AutomaticIdentificationLabelDevice 86020 | | 1 86022 | |
| | | | ID 86024 | 1 86026 | DeviceID 86028 |
| | | | LocationID 86030 | 0..1 86032 | LocationID 86034 |

FIG. 92

| Package | level1 | level2 | level3 | Cardinality | Data Type Name |
|---|---|---|---|---|---|
| AutomaticIdentificationLabelDeviceObservationByElementsQueryMessage_sync 92000 | AutomaticIdentificationLabelDeviceObservationByElementsQueryMessage_sync 92002 | | | | AutomaticIdentificationLabelDeviceObservationByElementsQueryMessage_sync 92004 |
| Selection 92006 | | AutomaticIdentificationLabelDeviceObservationSelectionByElements 92008 | | 1 92010 | |
| | | | DeviceID 92012 | 0..1 92014 | DeviceID 92016 |
| | | | CreationDateTimePeriod 92018 | 0..1 92020 | UPPEROPEN_GLOBAL_DateTimePeriod 92022 |
| | | | LabelID 92024 | 0..N 92026 | AutomaticIdentificationLabelID 92028 |

FIG. 93

| Package | level1 | level2 | level3 | level4 | Cardinality | Data Type Name |
|---|---|---|---|---|---|---|
| AutomaticIdentificationLabelDeviceObservationByElements-ResponseMessage_sync 93000 | AutomaticIdentificationLabelDeviceObservationByElements-ResponseMessage_sync 93002 | | | | | AutomaticIdentificationLabelDeviceObservationByElements-ResponseMessage_sync 93004 |
| AutomaticIdentificationLa-belDeviceObservation 93006 | | AutomaticIdentificationLa-belDeviceObservation 93008 | | | 0..N 93010 | |
| | | | DeviceID 93012 | | 1 93014 | DeviceID 93016 |
| | | | AutomaticIdentifica-tionLabel 93018 | | 1..N 93020 | |
| | | | | ID 93022 | 1 93024 | AutomaticIdentificationLabelID 93026 |
| Log 93028 | | Log 93030 | | | 1 93032 | Log 93034 |

FIG. 94-1

| Package | level1 | level2 | level3 | level4 | Cardinality | Data Type Name |
|---|---|---|---|---|---|---|
| AutomaticIdentificationLabelDeviceObservationCreate-ConfirmationMessage_sync 94000 | AutomaticIdentificationLabelDeviceObservationCreate-ConfirmationMessage_sync 94002 | | | | | AutomaticIdentificationLabelDeviceObservationCreateConfir-mationMessage_sync 94004 |
| MessageHeader 94006 | | MessageHeader 94008 | | | 1 94010 | |
| | | | BasicBusinessDocu-mentMessageHeader 94012 | | 1 94014 | BasicBusinessDocumentMes-sageHeader 94016 |
| AutomaticIdentificationLa-belDeviceObservation 94018 | | AutomaticIdentificationLa-belDeviceObservation 94020 | | | 0..1 94022 | |
| | | | DeviceID 94024 | | 1 94026 | DeviceID 94028 |

FIG. 94-2

| Package | level1 | level2 | level3 | level4 | Cardinality | Data Type Name |
|---|---|---|---|---|---|---|
| | | | AutomaticIdentifica-tionLabel 94030 | | 1..N 94032 | |
| | | | | ID 94034 | 1 94036 | AutomaticIdentificationLabelID 94038 |
| Log 94040 | | Log 94042 | | | 1 94044 | Log 94046 |

FIG. 95-1

| Package | level1 | level2 | level3 | level4 | Cardinality | Data Type Name |
|---|---|---|---|---|---|---|
| AutomaticIdentificationLabelDeviceObservationCreateRequestMessage_sync 95000 | AutomaticIdentificationLabelDeviceObservationCreateRequestMessage_sync 95002 | | | | | AutomaticIdentificationLabelDeviceObservationCreateRequestMessage_sync 95004 |
| MessageHeader 95006 | | MessageHeader 95008 | | | 1 95010 | |
| | | | BasicBusinessDocumentMessageHeader 95012 | | 1 95014 | BasicBusinessDocumentMessageHeader 95016 |
| AutomaticIdentificationLabelDeviceObservation 95018 | | AutomaticIdentificationLabelDeviceObservation 95020 | | | 1 95022 | |
| | | | DeviceID 95024 | | 1 95026 | DeviceID 95028 |
| | | | AutomaticIdentificationLabel 95030 | | 1..N 95032 | |

FIG. 95-2

| Package | level1 | level2 | level3 | level4 | Cardinality | Data Type Name |
|---|---|---|---|---|---|---|
| | | | | ID 95034 | 1 95036 | AutomaticIdentificationLabe-lID 95038 |

MANAGING CONSISTENT INTERFACES FOR AUTOMATIC IDENTIFICATION LABEL BUSINESS OBJECTS ACROSS HETEROGENEOUS SYSTEMS

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, software automatically identifies labels. The software comprises computer readable instructions embodied on tangible media. The software executes in a landscape of computer systems providing message-based services. The software invokes an automatic identification label business object. The business object is a logically centralized, semantically disjointed object for a label that can be automatically identified. The business object comprises data logically organized as an automatic identification label root node. The software initiates transmission of a message to a heterogeneous second application, executing in the environment of computer systems providing message-based services, based on the data in the automatic identification label business object. The message comprises an automatic identification label create request message entity, a message header package and an automatic identification label package.

In a second aspect, software automatically identifies labels. The software comprises computer readable instructions embodied on tangible media. The software executes in a landscape of computer systems providing message-based services. The software initiates transmission of a message to a heterogeneous second application, executing in the environment of computer systems providing message-based services, based on data in an automatic identification label business object invoked by the second application. The business object is a logically centralized, semantically disjointed object for a label that can be automatically identified. The business object comprises data logically organized as an automatic identification label root node. The message comprises comprising an automatic identification label create request message entity, a message header package and an automatic identification label package. The software receives a second message from the second application. The second message is associated with the invoked automatic identification label business object and is in response to the first message.

In a third aspect, a distributed system operates in a landscape of computer systems providing message-based services. The system processes business objects involving automatically identifying labels. The system comprises memory and a graphical user interface remote from the memory. The memory stores a business object repository storing a plurality of business objects. Each business object is a logically centralized, semantically disjointed object of a particular business object type. At least one of the business objects is for a label that can be automatically identified. The business object comprises data logically organized as an automatic identification label root node. The graphical user interface presents data associated with an invoked instance of the automatic identification label business object, the interface comprising computer readable instructions embodied on tangible media.

In a fourth aspect, software creates, updates and retrieves a logical device which is used to read and print automatically identifiable labels. The software comprises computer readable instructions embodied on tangible media. The software executes in a landscape of computer systems providing message-based services. The software invokes an automatic identification label device business object. The business object is a logically centralized, semantically disjointed object for a logical device which is used to read and print automatically identifiable labels. The business object comprises data logically organized as an automatic identification label device root node. The software initiates transmission of a message to a heterogeneous second application, executing in the environment of computer systems providing message-based services, based on the data in the automatic identification label device business object. The message comprises an automatic identification label device create request message entity, a message header package and an automatic identification label device package.

In a fifth aspect, software creates, updates and retrieves a logical device which is used to read and print automatically identifiable labels. The software comprises computer readable instructions embodied on tangible media. The software executes in a landscape of computer systems providing message-based services. The software initiates transmission of a message to a heterogeneous second application, executing in the environment of computer systems providing message-based services, based on data in an automatic identification label device business object invoked by the second application. The business object is a logically centralized, semantically disjointed object for a logical device which is used to read and print automatically identifiable labels. The business object comprises data logically organized as an automatic identification label device root node. The message comprises an automatic identification label device create request message entity, a message header package and an automatic identification label device package. The software receives a second message from the second application. The second message is associated with the invoked automatic identification label device business object and is in response to the first message.

In a sixth aspect, a distributed system operates in a landscape of computer systems providing message-based services. The system processes business objects involving creating, updating and retrieving a logical device which is used to read and print automatically identifiable labels. The system comprises memory and a graphical user interface remote from the memory. The memory stores a business object repository storing a plurality of business objects. Each business object is a logically centralized, semantically disjointed object of a particular business object type. At least one of the business objects is for a logical device which is used to read and print automatically identifiable labels. The business object comprises data logically organized as an automatic identification label device root node. The graphical user interface presents data associated with an invoked instance of the automatic identification label device business object, the interface comprising computer readable instructions embodied on tangible media.

In a seventh aspect, software handles observations of devices to read and print automatically identifiable labels. The software comprises computer readable instructions embodied on tangible media. The software executes in a landscape of computer systems providing message-based services. The software invokes an automatic identification label device observation business object. The business object is a logically centralized, semantically disjointed object for observations of devices to read and print automatically identifiable labels. The business object comprises data logically organized as an automatic identification label device observation root node and an automatic identification label subordinate node. The software initiates transmission of a message to a heterogeneous second application, executing in the environment of computer systems providing message-based services, based on the data in the automatic identification label device observation business object. The message comprises an automatic identification label device observation create request message entity, a message header package and an automatic identification label device observation package.

In an eighth aspect, software handles observations of devices to read and print automatically identifiable labels. The software comprises computer readable instructions embodied on tangible media. The software executes in a landscape of computer systems providing message-based services. The software initiates transmission of a message to a heterogeneous second application, executing in the environment of computer systems providing message-based services, based on data in an automatic identification label device observation business object invoked by the second application. The business object is a logically centralized, semantically disjointed object for observations of devices to read and print automatically identifiable labels. The business object comprises data logically organized as an automatic identification label device observation root node and an automatic identification label subordinate node. The message comprises an automatic identification label device observation create request message entity, a message header package and an automatic identification label device observation package. The software receives a second message from the second application. The second message is associated with the invoked automatic identification label device observation business object and is in response to the first message.

In a ninth aspect, a distributed system operates in a landscape of computer systems providing message-based services. The system processes business objects involving observations of devices to read and print automatically identifiable labels. The system comprises memory and a graphical user interface remote from the memory. The memory stores a business object repository storing a plurality of business objects. Each business object is a logically centralized, semantically disjointed object of a particular business object type. At least one of the business objects is for observations of devices to read and print automatically identifiable labels. The business object comprises data logically organized as an automatic identification label device observation root node and an automatic identification label subordinate node. The graphical user interface presents data associated with an invoked instance of the automatic identification label device observation business object, the interface comprising computer readable instructions embodied on tangible media.

BRIEF DESCRIPTION OF THE DRAWINGS

FIGS. 27A-E depict a hierarchization process in accordance with methods and systems consistent with the subject matter described herein.

FIG. 49 shows an exemplary AutomaticIdentificationLabelDeviceByElementsResponse_sync Element Structure.

FIG. 50 shows an exemplary AutomaticIdentificationLabelByElementsQuery_sync Element Structure.

FIGS. 51-1 through 51-2 show an exemplary AutomaticIdentificationLabelByElementsResponse_sync Element Structure.

FIG. 52 shows an exemplary AutomaticIdentificationLabelByIDQuery_sync Element Structure.

FIGS. 53-1 through 53-2 show an exemplary AutomaticIdentificationLabelByIDResponse_sync Element Structure.

FIG. 54 shows an exemplary AutomaticIdentificationLabelCancelConfirmation_sync Element Structure.

FIG. 55 shows an exemplary AutomaticIdentificationLabelCancelRequest_sync Element Structure.

FIGS. 56-1 through 56-2 show an exemplary AutomaticIdentificationLabelChangeConfirmation_sync Element Structure.

FIGS. 57-1 through 57-2 show an exemplary AutomaticIdentificationLabelChangeRequest_sync Element Structure.

FIGS. 58-1 through 58-2 show an exemplary AutomaticIdentificationLabelCreateConfirmation_sync Element Structure.

FIGS. 59-1 through 59-2 show an exemplary AutomaticIdentificationLabelCreateRequest_sync Element Structure.

FIGS. 60-1 through 60-2 show an exemplary AutomaticIdentificationLabelDecodeConfirmation_sync Element Structure.

FIG. 61 shows an exemplary AutomaticIdentificationLabelDecodeRequest_sync Element Structure.

FIGS. 62-1 through 62-2 show an exemplary AutomaticIdentificationLabelEncodeConfirmation_sync Element Structure.

FIG. 63 shows an exemplary AutomaticIdentificationLabelEncodeRequest_sync Element Structure.

FIGS. 64-1 through 64-2 show an exemplary AutomaticIdentificationLabelPrintConfirmation_sync Element Structure.

FIG. 65 shows an exemplary AutomaticIdentificationLabelPrintRequest_sync Element Structure.

FIG. 77 shows an exemplary AutomaticIdentificationLabelDeviceByElementsResponse_sync Element Structure.

FIG. 78 shows an exemplary AutomaticIdentificationLabelDeviceByElementsQuery_sync Element Structure.

FIG. 79 shows an exemplary AutomaticIdentificationLabelDeviceByIDQuery_sync Element Structure.

FIG. 80 shows an exemplary AutomaticIdentificationLabelDeviceByIDResponse_sync Element Structure.

FIG. 81 shows an exemplary AutomaticIdentificationLabelDeviceCancelConfirmation_sync Element Structure.

FIG. 82 shows an exemplary AutomaticIdentificationLabelDeviceCancelRequest_sync Element Structure.

FIGS. 83-1 through 83-2 show an exemplary AutomaticIdentificationLabelDeviceChangeConfirmation_sync Element Structure.

FIG. 84 shows an exemplary AutomaticIdentificationLabelDeviceChangeRequest_sync Element Structure.

FIGS. 85-1 through 85-2 show an exemplary AutomaticIdentificationLabelDeviceCreateConfirmation_sync Element Structure.

FIG. 86 shows an exemplary AutomaticIdentificationLabelDeviceCreateRequest_sync Element Structure.

FIG. 92 shows an exemplary AutomaticIdentificationLabelDeviceObservationByElementsQuery_sync Element Structure.

FIG. 93 shows an exemplary AutomaticIdentificationLabelDeviceObservationByElementsResponse_sync Element Structure.

FIGS. 94-1 through 94-2 show an exemplary AutomaticIdentificationLabelDeviceObservationCreateConfirmation_sync Element Structure.

FIGS. 95-1 through 95-2 show an exemplary AutomaticIdentificationLabelDeviceObservationCreateRequest_sync Element Structure.

DETAILED DESCRIPTION

Overview

Figure 1:
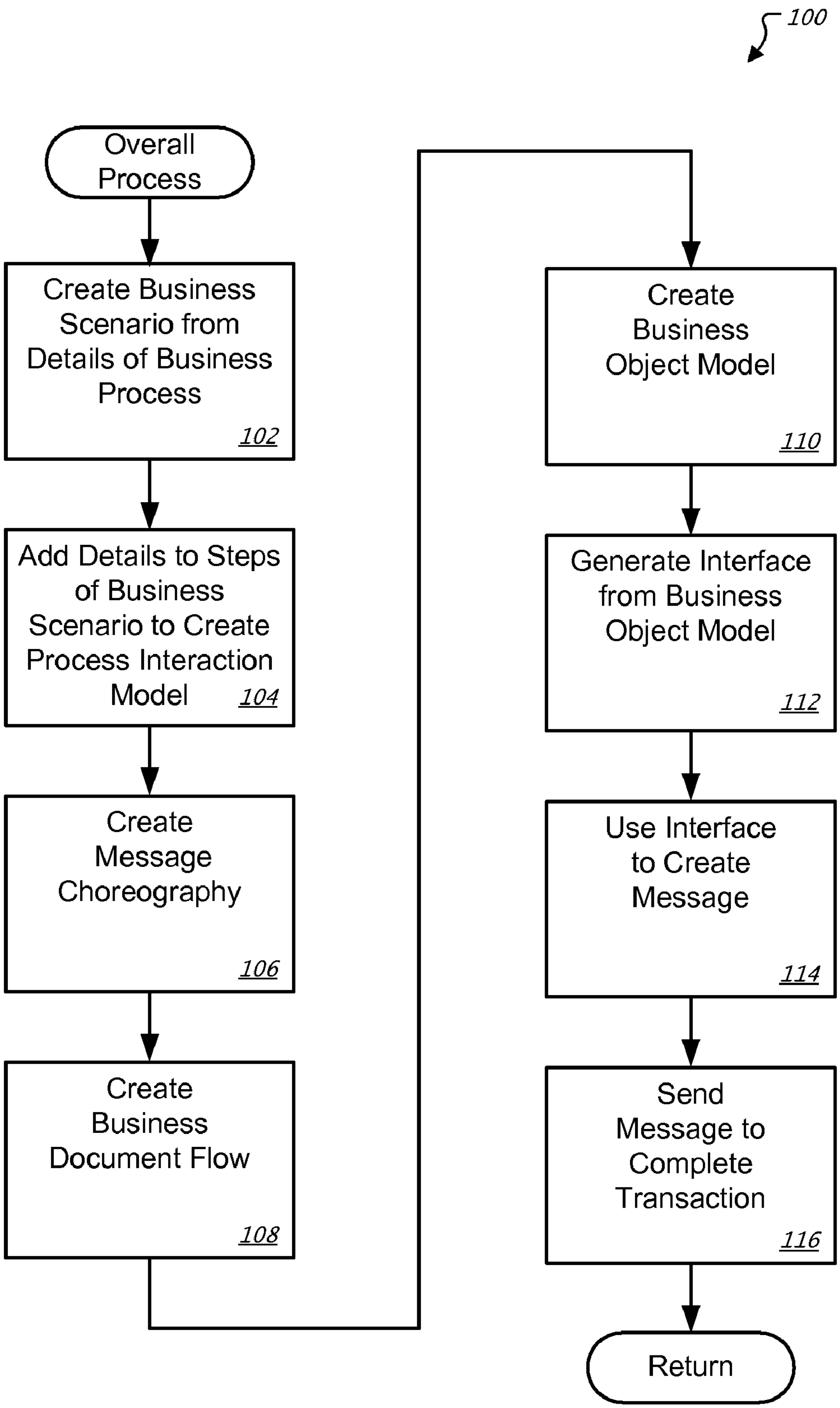
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a “create”, “update”, or “delete” of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
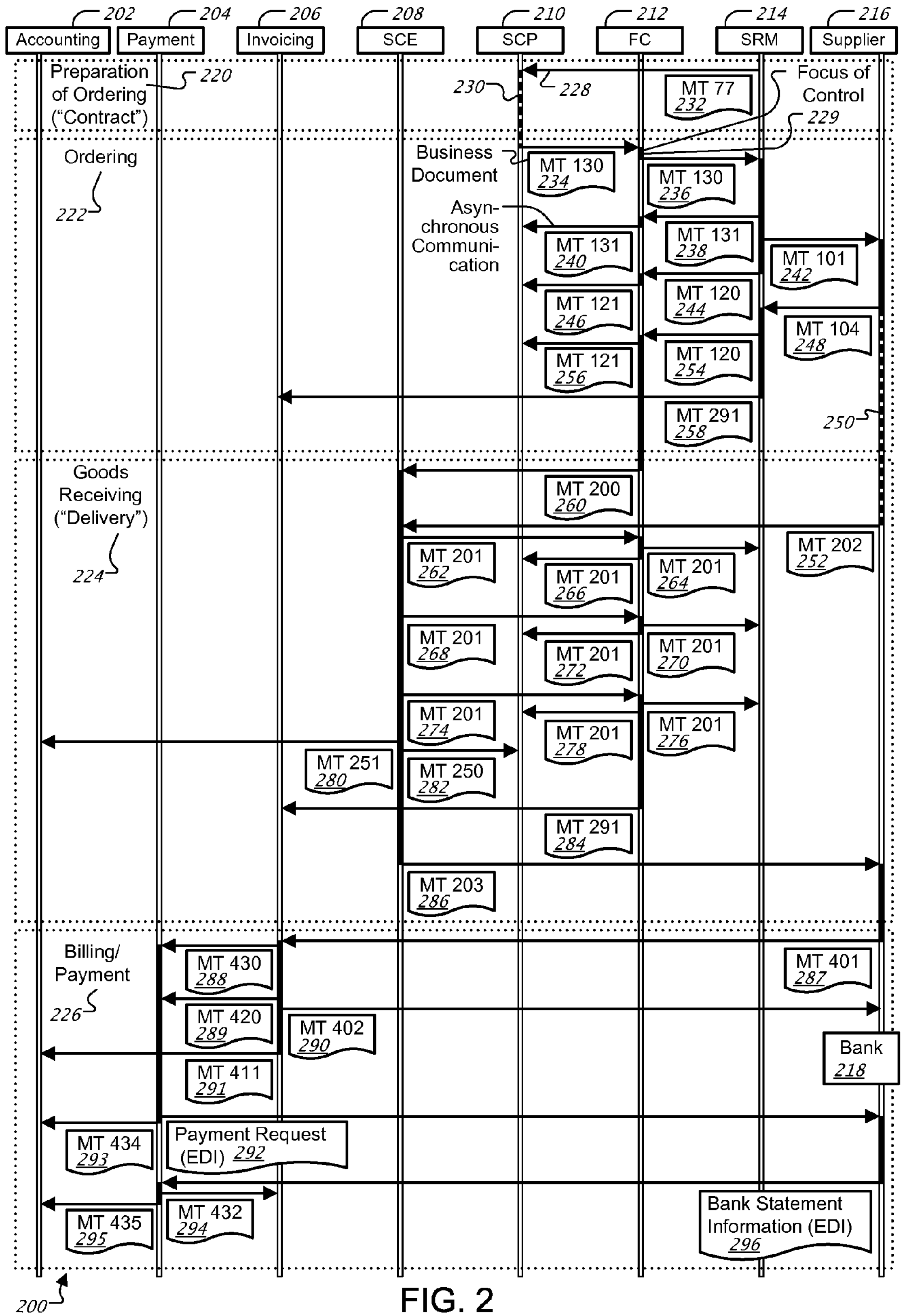
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
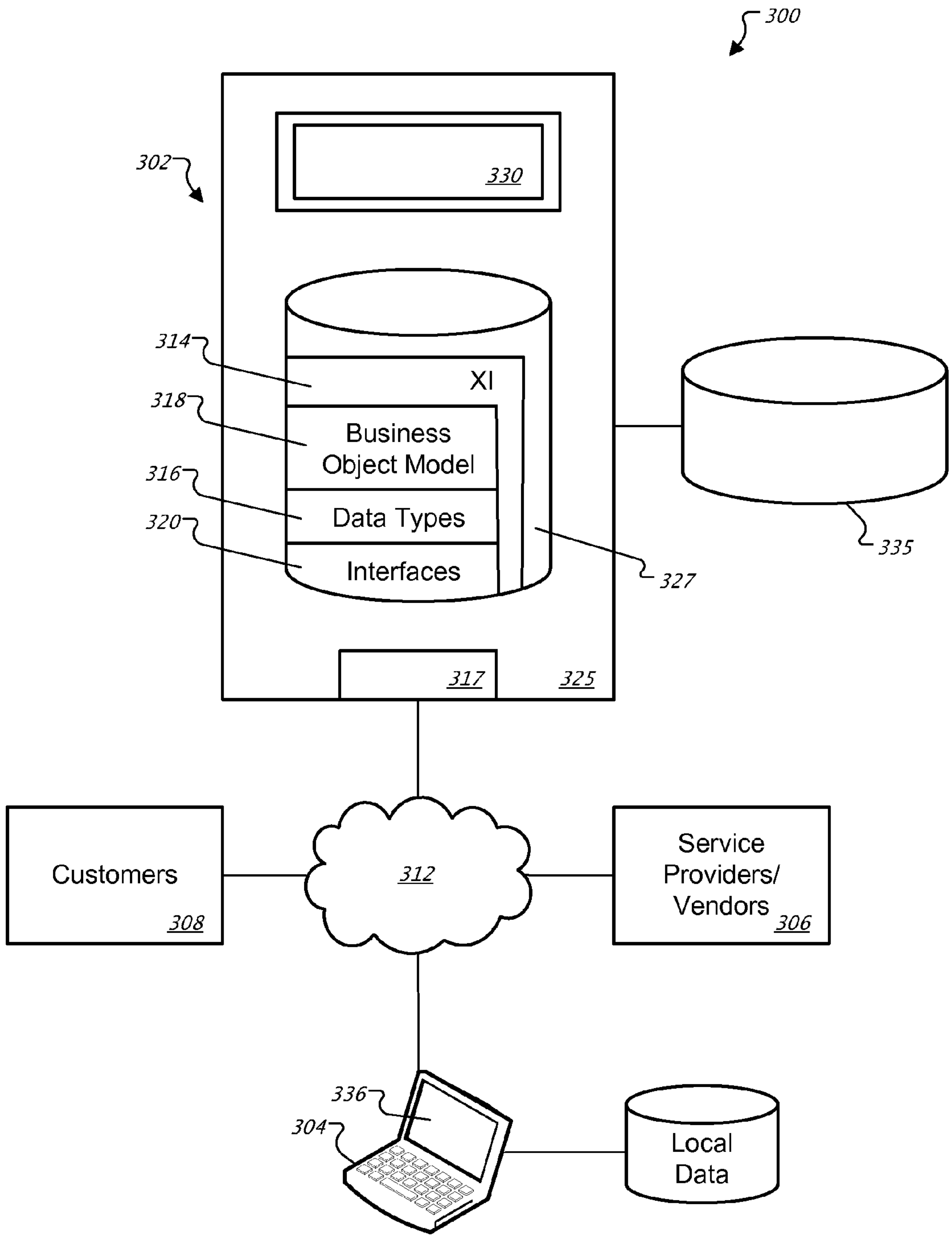
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
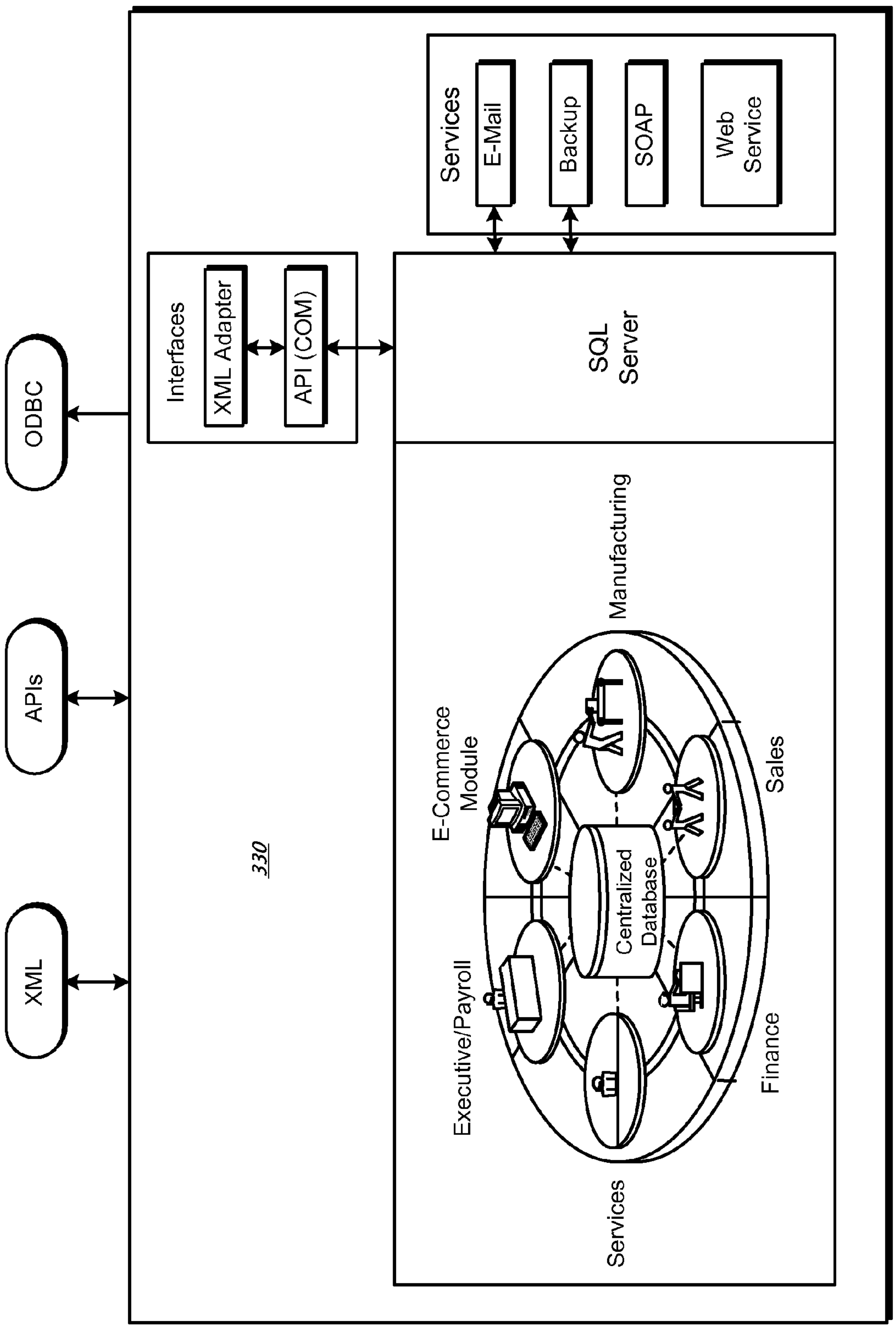
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
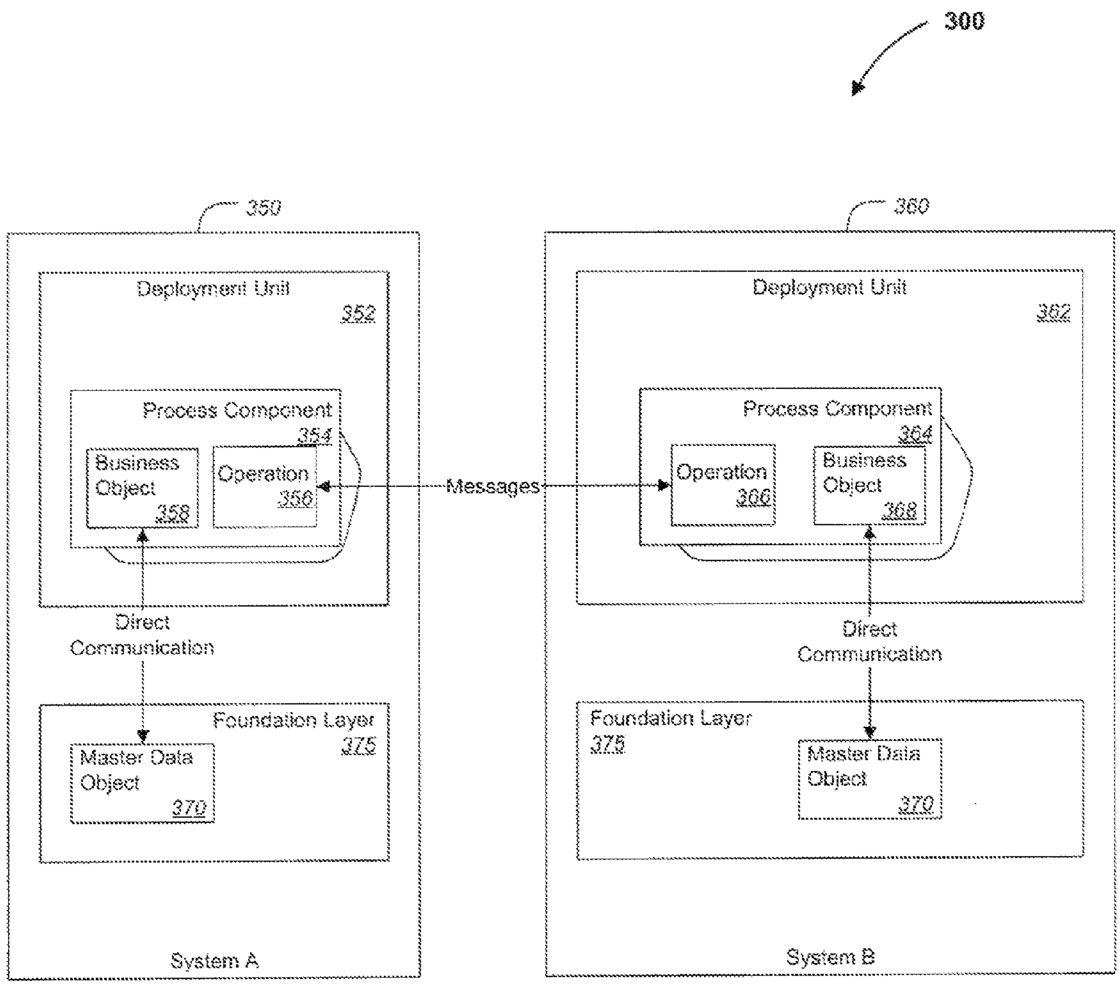

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
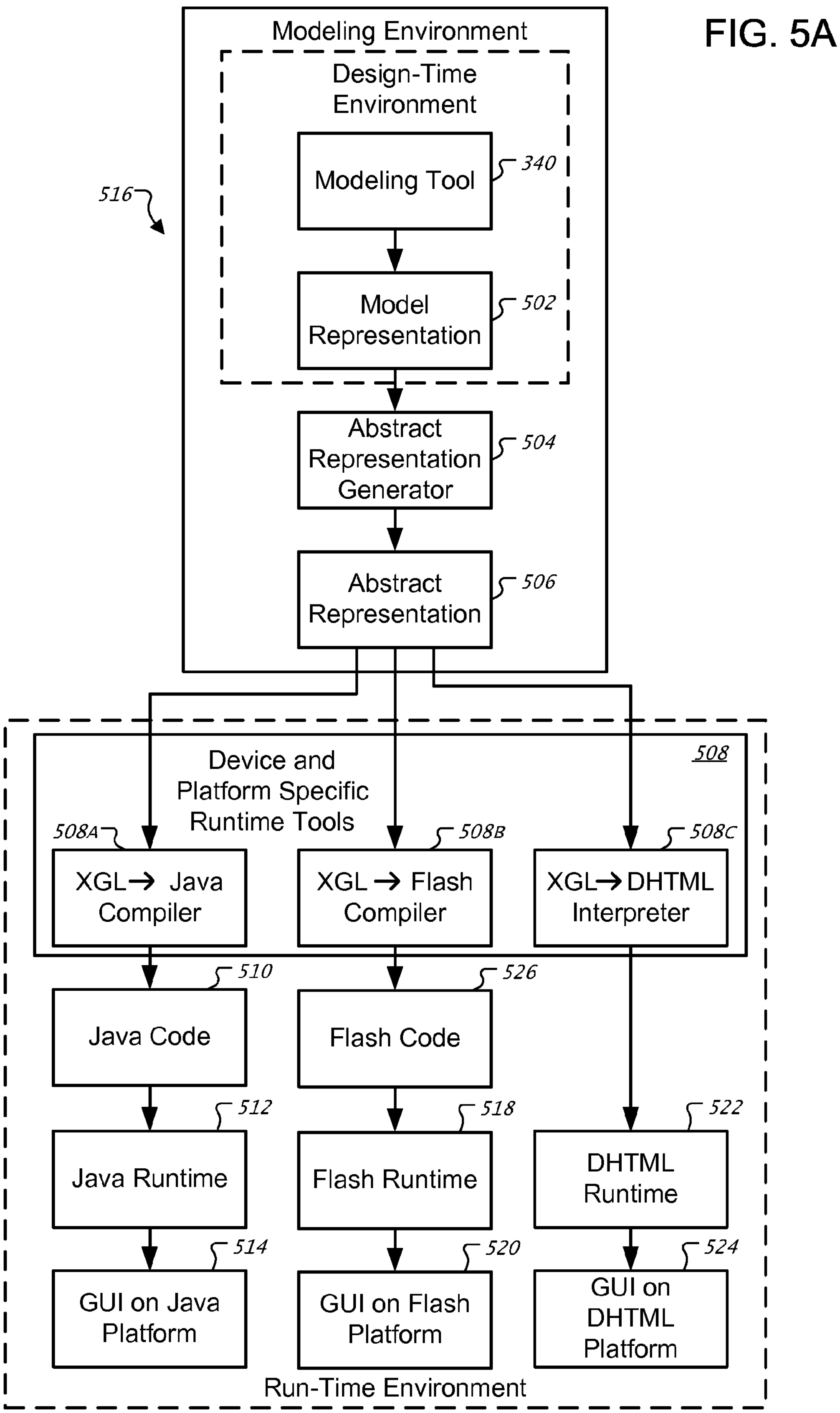
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
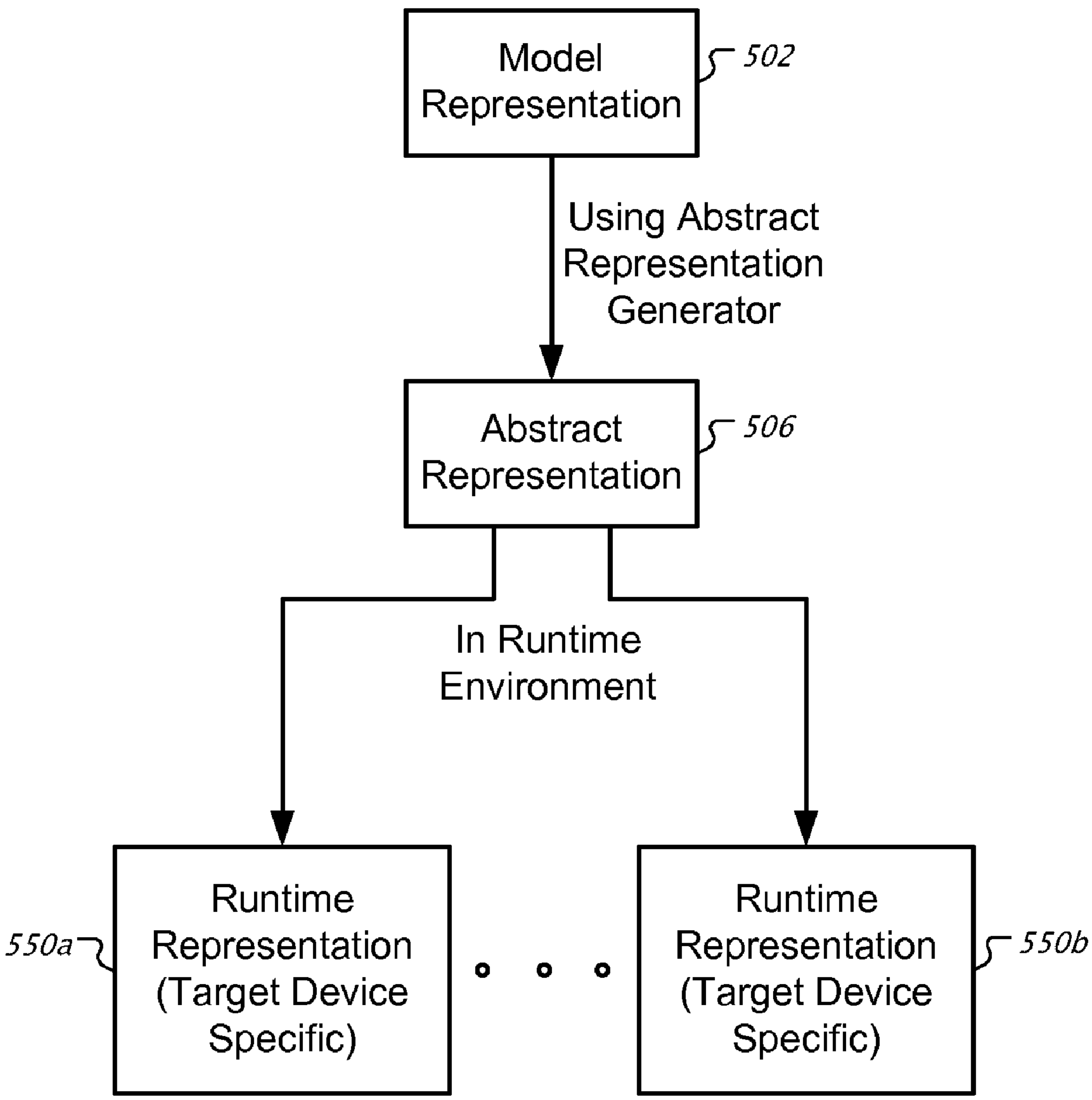
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

Message Overview

To perform an end-to-end business transaction, consistent interfaces are used to create business documents that are sent within messages between heterogeneous programs or modules.

Message Categories

Figure 6:
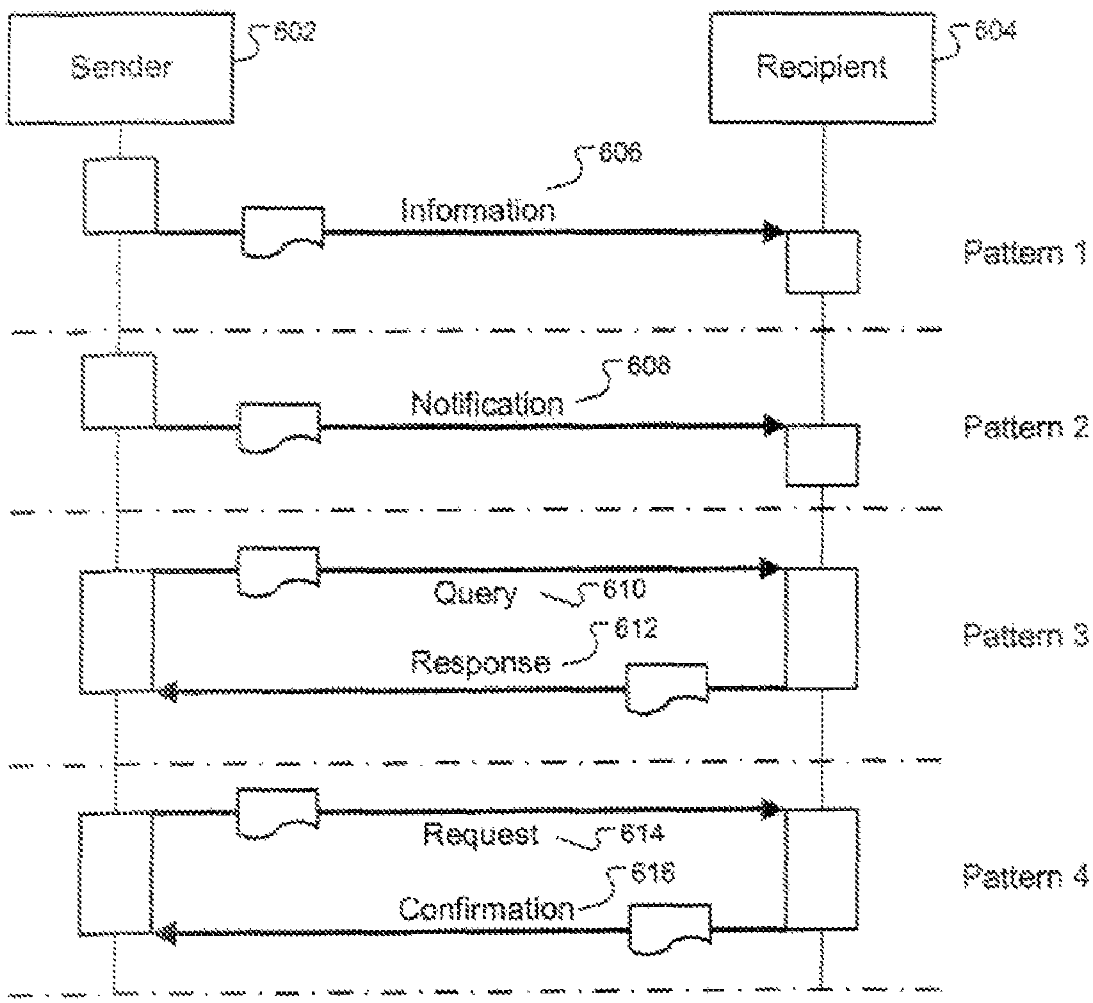
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

Packages

Packages group the entities in the business object model and the resulting interfaces into groups of semantically associated information. Packages also may include "sub"-packages, i.e., the packages may be nested.

Figure 7:
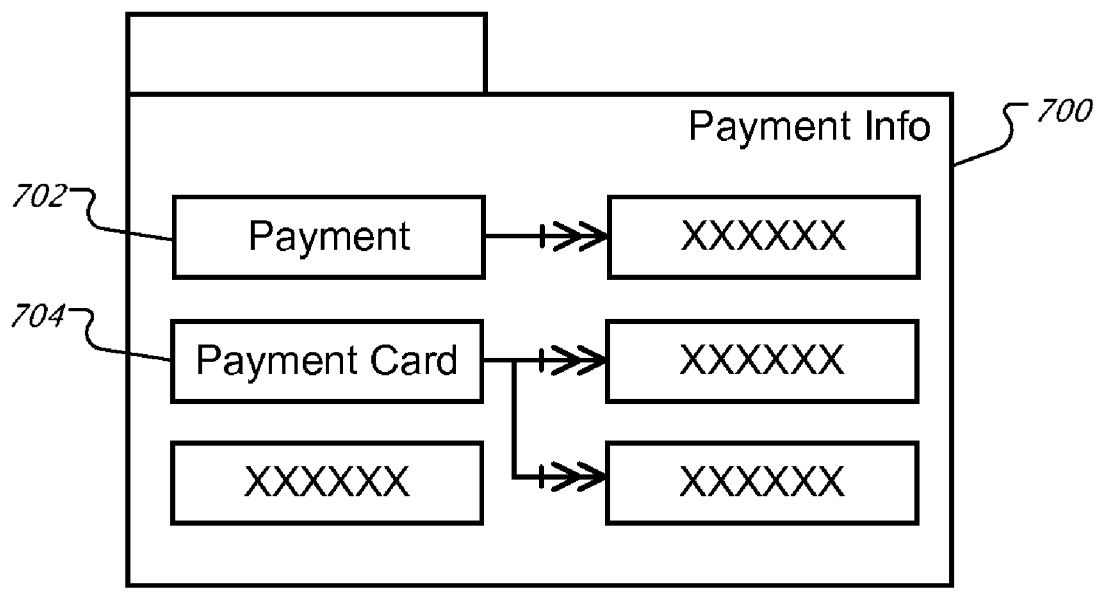
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
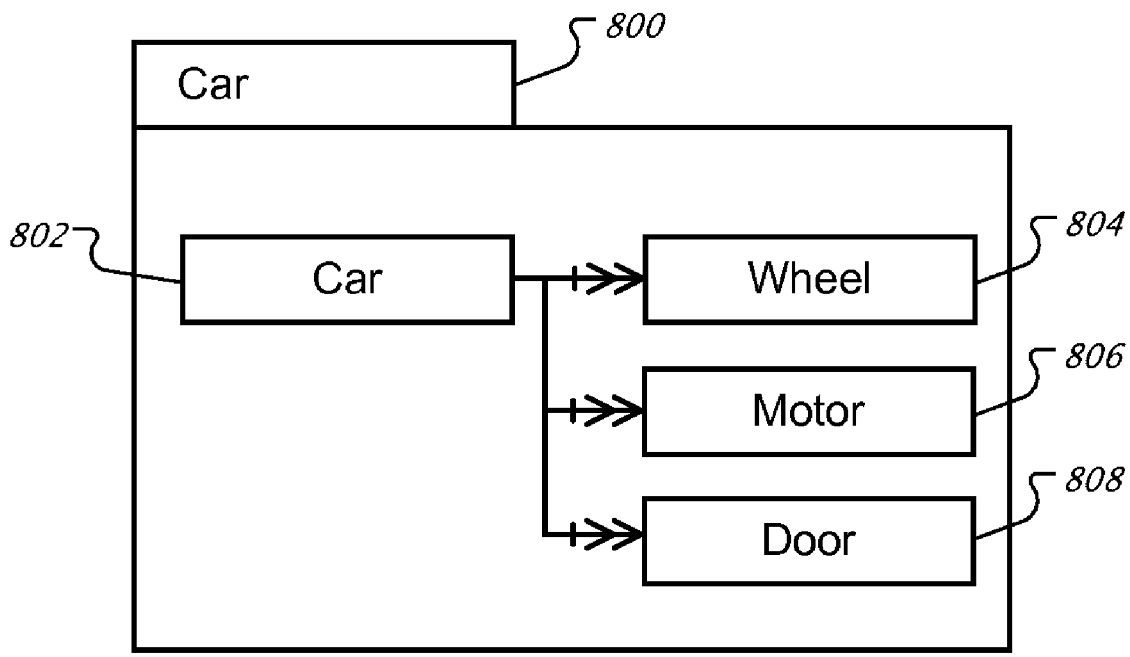
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
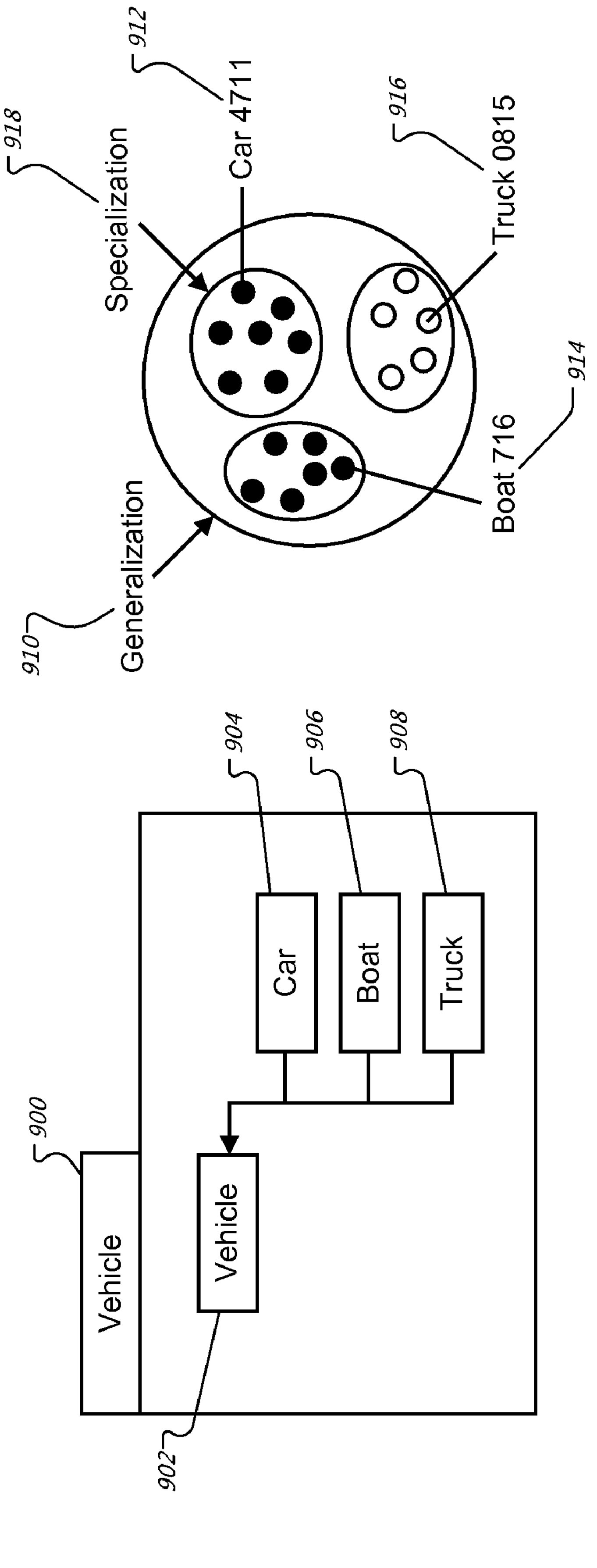
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
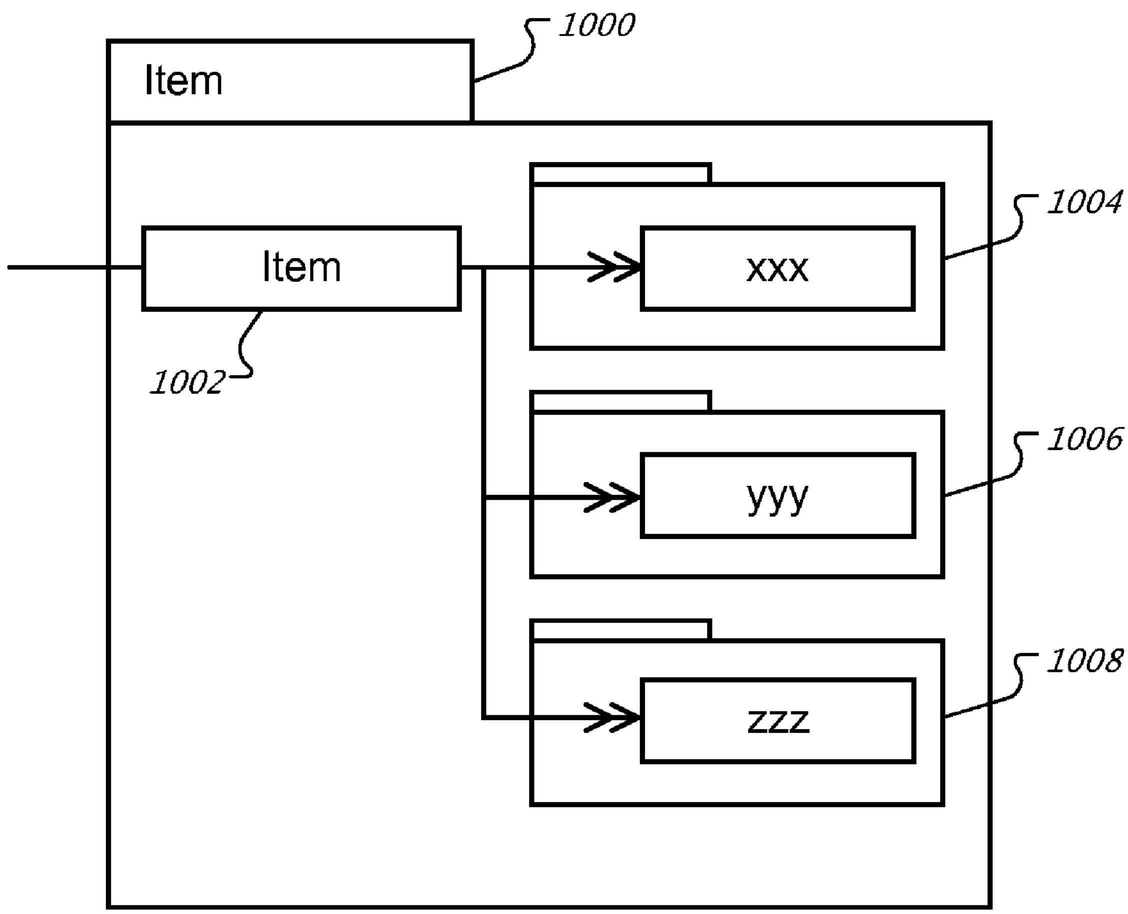
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
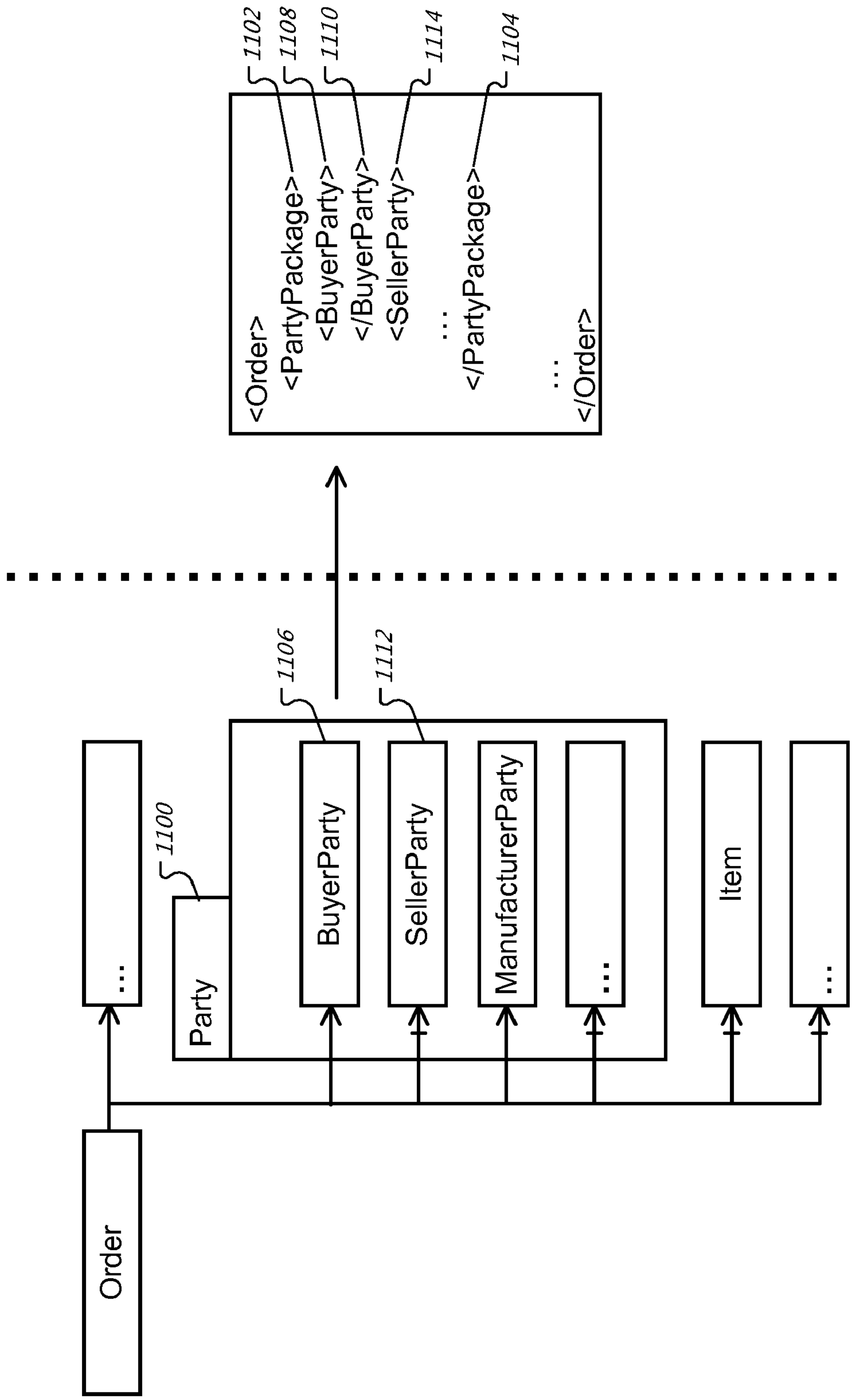
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

Relationships

Relationships describe the interdependencies of the entities in the business object model, and are thus an integral part of the business object model.

Cardinality of Relationships

Figure 12:
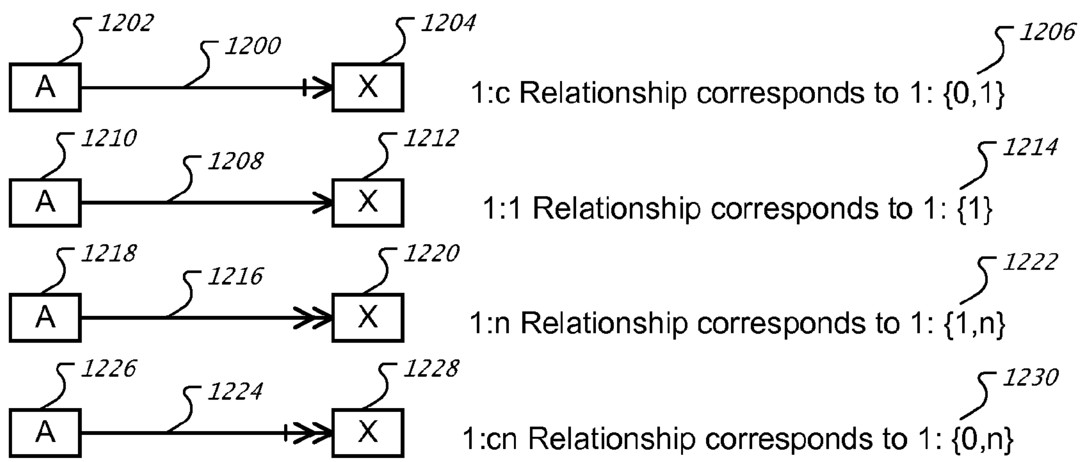
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

Types of Relationships

Composition

Figure 13:
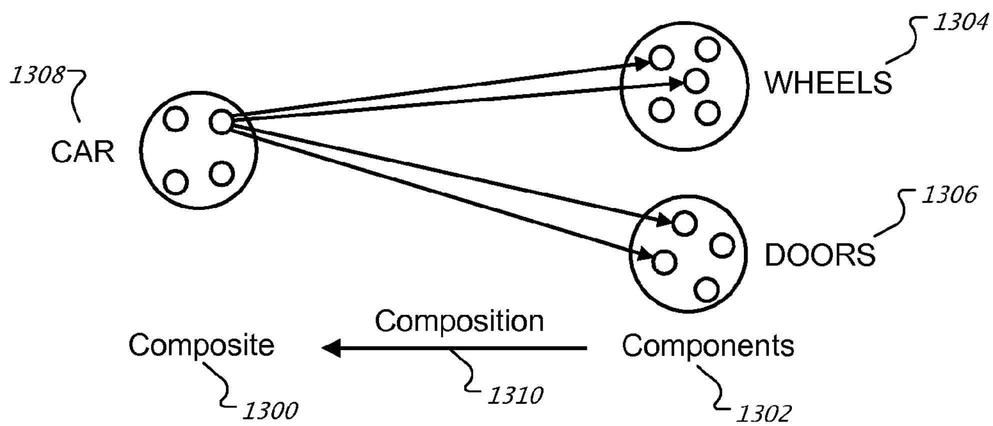
FIG. 13 depicts an example of a composition in accordance with methods and systems consistent with the subject matter described herein.
Figure 14:
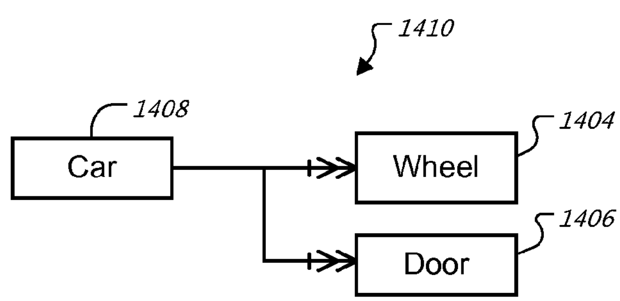
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

Aggregation

Figure 15:
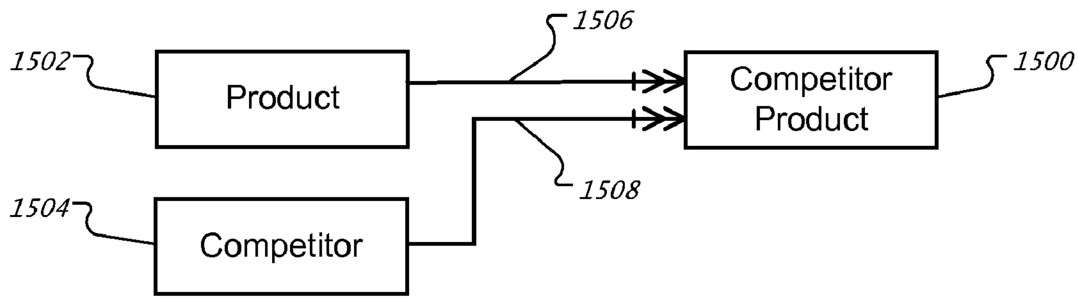
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

Association

Figure 16:
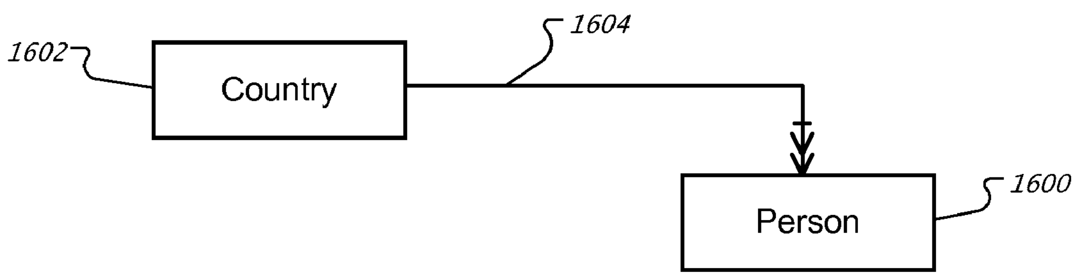
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

Specialization

Figure 17:
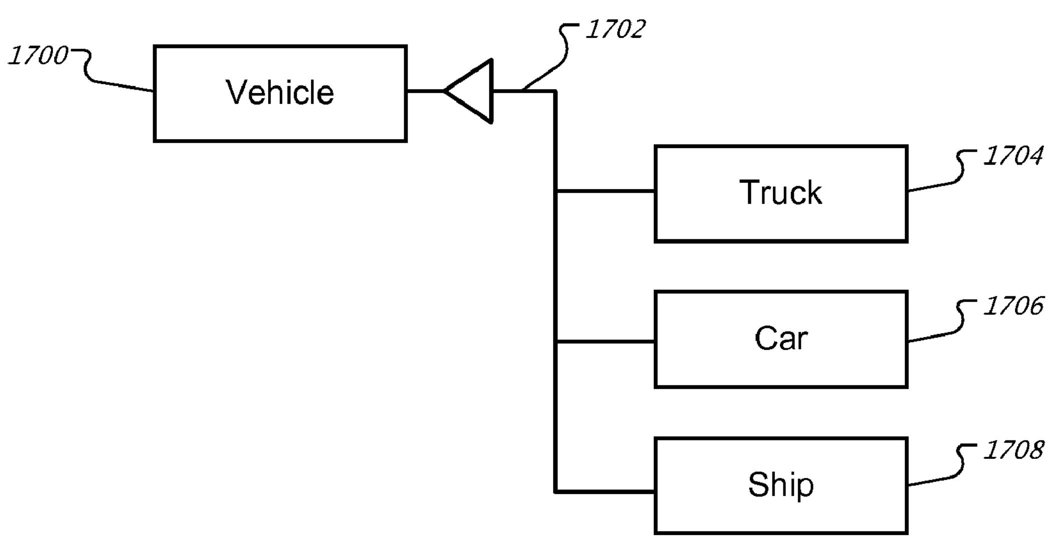
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
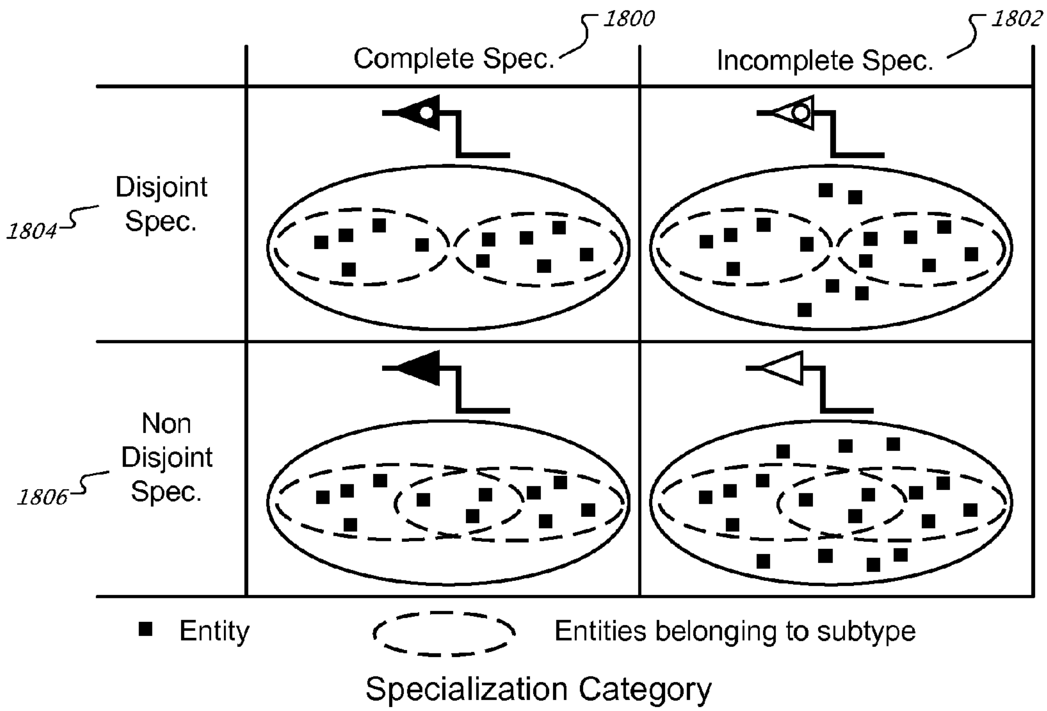
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

Structural Patterns

Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

Hierarchy

Figure 19:
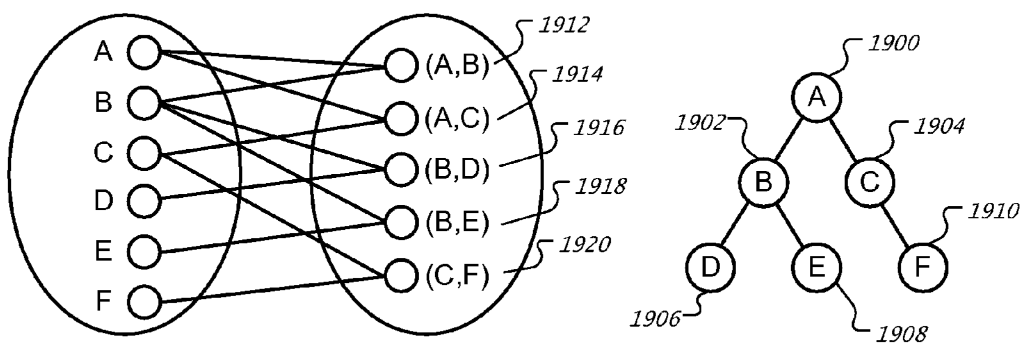
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
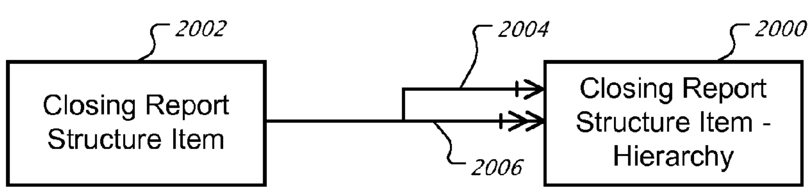
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

Creation of the Business Object Model

Figure 21A:
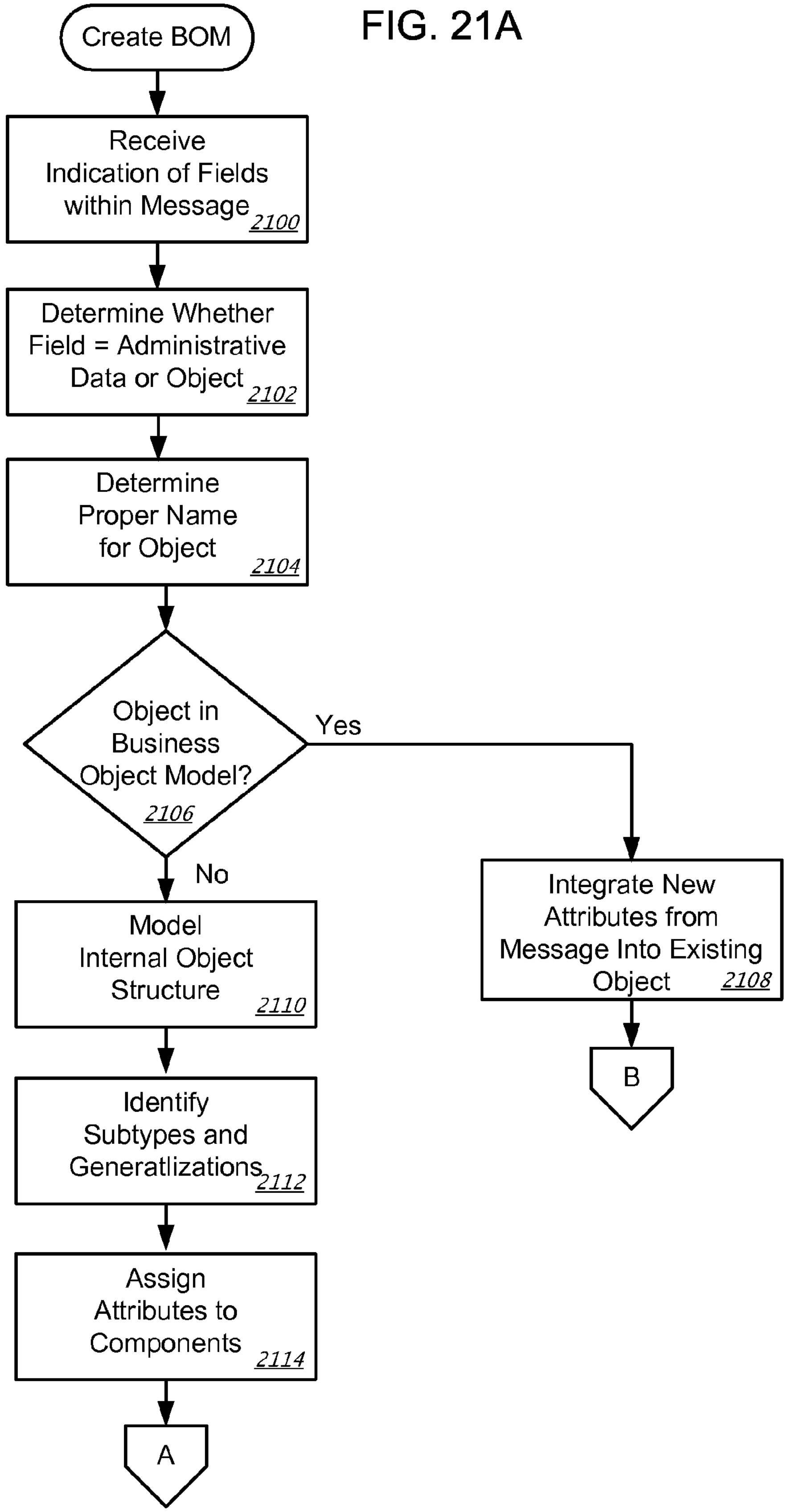
FIGS. 21A-B depict a flow diagram of the steps performed to create a business object model in accordance with methods and systems consistent with the subject matter described herein.
Figure 21B:
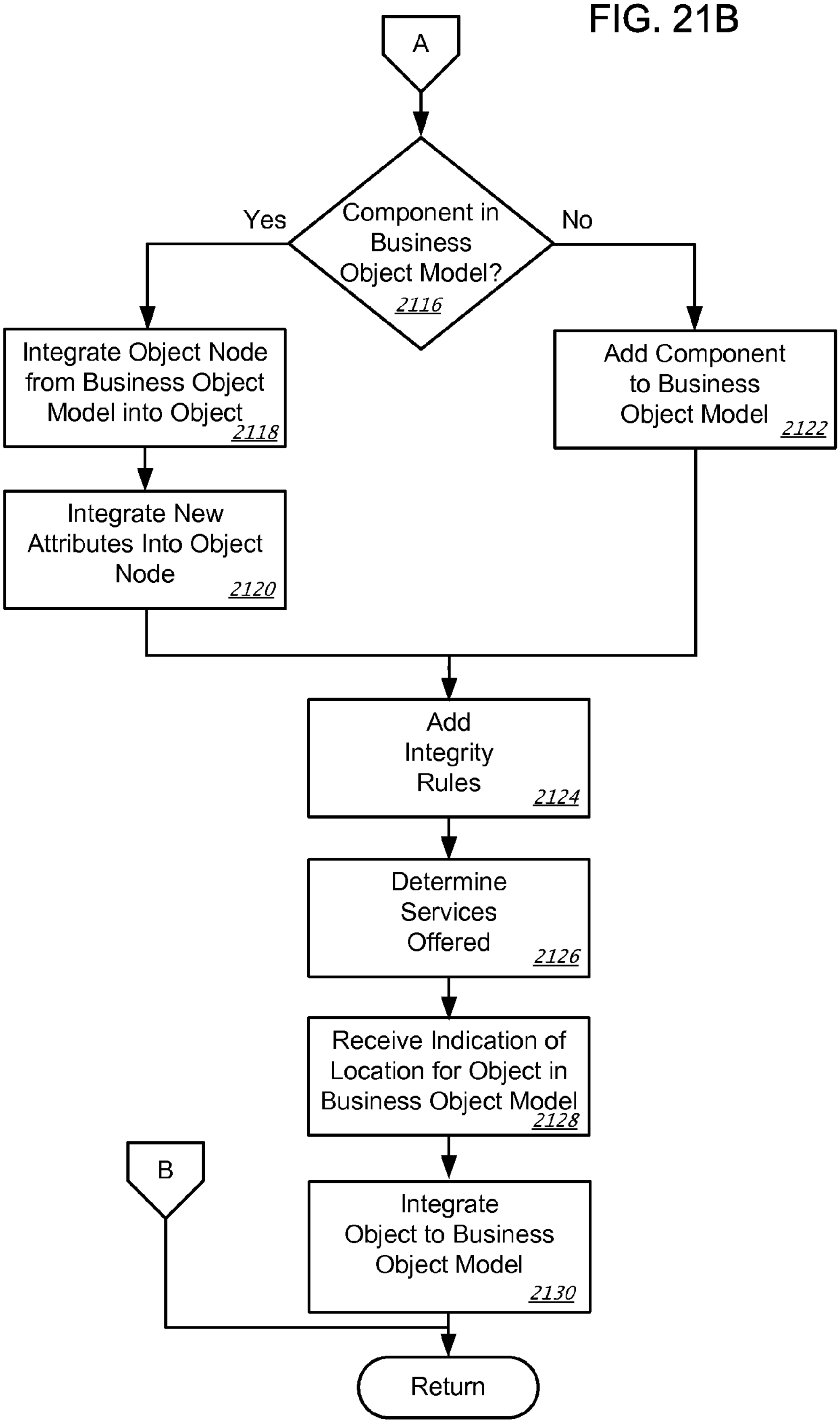

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |

-continued

| |
|---|
| Holder |
| ExpirationDate |
| AttachmentID |
| AttachmentFilename |
| DescriptionofMessage |
| ConfirmationDescriptionof Message |
| FollowUpActivity |
| ItemID |
| ParentItemID |
| HierarchyType |
| ProductID |
| ProductType |
| ProductNote |
| ProductCategoryID |
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | | |
|---|---|---|---|
| ID | Purchase | | |
| AdditionalID | Order | | |
| PostingDate | | | |
| LastChangeDate | | | |
| AcceptanceStatus | | | |
| Note | | | |
| CompleteTransmission | | | |
| Indicator | | | |
| Buyer | | Buyer | |
| BuyerOrganisationName | | | |
| Person Name | | | |
| FunctionalTitle | | | |
| DepartmentName | | | |
| CountryCode | | | |
| StreetPostalCode | | | |
| POBox Postal Code | | | |
| Company Postal Code | | | |
| City Name | | | |
| DistrictName | | | |
| PO Box ID | | | |
| PO Box Indicator | | | |
| PO Box Country Code | | | |
| PO Box Region Code | | | |
| PO Box City Name | | | |
| Street Name | | | |
| House ID | | | |
| Building ID | | | |
| Floor ID | | | |
| Room ID | | | |
| Care Of Name | | | |
| AddressDescription | | | |
| Telefonnumber | | | |
| MobileNumber | | | |
| Facsimile | | | |
| Email | | | |
| Seller | | Seller | |
| SellerAddress | | | |
| Location | | Location | |
| LocationType | | | |
| DeliveryItemGroupID | | Delivery- | |
| DeliveryPriority | | Terms | |
| DeliveryCondition | | | |
| TransferLocation | | | |
| NumberofPartialDelivery | | | |
| QuantityTolerance | | | |
| MaximumLeadTime | | | |
| TransportServiceLevel | | | |
| TranportCondition | | | |
| TransportDescription | | | |
| CashDiscountTerms | | | |
| PaymentForm | | Payment | |
| PaymentCardID | | | |
| PaymentCardReferenceID | | | |
| SequenceID | | | |
| Holder | | | |
| ExpirationDate | | | |
| AttachmentID | | | |
| AttachmentFilename | | | |
| DescriptionofMessage | | | |
| ConfirmationDescriptionof | | | |
| Message | | | |
| FollowUpActivity | | | |
| ItemID | | Purchase | |
| ParentItemID | | Order Item | |
| HierarchyType | | | |
| ProductID | | | Product |
| ProductType | | | |
| ProductNote | | | |
| ProductCategoryID | | | ProductCategory |

-continued

| | |
|---|---|
| Amount | |
| BaseQuantity | |
| ConfirmedAmount | |
| ConfirmedBaseQuantity | |
| ItemBuyer | Buyer |
| ItemBuyerOrganisation | |
| Name | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial | |
| Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| Purchase Order | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |

-continued

| | | | |
|---|---|---|---|
| DeliveryTerms | | | 0 . . . 1 |
| | Incoterms | | 0 . . . 1 |
| | PartialDelivery | | 0 . . . 1 |
| | QuantityTolerance | | 0 . . . 1 |
| | Transport | | 0 . . . 1 |
| CashDiscount Terms | | | 0 . . . 1 |
| | MaximumCash Discount | | 0 . . . 1 |
| | NormalCashDiscount | | 0 . . . 1 |
| PaymentForm | | | 0 . . . 1 |
| | PaymentCard | | 0 . . . 1 |
| Attachment | | | 0 . . . n |
| Description | | | 0 . . . 1 |
| Confirmation Description | | | 0 . . . 1 |
| Item | | | 0 . . . n |
| | HierarchyRelationship | | 0 . . . 1 |
| | Product | | 0 . . . 1 |
| | ProductCategory | | 0 . . . 1 |
| | Price | | 0 . . . 1 |
| | | NetunitPrice | 0 . . . 1 |
| | ConfirmedPrice | | 0 . . . 1 |
| | | NetunitPrice | 0 . . . 1 |
| | Party | | |
| | | BuyerParty | 0 . . . 1 |
| | | SellerParty | 0 . . . 1 |
| | Location | | |
| | | ShipTo Location | 0 . . . 1 |
| | | ShipFrom Location | 0 . . . 1 |
| | DeliveryTerms | | 0 . . . 1 |
| | Attachment | | 0 . . . n |
| | Description | | 0 . . . 1 |
| | Confirmation Description | | 0 . . . 1 |
| | ScheduleLine | | 0 . . . n |
| | | Delivery Period | 1 |
| | ConfirmedScheduleLine | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |

-continued

| | | |
|---|---|---|
| Product RecipientParty | | 0 . . . 1 |
| VendorParty | | 0 . . . 1 |
| Manufacturer Party | | 0 . . . 1 |
| BillToParty | | 0 . . . 1 |
| PayerParty | | 0 . . . 1 |
| CarrierParty | | 0 . . . 1 |
| ShipTo Location | | 0 . . . 1 |
| | StandardID | 0 . . . n |
| | BuyerID | 0 . . . 1 |
| | SellerID | 0 . . . 1 |
| | Address | 0 . . . 1 |
| ShipFrom Location | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

Structure of the Business Object Model

The business object model, which serves as the basis for the process of generating consistent interfaces, includes the elements contained within the interfaces. These elements are arranged in a hierarchical structure within the business object model.

Interfaces Derived from Business Object Model

Figure 27A:
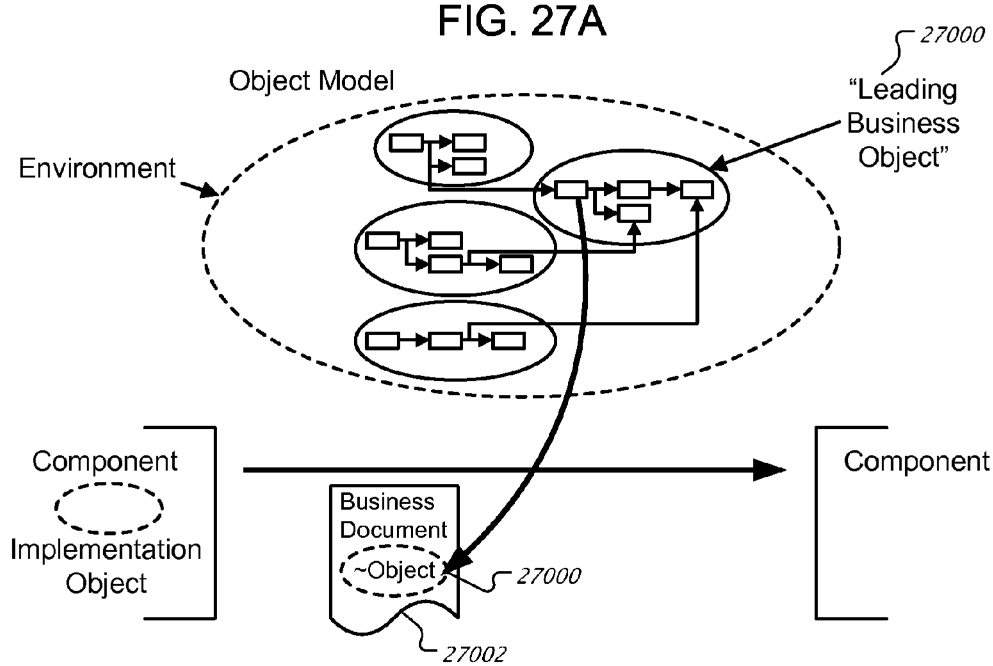

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
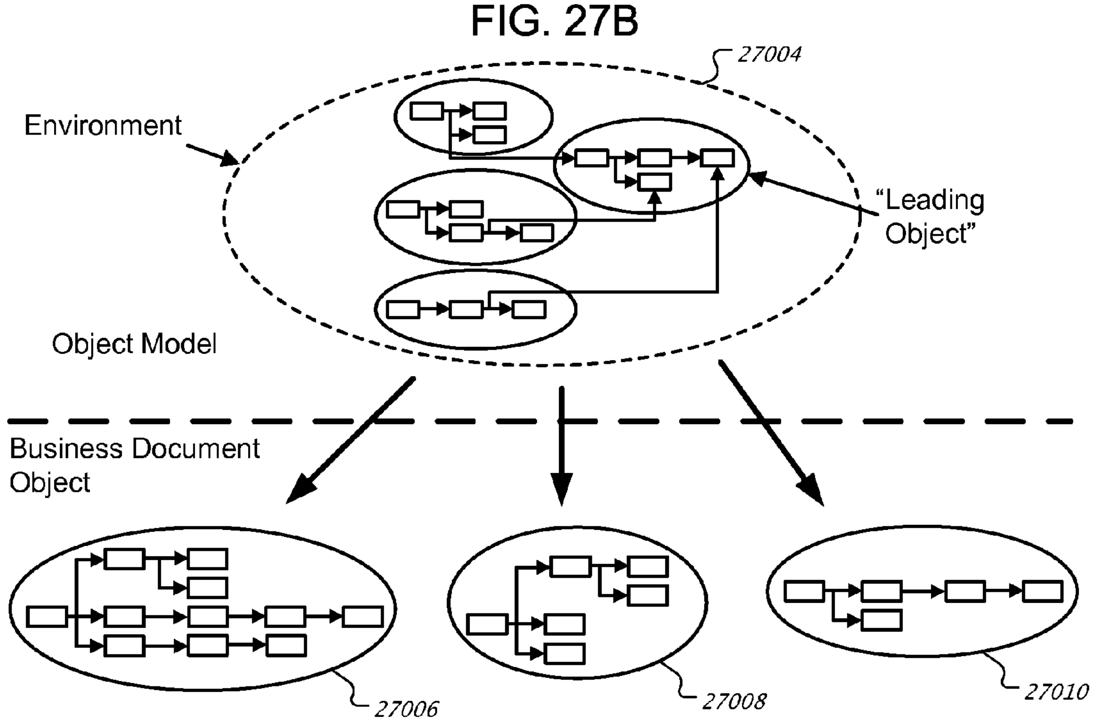

As illustrated in FIG. 27B, several business document objects 27006, 27008, and 27010 as overlapping views may be derived for a given leading object 27004. Each business document object results from the object model by hierarchization.

Figure 27C:
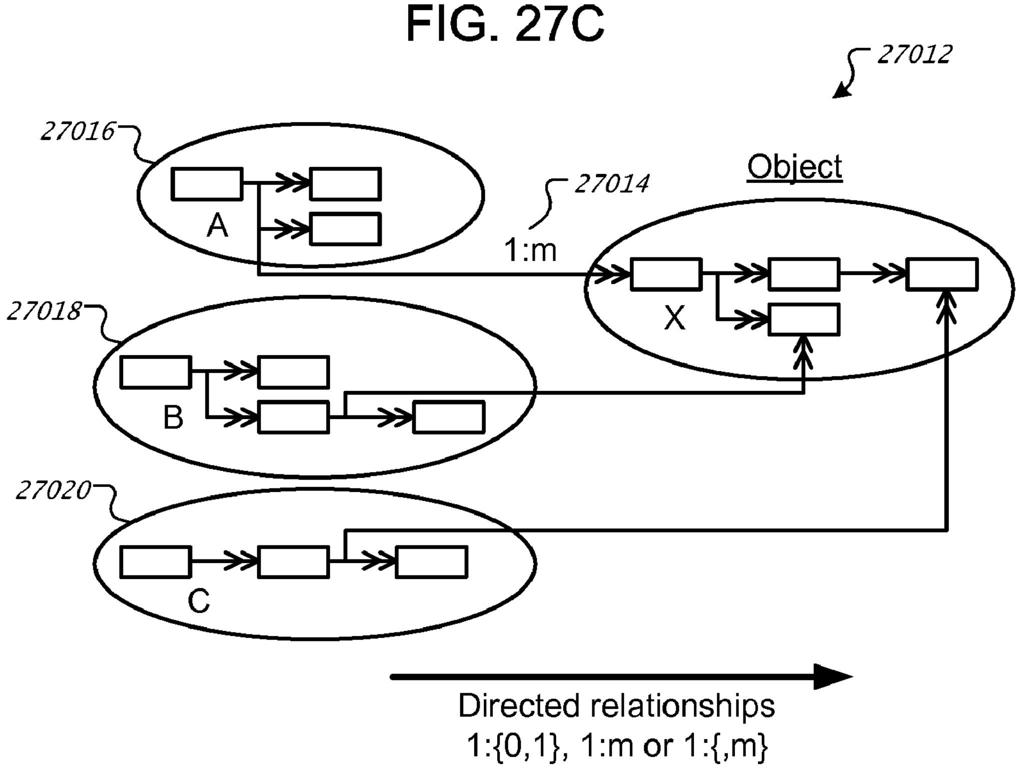

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
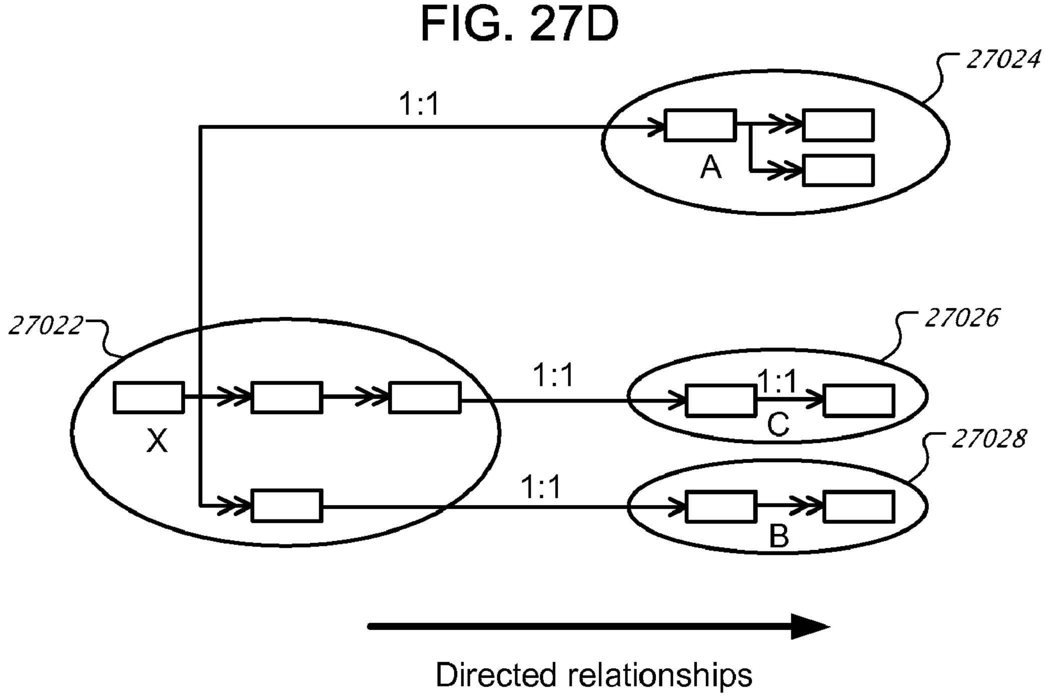

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantic name results from the concatenation of the entity names along the hierarchical structure of the business document object.
- The structure of the business document object is, except for deviations due to hierarchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inverted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
    - Party nodes of the business object are modeled as explicit entities for each party role in the business document object. These nodes are given the name <Prefix><Party Role>Party, for example, BuyerParty, ItemBuyerParty.
    - BTDReference nodes are modeled as separate entities for each reference type in the business document object. These nodes are given the name <Qualifier><BO><Node>Reference, for example SalesOrderReference, OriginSalesOrderReference, SalesOrderItemReference.
    - A product node in the business object comprises all of the information on the Product, ProductCategory, and Batch. This information is modeled in the business document object as explicit entities for Product, ProductCategory, and Batch.
- Entities which are connected by a 1:1 relationship as a result of hierarchization can be combined to a single entity, if they are semantically equivalent. Such a combination can often occurs if a node in the business document object that results from an assignment node is removed because it does not have any elements.
- The message type structure is typed with data types.
    - Elements are typed by GDTs according to their business objects.
    - Aggregated levels are typed with message type specific data types (Intermediate Data Types), with their names being built according to the corresponding paths in the message type structure.
    - The whole message type structured is typed by a message data type with its name being built according to the root entity with the suffix "Message".
- For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
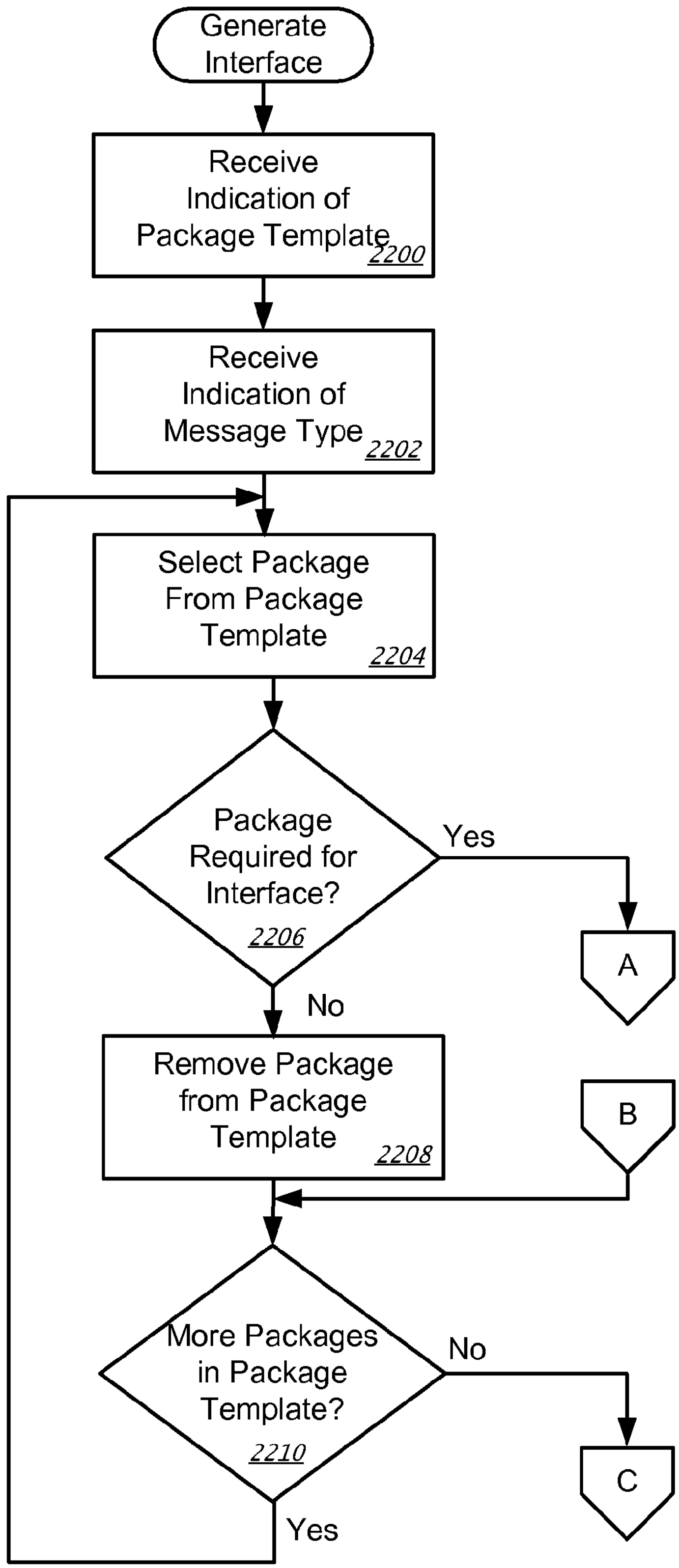
FIGS. 22A-F depict a flow diagram of the steps performed to generate an interface from the business object model in accordance with methods and systems consistent with the subject matter described herein.
Figure 22B:
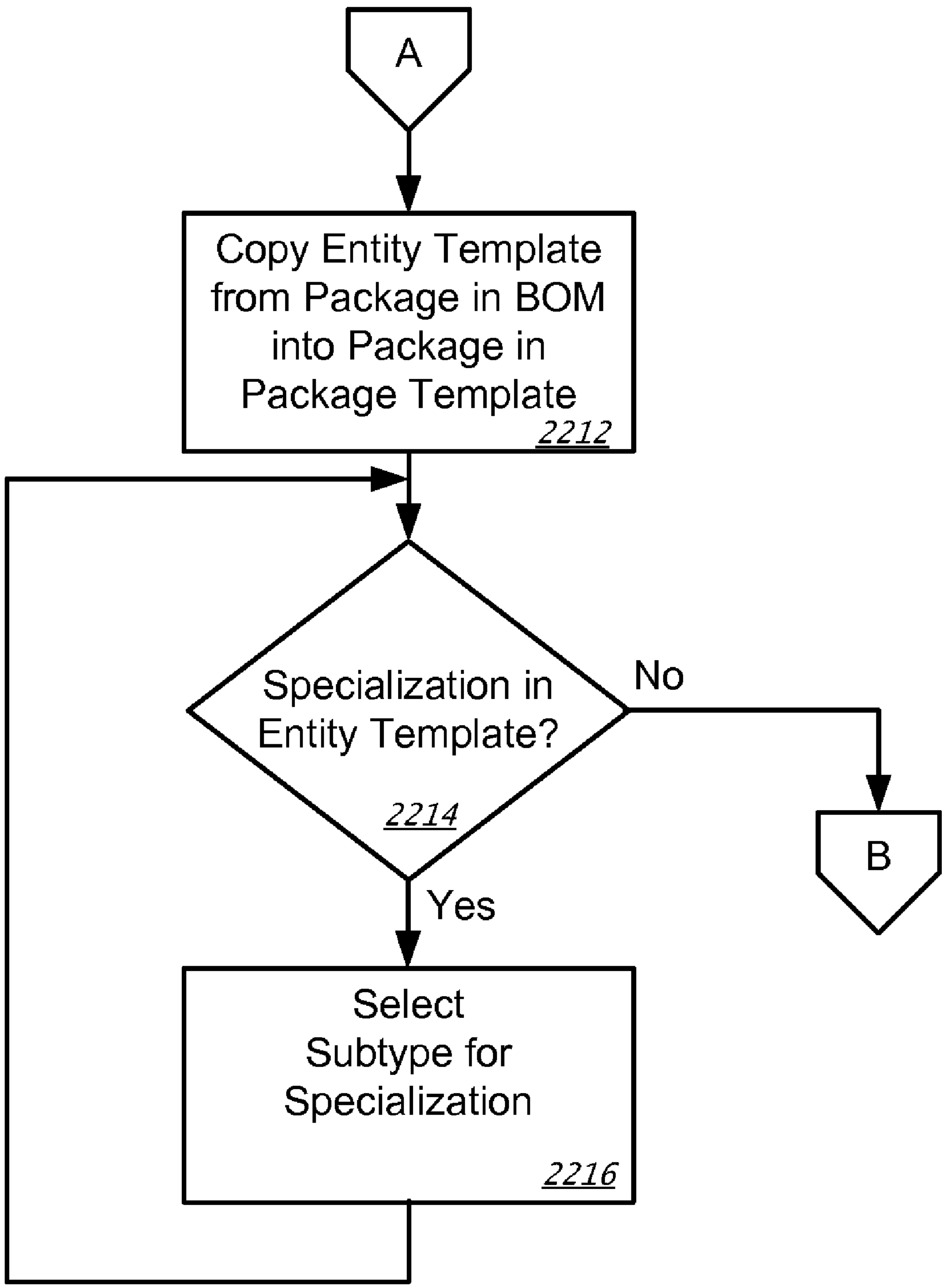
Figure 22C:
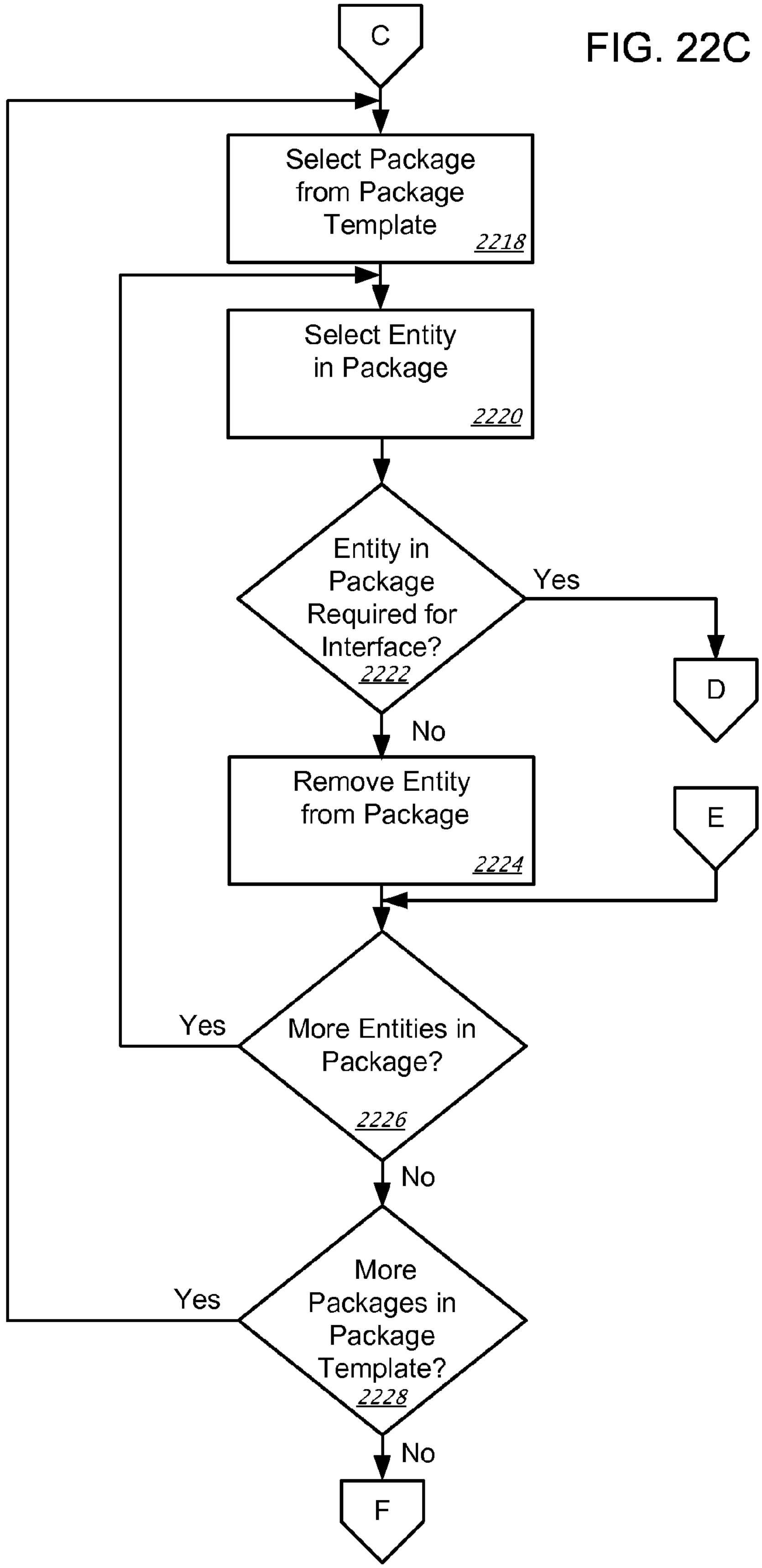

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
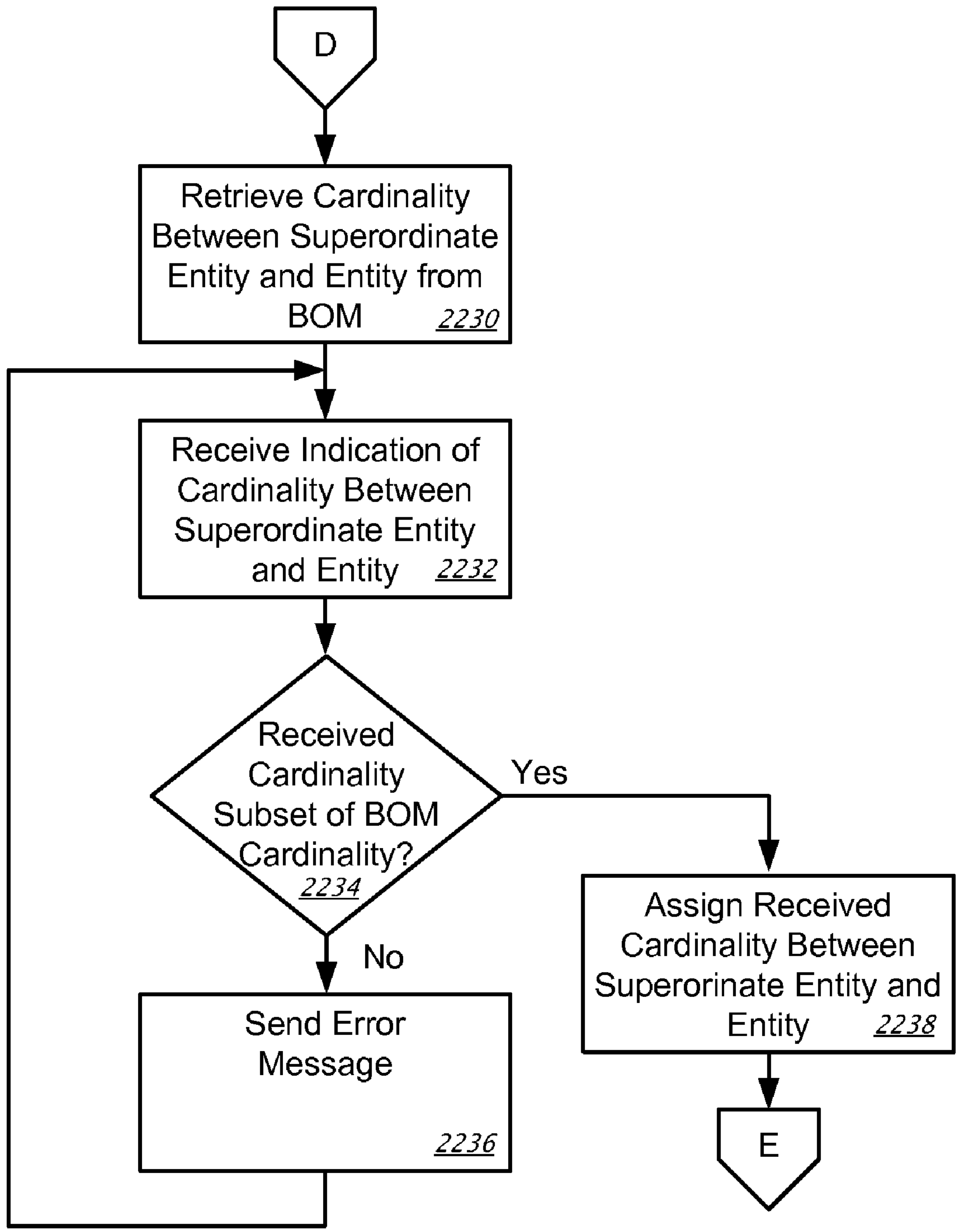

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
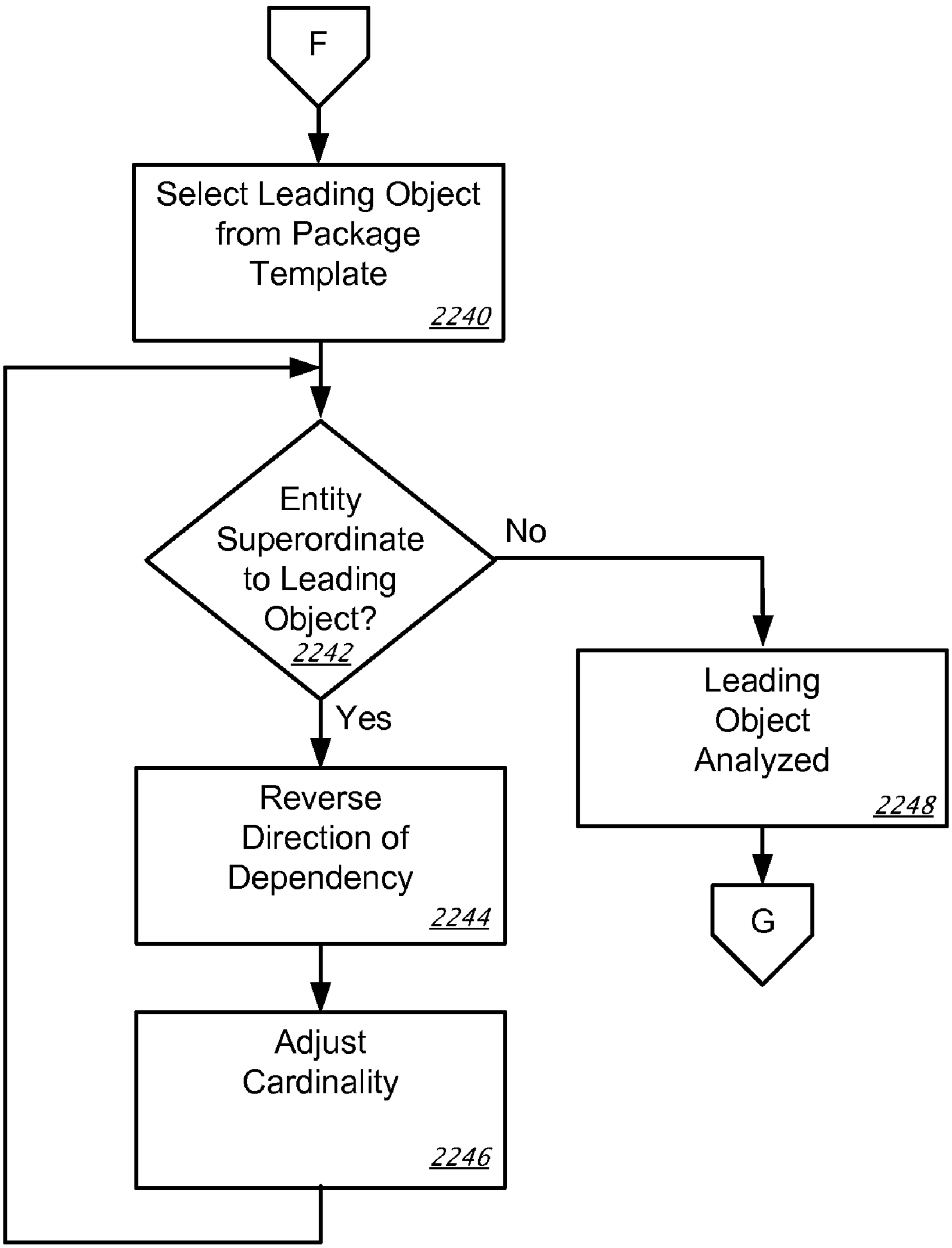

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
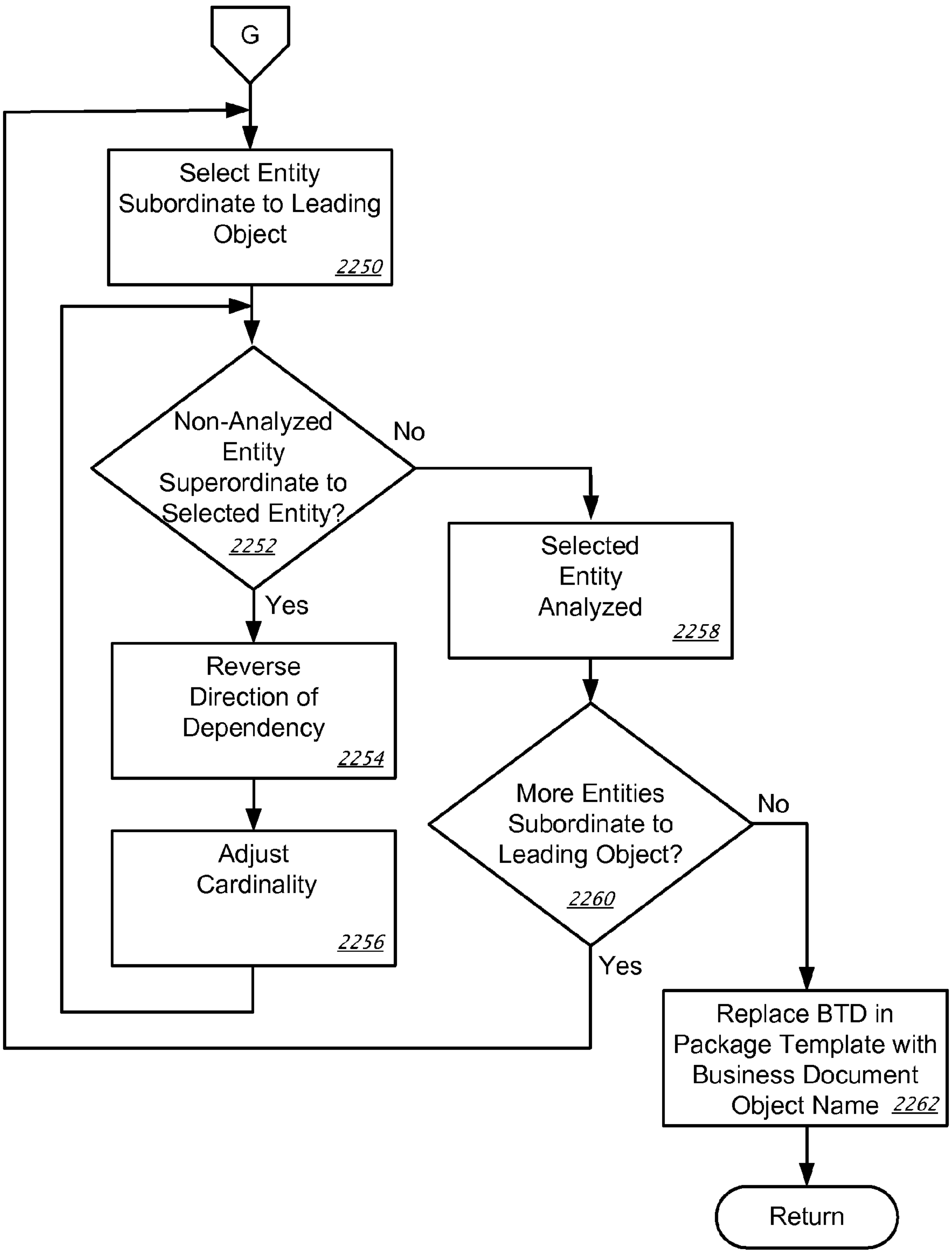

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransaction-Document ("BTD") in the package template with the name of the interface (step 2262). This includes the "BTD" in the BTDItem package and the "BTD" in the BTDItemSchedule-Line package.

Use of an Interface

Figure 23:
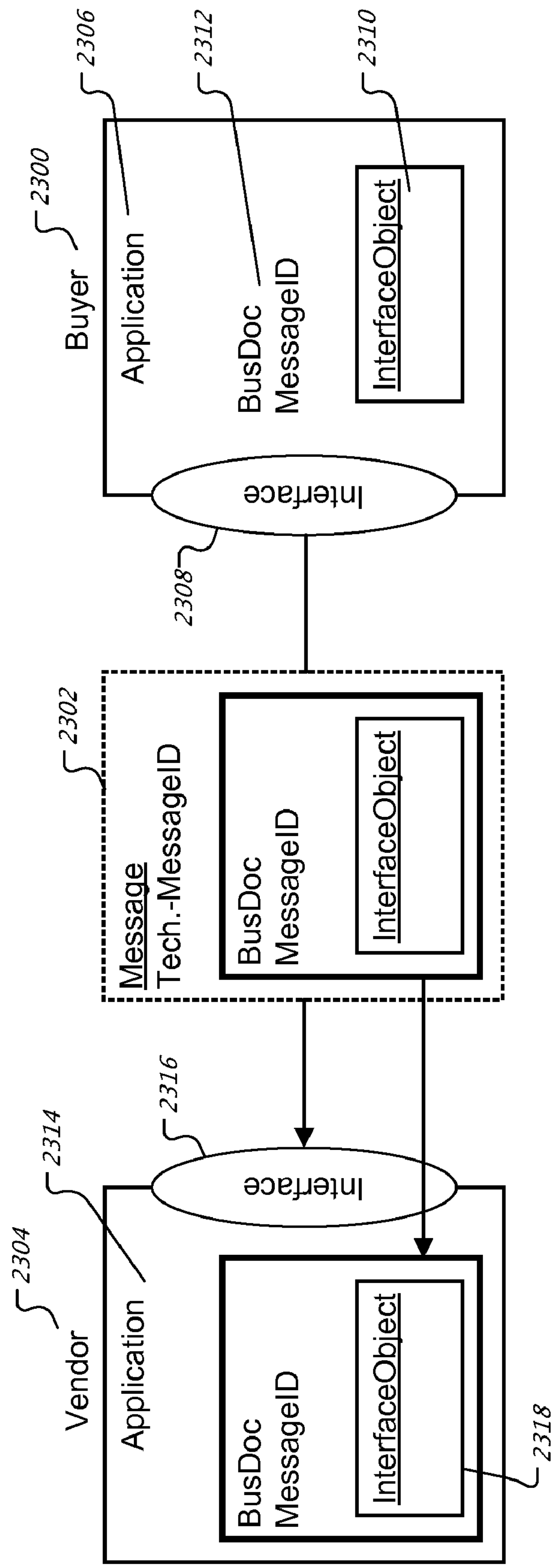
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
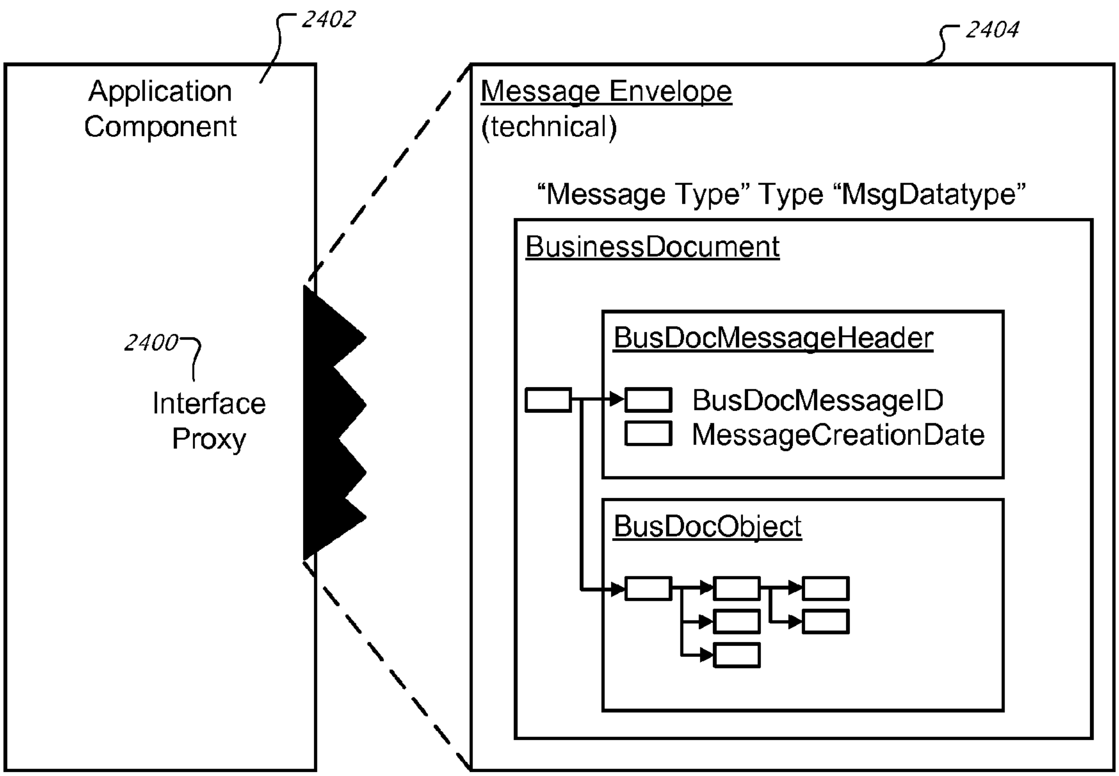
FIG. 24 depicts an interface proxy in accordance with methods and systems consistent with the subject matter described herein.
Figure 25:
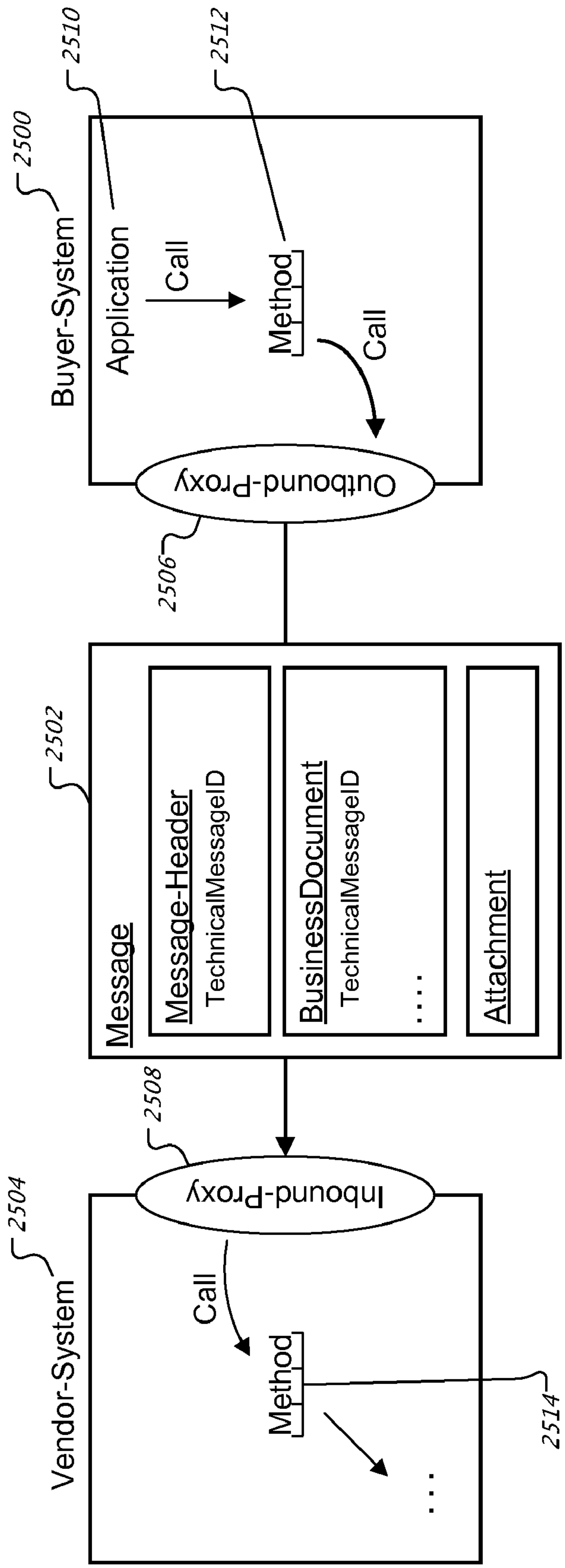
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
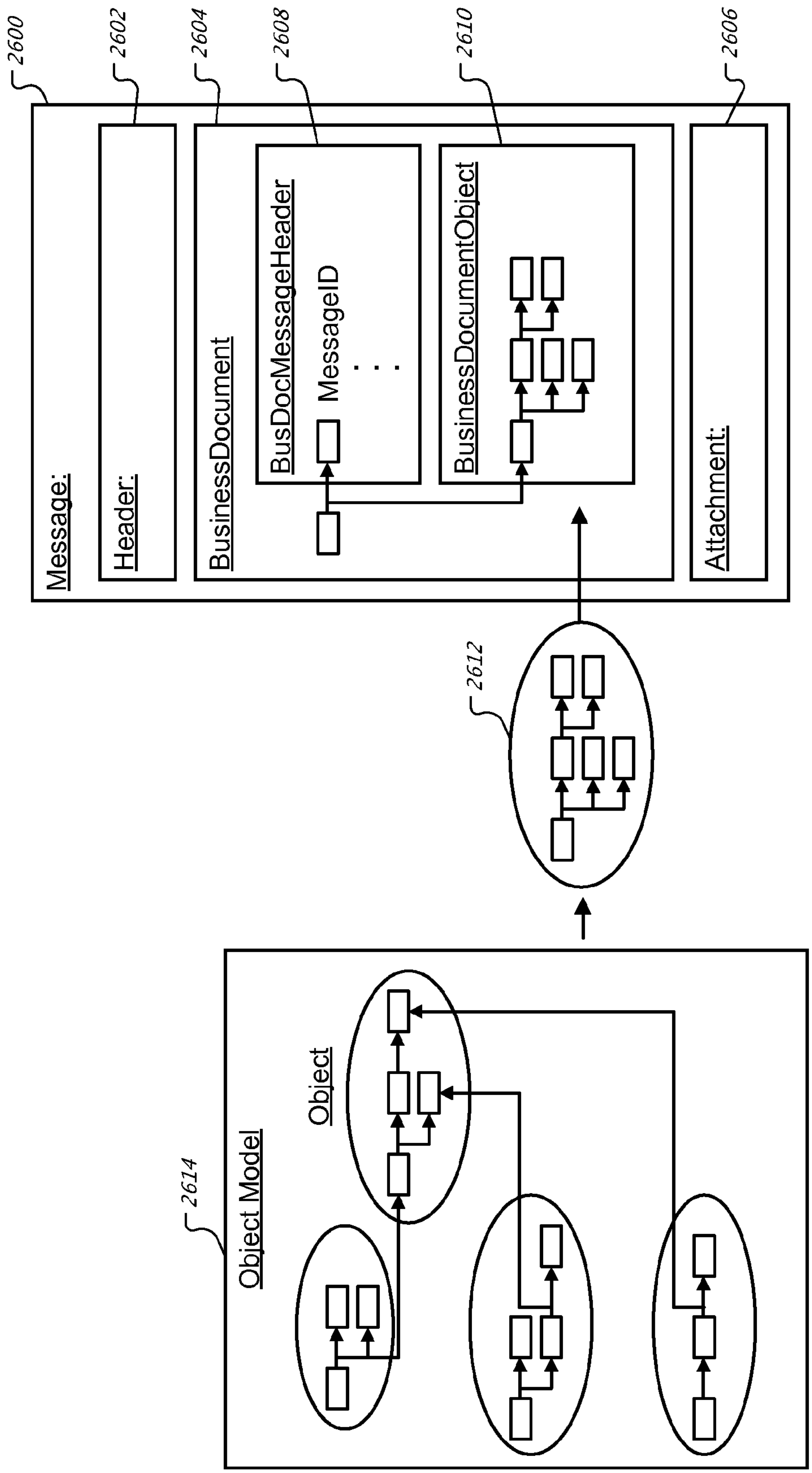
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
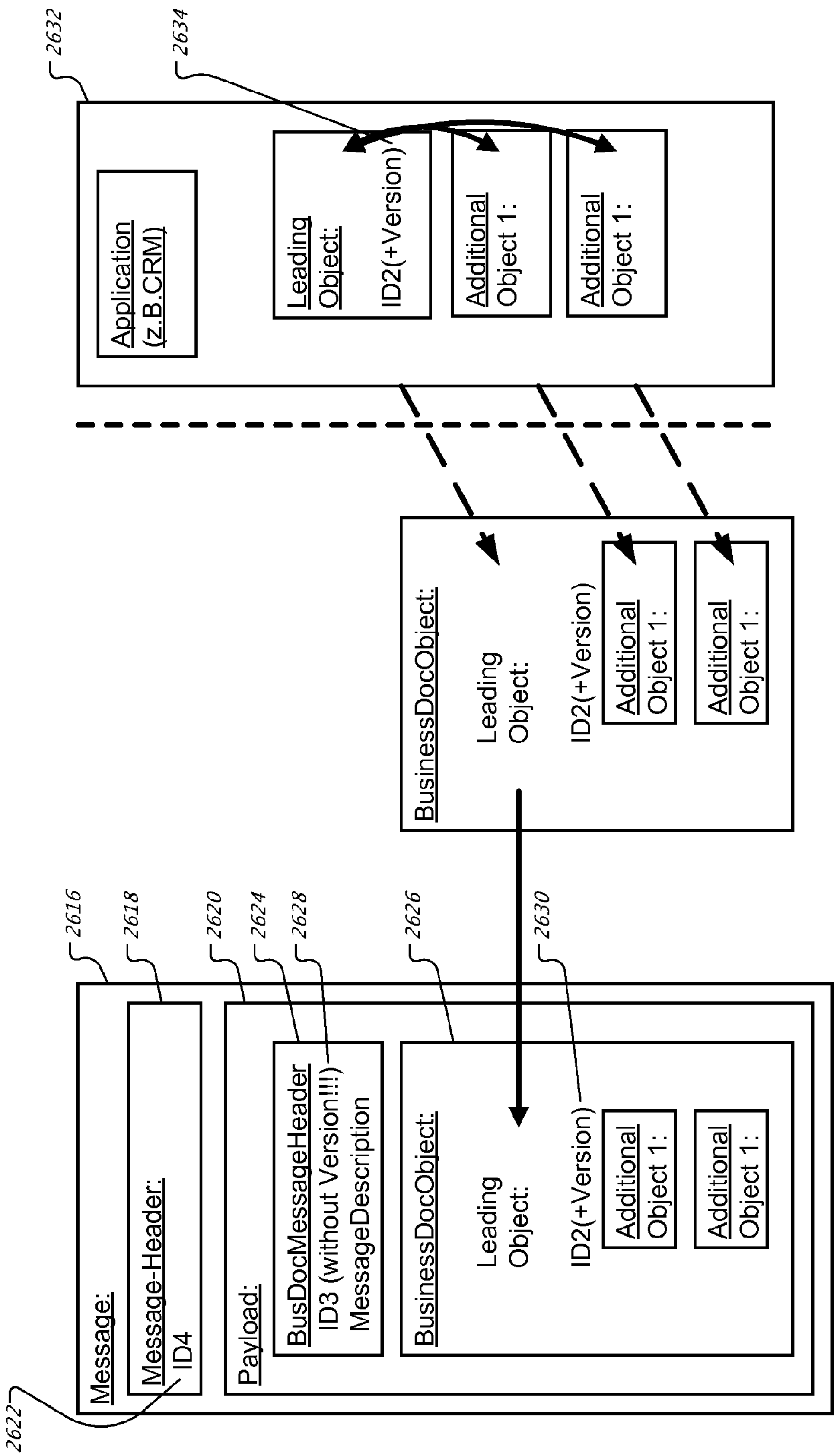
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
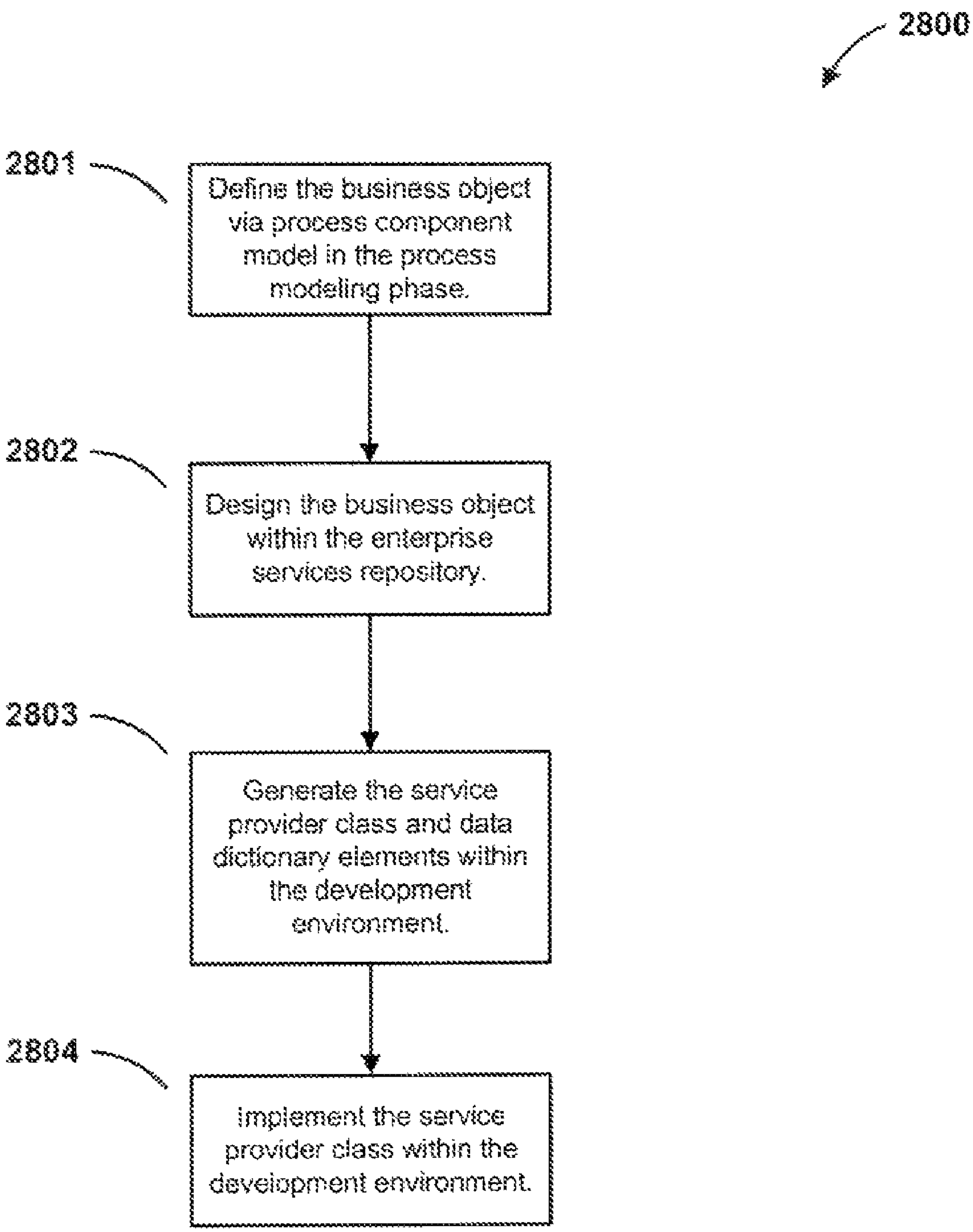
FIG. 28 illustrates an example method for service enabling in accordance with one embodiment of the present disclosure.
Figure 29:
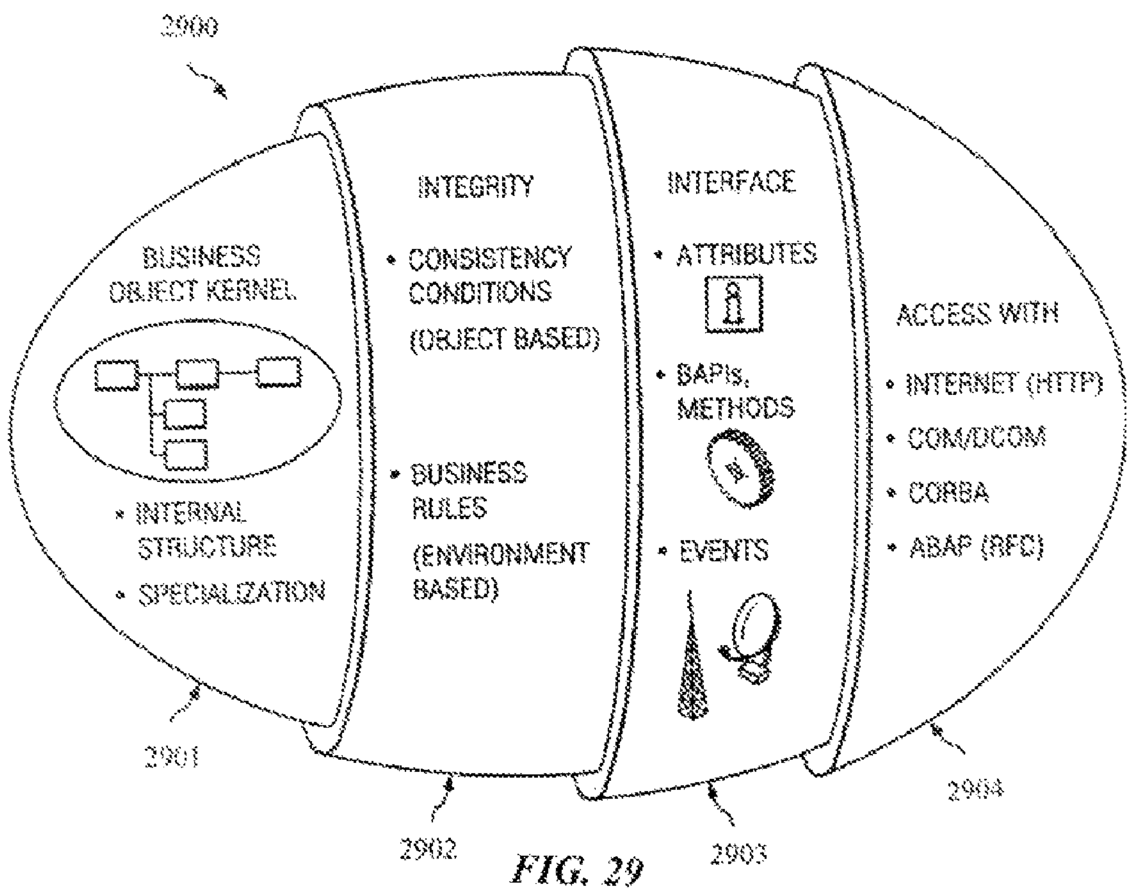
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
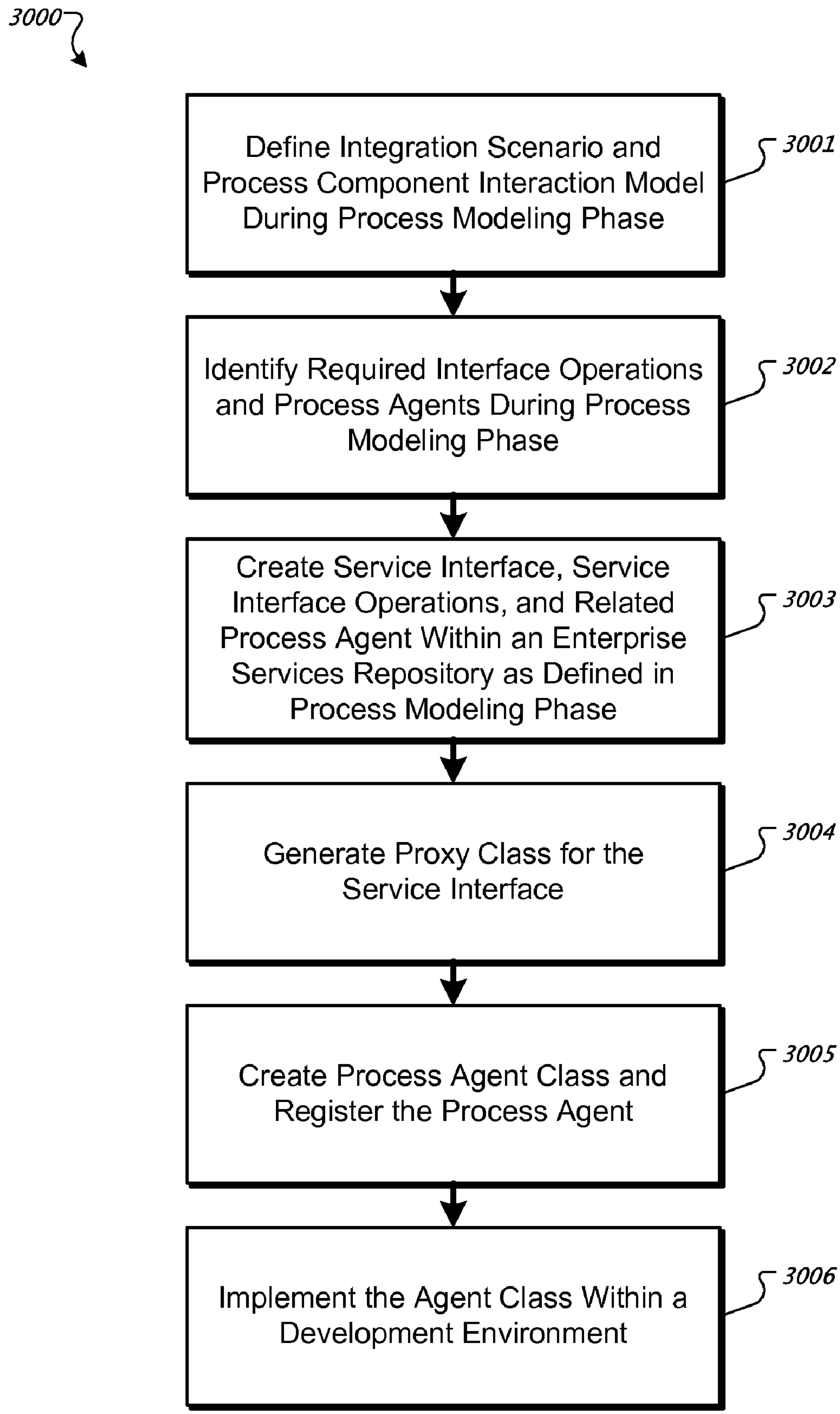
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
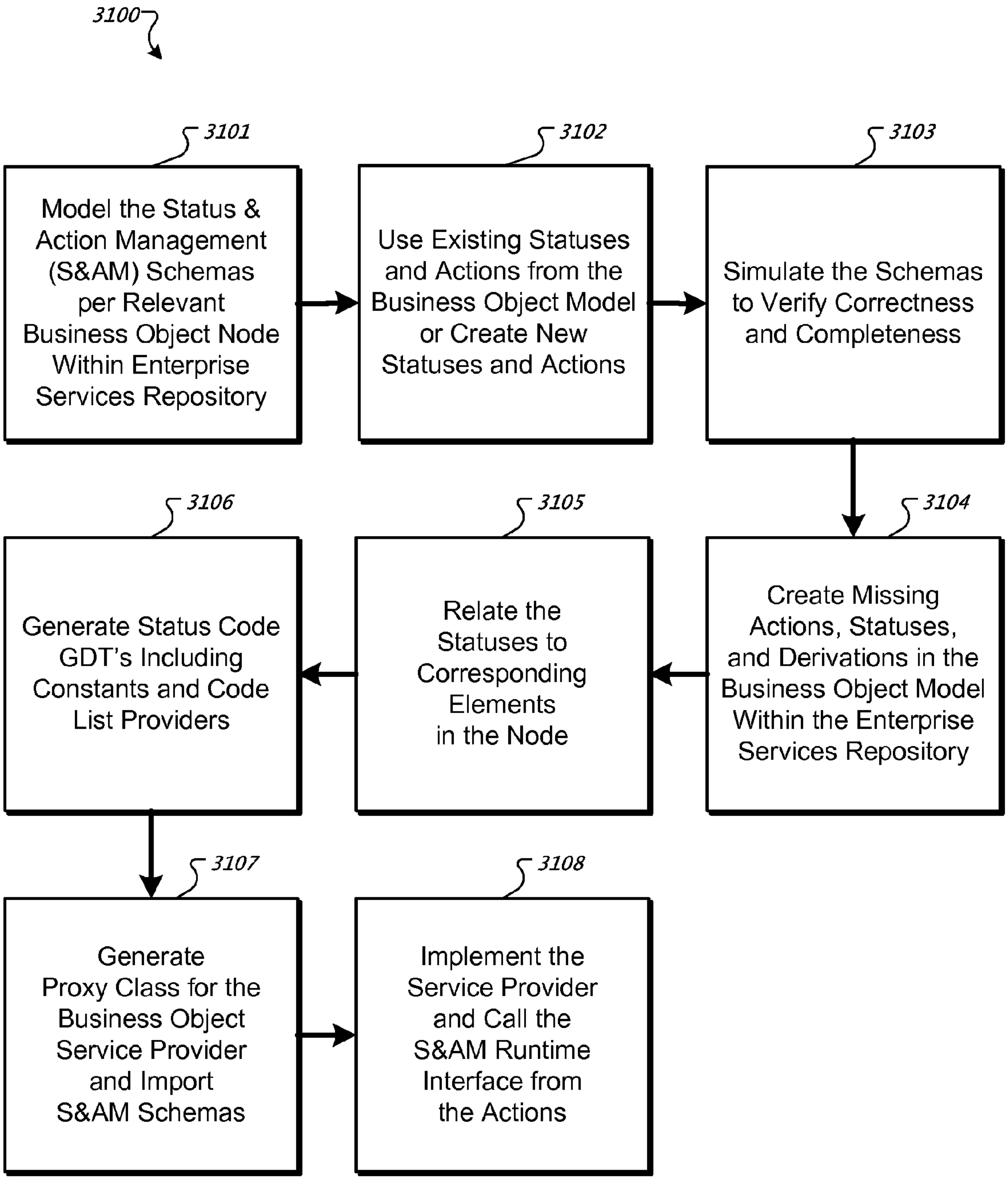
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

AutomaticIdentificationLabel Interfaces

One of the benefits of barcode and RFID technology is the automation of logistic processes. Such processes can be handled, for example, by Kanban Processing, where movements of goods are manually reported. With the automatically identifiable labels attached to items in a supply chain, movements of goods, which are registered via barcode or RFID technology, can be automatically reported. Automatically identifiable labels are modeled by the business object AutomaticIdentificationLabel. An AutomaticIdentificationLabel is a label that can be automatically identified. Automatically identifiable labels are used in conjunction with barcode or RFID technology. The business object AutomaticIdentificationLabel is represented by its root node, which does not have any subnodes.

Figure 32:
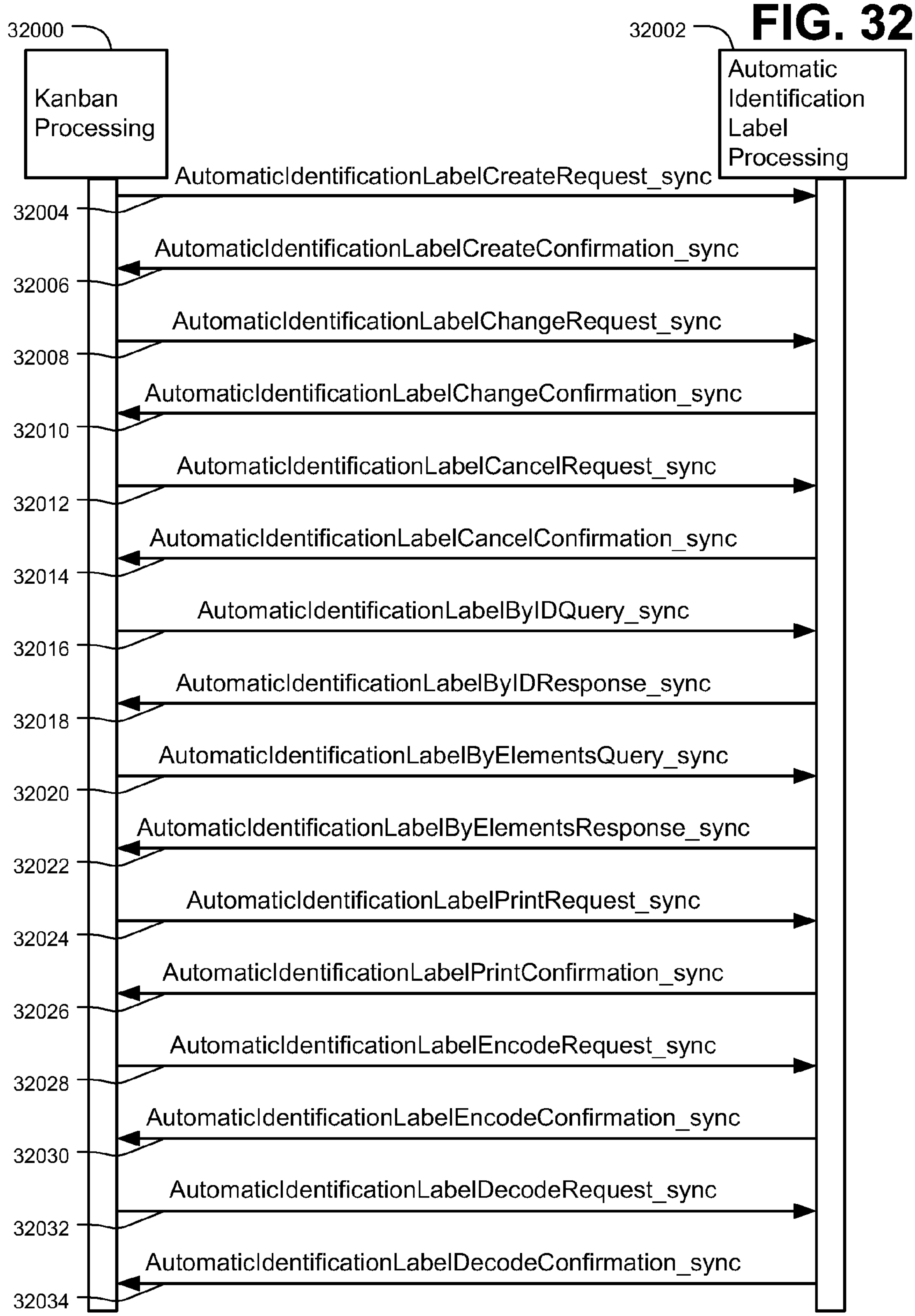
FIG. 32 shows an exemplary AutomaticIdentificationLabel Message Choreography.

The message choreography of FIG. 32 describes a possible logical sequence of messages that can be used to realize an Automatic Identification Label business scenario. A "Kanban Processing" system 32000 can request the creation of an Automatic Identification Label using an AutomaticIdentificationLabelCreateRequest_sync message 32004 as shown, for example, in FIG. 32. An "Automatic Identification Label Processing" system 32002 can confirm the request using an AutomaticIdentificationLabelCreateConfirmation_sync message 32006 as shown, for example, in FIG. 32.

The "Kanban Processing" system 32000 can request the change of an Automatic Identification Label using an AutomaticIdentificationLabelChangeRequest_sync message 32008 as shown, for example, in FIG. 32. The "Automatic Identification Label Processing" system 32002 can confirm the request using an AutomaticIdentificationLabel-ChangeConfirmation_sync message 32010 as shown, for example, in FIG. 32.

The "Kanban Processing" system 32000 can request the cancellation of an Automatic Identification Label using an AutomaticIdentificationLabelCancelRequest_sync message 32012 as shown, for example, in FIG. 32. The "Automatic Identification Label Processing" system 32002 can confirm the request using an AutomaticIdentificationLabel-CancelConfirmation_sync message 32014 as shown, for example, in FIG. 32.

The "Kanban Processing" system 32000 can query an Automatic Identification Label by ID using an AutomaticIdentificationLabelByIDQuery_sync message 32016 as shown, for example, in FIG. 32. The "Automatic Identification Label Processing" system 32002 can respond to the query using an AutomaticIdentificationLabel-ByIDResponse_sync message 32018 as shown, for example, in FIG. 32.

The "Kanban Processing" system 32000 can query an Automatic Identification Label by elements using an AutomaticIdentificationLabelByElementsQuery_sync message 32020 as shown, for example, in FIG. 32. The "Automatic Identification Label Processing" system 32002 can respond to the query using an AutomaticIdentificationLabel-ByElementsResponse_sync message 32022 as shown, for example, in FIG. 32.

The "Kanban Processing" system 32000 can request the printing of an Automatic Identification Label using an AutomaticIdentificationLabelPrintRequest_sync message 32024 as shown, for example, in FIG. 32. The "Automatic Identification Label Processing" system 32002 can confirm the request using an AutomaticIdentificationLabel-PrintConfirmation_sync message 32026 as shown, for example, in FIG. 32.

The "Kanban Processing" system 32000 can request the encoding of an Automatic Identification Label using an AutomaticIdentificationLabelEncodeRequest_sync message 32028 as shown, for example, in FIG. 32. The "Automatic Identification Label Processing" system 32002 can confirm the request using an AutomaticIdentificationLabelEncodeConfirmation_sync message 32030 as shown, for example, in FIG. 32.

The "Kanban Processing" system 32000 can request the decoding of an Automatic Identification Label using an AutomaticIdentificationLabelDecodeRequest_sync message 32032 as shown, for example, in FIG. 32. The "Automatic Identification Label Processing" system 32002 can confirm the request using an AutomaticIdentificationLabel-DecodeConfirmation_sync message 32034 as shown, for example, in FIG. 32.

The services listed in this document can enable this scenario. AutomaticIdentificationLabel can include the message types AutomaticIdentificationLabelCreateRequest_sync, AutomaticIdentificationLabelCreateConfirmation_sync, AutomaticIdentificationLabelChangeRequest_sync, AutomaticIdentificationLabelChangeConfirmation_sync, AutomaticIdentificationLabelCancelRequest_sync, AutomaticIdentificationLabelCancelConfirmation_sync, AutomaticIdentificationLabelByIDQuery_sync, AutomaticIdentificationLabelByIDResponse_sync, AutomaticIdentificationLabelByElementsQuery_sync, AutomaticIdentificationLabelByElementsResponse_sync, AutomaticIdentificationLabelPrintRequest_sync, AutomaticIdentificationLabelPrintConfirmation_sync, AutomaticIdentificationLabelEncodeRequest_sync, AutomaticIdentificationLabelEncodeConfirmation_sync, AutomaticIdentificationLabelDecodeRequest_sync, and AutomaticIdentificationLabelDecodeConfirmation_sync.

AutomaticIdentificationLabelCreateRequest_sync is a request to AutomaticIdentificationLabel Processing to create an AutomaticIdentificationLabel. The structure of the message type AutomaticIdentificationLabelCreateRequest_sync can be specified by the message data type AutomaticIdentificationLabelCreateRequestMessage_sync. An AutomaticIdentificationLabelCreateConfirmation_sync is the confirmation of an AutomaticIdentificationLabelCreateRequest_sync. The structure of the message type AutomaticIdentificationLabelCreateConfirmation_sync can be specified by the message data type AutomaticIdentificationLabel-CreateConfirmationMessage_sync. An AutomaticIdentificationLabelChangeRequest_sync is a request to AutomaticIdentificationLabel Processing to change an AutomaticIdentificationLabel. The structure of the message type AutomaticIdentificationLabel-ChangeRequest_sync can be specified by the message data type AutomaticIdentificationLabel-ChangeRequestMessage_sync. An AutomaticIdentificationLabelChangeConfirmation_sync is the confirmation of an AutomaticIdentificationLabelChangeRequest_sync. The structure of the message type AutomaticIdentificationLabel-ChangeConfirmation_sync can be specified by the message data type AutomaticIdentificationLabel-ChangeConfirmationMessage_sync. An AutomaticIdentificationLabelCancelRequest_sync is a request to AutomaticIdentificationLabel Processing to cancel an AutomaticIdentificationLabel. The structure of the message type AutomaticIdentificationLabelCancelRequest_sync can be specified by the message data type AutomaticIdentificationLabelCancelRequestMessage_sync. An AutomaticIdentificationLabelCancelConfirmation_sync is the confirmation of an AutomaticIdentificationLabelCancelRequest_sync. The structure of the message type AutomaticIdentificationLabelCancelConfirmation_sync can be specified by the message data type AutomaticIdentificationLabel-CancelConfirmationMessage_sync. An AutomaticIdentificationLabelByIDQuery_sync is an inquiry to get an AutomaticIdentificationLabel by specifying its ID. The structure of the message type AutomaticIdentificationLabelByIDQuery_sync can be specified by the message data type AutomaticIdentificationLabel-ByIDQueryMessage_sync.

An AutomaticIdentificationLabelByIDResponse_sync is the reply to an AutomaticIdentificationLabel-ByIDQuery_sync. It includes an AutomaticIdentificationLabel. The structure of the message type AutomaticIdentificationLabelByIDResponse_sync can be specified by the message data type AutomaticIdentificationLabel-ByIDResponseMessage_sync. An AutomaticIdentificationLabelByElementsQuery_sync is an inquiry to get one or more AutomaticIdentificationLabel(s) by specifying some elements. The structure of the message type AutomaticIdentificationLabelByElementsQuery_sync can be specified by the message data type AutomaticIdentificationLabel-ByElementsQueryMessage_sync. An AutomaticIdentificationLabelByElementsResponse_sync is the reply to an AutomaticIdentificationLabelByElementsQuery_sync. The structure of the message type AutomaticIdentificationLabel-ByElementsResponse_sync can be specified by the message data type AutomaticIdentificationLabel-ByElementsResponseMessage_sync. An AutomaticIdentificationLabelPrintRequest_sync is a request to AutomaticIdentificationLabel Processing to print an AutomaticIdentificationLabel. The structure of the message type AutomaticIdentificationLabelPrintRequest_sync can be specified by the message data type AutomaticIdentification-LabelPrintRequestMessage_sync.

An AutomaticIdentificationLabelPrintConfirmation_sync is the confirmation of an AutomaticIdentificationLabel-PrintRequest_sync. The structure of the message type AutomaticIdentificationLabelPrintConfirmation_sync can be specified by the message data type AutomaticIdentification-LabelPrintConfirmationMessage_sync. An AutomaticIdentificationLabelEncodeRequest_sync is a request to AutomaticIdentificationLabel Processing to determine the encoded ID of an AutomaticIdentificationLabel with respect to an encoding scheme. The structure of the message type AutomaticIdentificationLabelEncodeRequest_sync can be specified by the message data type AutomaticIdentificationLabelEncodeRequestMessage_sync. An AutomaticIdentification-LabelEncodeConfirmation_sync is the confirmation of an AutomaticIdentificationLabelEncodeRequest_sync. It returns the encoded ID of an AutomaticIdentificationLabel. The structure of the message type AutomaticIdentification-LabelEncodeConfirmation_sync is specified by the message data type AutomaticIdentificationLabelEncodeConfirmationMessage_sync.

An AutomaticIdentificationLabelDecodeRequest_sync is a request to AutomaticIdentificationLabel Processing to decode the encoded ID of an AutomaticIdentificationLabel. The structure of the message type AutomaticIdentification-LabelDecodeRequest_sync can be specified by the message data type AutomaticIdentificationLabel-DecodeRequestMessage_sync. An AutomaticIdentification-LabelDecodeConfirmation_sync is the confirmation of an AutomaticIdentificationLabelDecodeRequest_sync. The structure of the message type AutomaticIdentificationLabel-DecodeConfirmation_sync can be specified by the message data type AutomaticIdentificationLabel-DecodeConfirmationMessage_sync.

The interfaces for AutomaticIdentificationLabel can include AutomaticIdentificationLabel-CreateRequestConfirmation_In, AutomaticIdentificationLabelChangeRequestConfirmation_In, AutomaticIdentificationLabelCancelRequestConfirmation_In, AutomaticIdentificationLabelByIDQueryResponse_In, AutomaticIdentificationLabel-ByElementsQueryResponse_In, AutomaticIdentificationLabelPrintRequestConfirmation_In, AutomaticIdentification-LabelEncodeRequestConfirmation_In, and AutomaticIdentificationLabel-DecodeRequestConfirmation_In.

Figure 33:
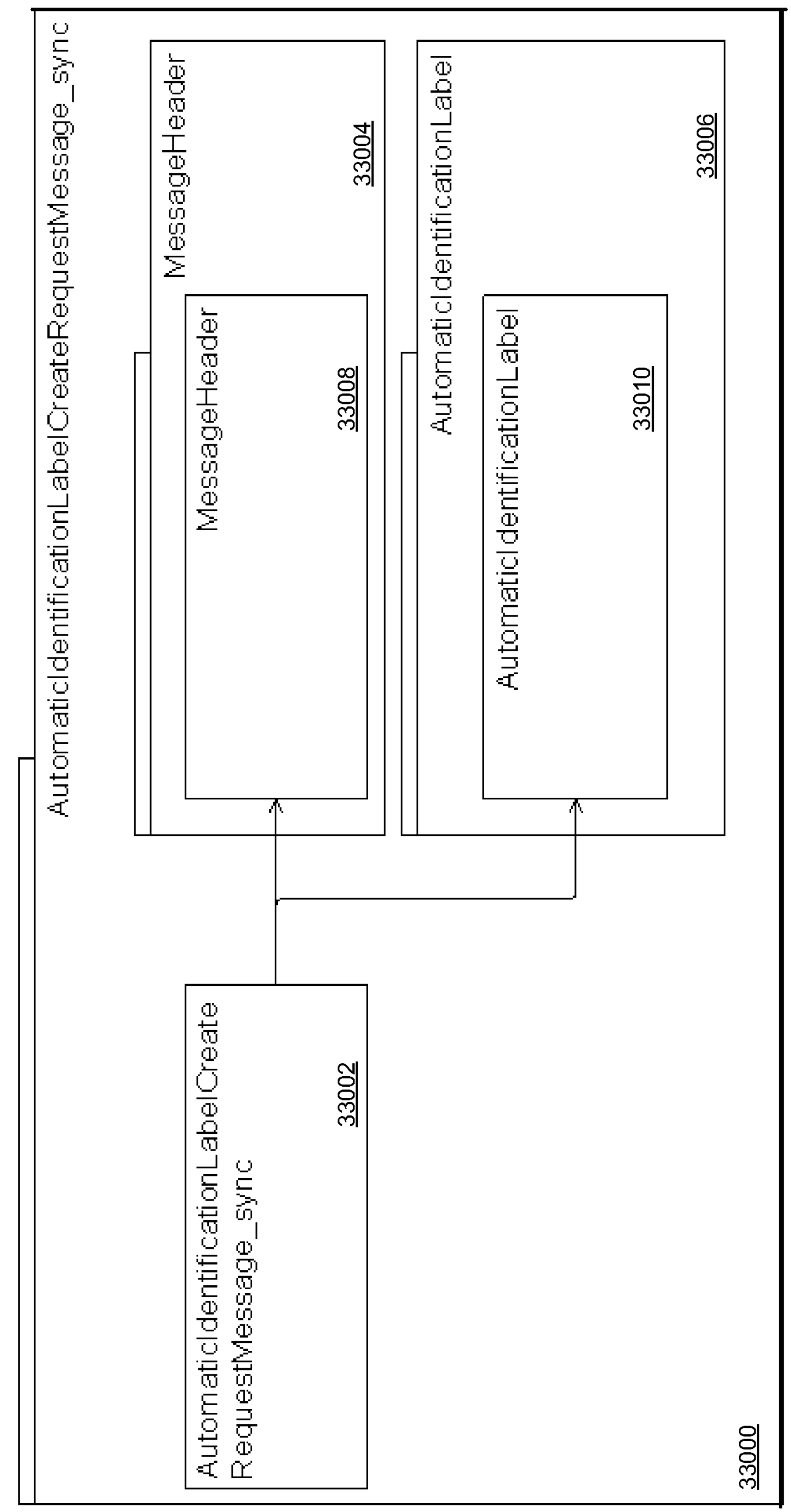
FIG. 33 shows an exemplary AutomaticIdentificationLabelCreateRequestMessage_sync Message Data Type.

FIG. 33 illustrates one example logical configuration of AutomaticIdentificationLabelCreateRequestMessage_sync message 33000. Specifically, this figure depicts the arrangement and hierarchy of various components such as one or more levels of packages, entities, and datatypes, shown here as 33000 through 33010. As described above, packages may be used to represent hierarchy levels. Entities are discrete business elements that are used during a business transaction. Data types are used to type object entities and interfaces with a structure. For example, AutomaticIdentificationLabel-CreateRequestMessage_sync message 33000 includes, among other things, AutomaticIdentificationLabel 33006. Accordingly, heterogeneous applications may communicate using this consistent message configured as such.

Figure 34:
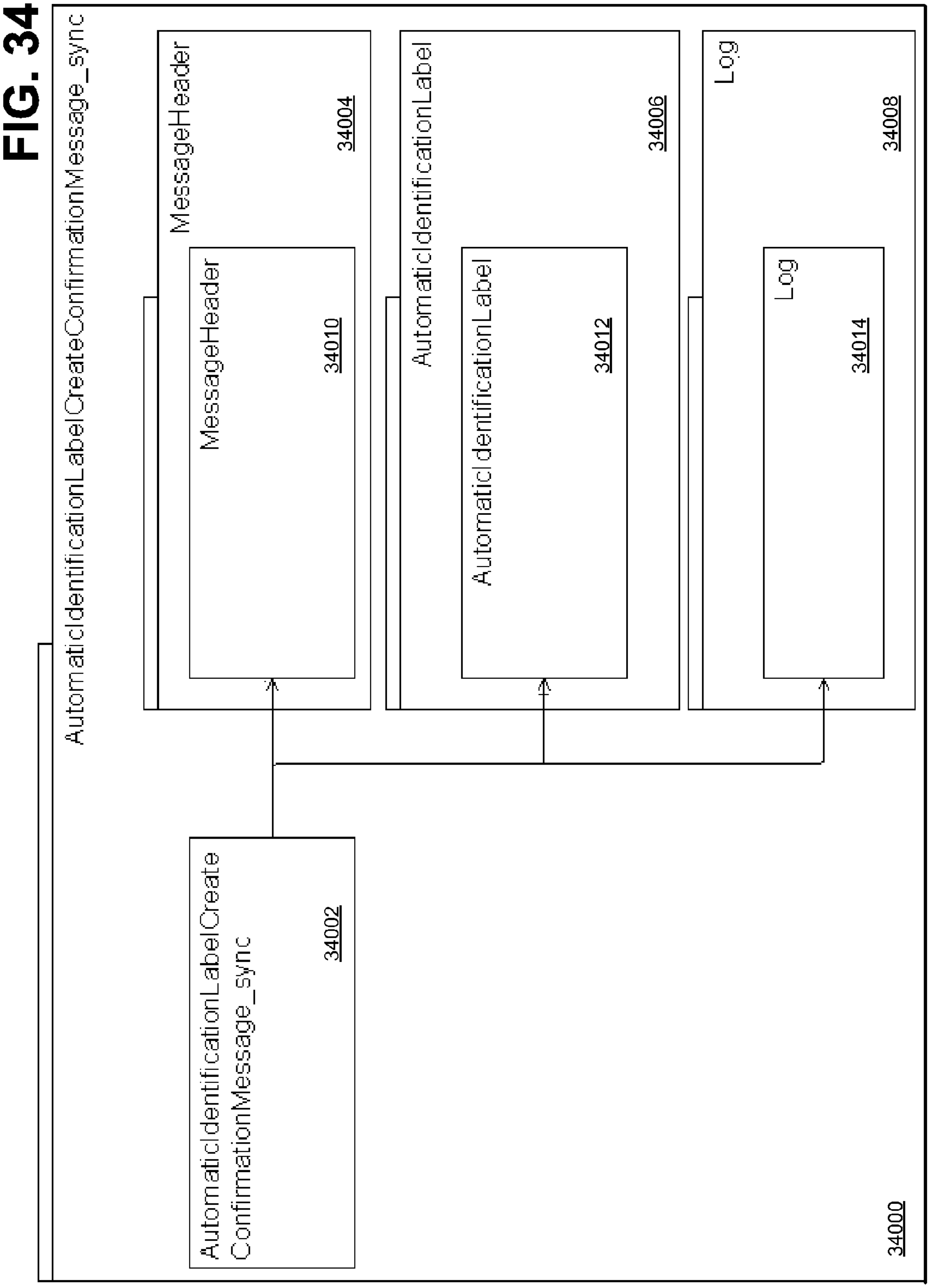
FIG. 34 shows an exemplary AutomaticIdentificationLabelCreateConfirmationMessage_sync Message Data Type.

Additionally, FIG. 34 illustrates one example logical configuration of AutomaticIdentificationLabel-CreateConfirmationMessage_sync message 34000. Specifically, this figure depicts the arrangement and hierarchy of various components such as one or more levels of packages, entities, and datatypes, shown here as 34000 through 34014. As described above, packages may be used to represent hierarchy levels. Entities are discrete business elements that are used during a business transaction. Data types are used to type object entities and interfaces with a structure. For example, AutomaticIdentificationLabel-CreateConfirmationMessage_sync message 34000 includes, among other things, AutomaticIdentificationLabel 34006. Accordingly, heterogeneous applications may communicate using this consistent message configured as such.

Figure 35:
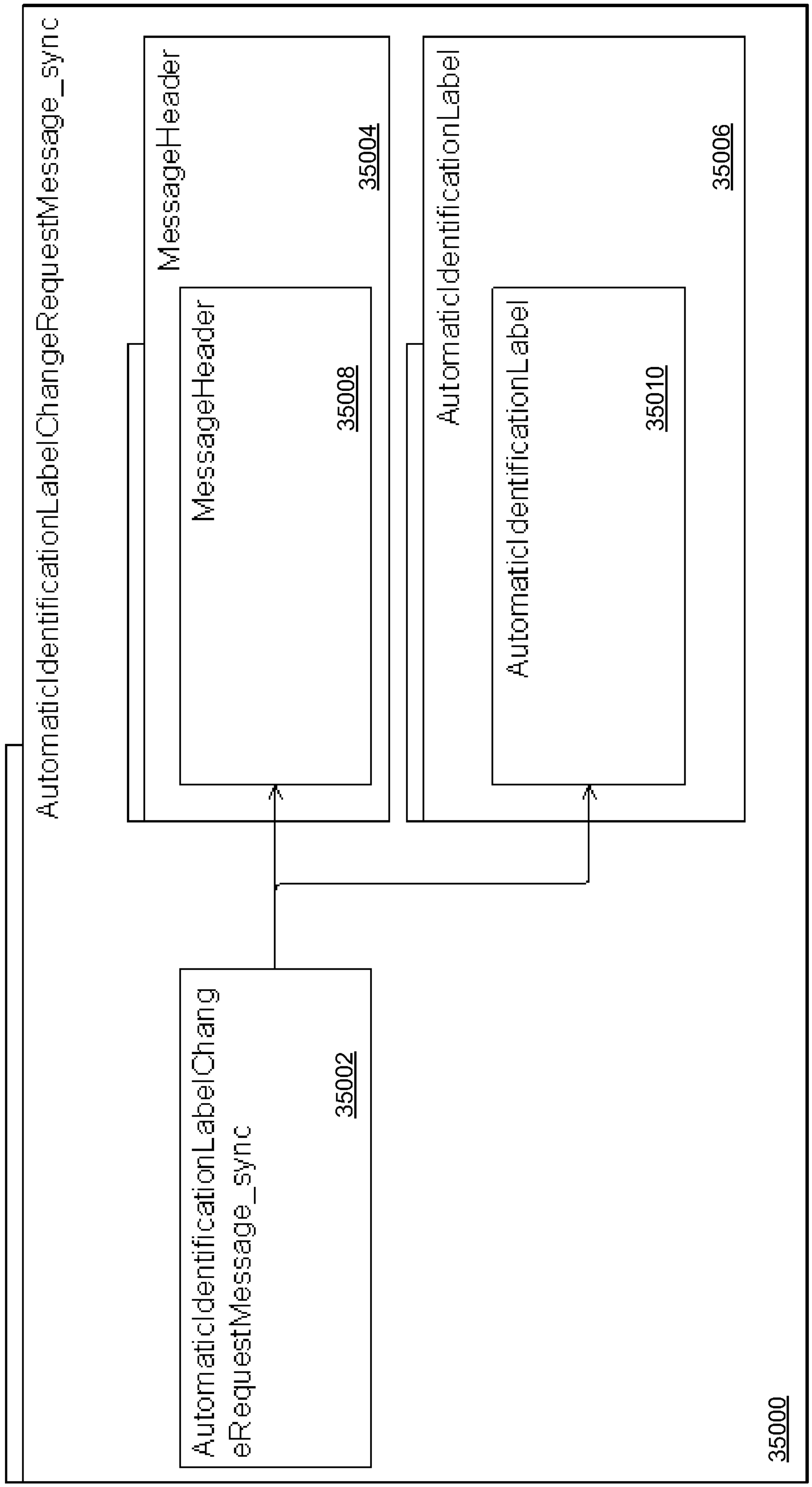
FIG. 35 shows an exemplary AutomaticIdentificationLabelChangeRequestMessage_sync Message Data Type.

Additionally, FIG. 35 illustrates one example logical configuration of AutomaticIdentificationLabel-ChangeRequestMessage_sync message 35000. Specifically, this figure depicts the arrangement and hierarchy of various components such as one or more levels of packages, entities, and datatypes, shown here as 35000 through 35010. As described above, packages may be used to represent hierarchy levels. Entities are discrete business elements that are used during a business transaction. Data types are used to type object entities and interfaces with a structure. For example, AutomaticIdentificationLabelChangeRequestMessage_sync message 35000 includes, among other things, AutomaticIdentificationLabel 35006. Accordingly, heterogeneous applications may communicate using this consistent message configured as such.

Figure 36:
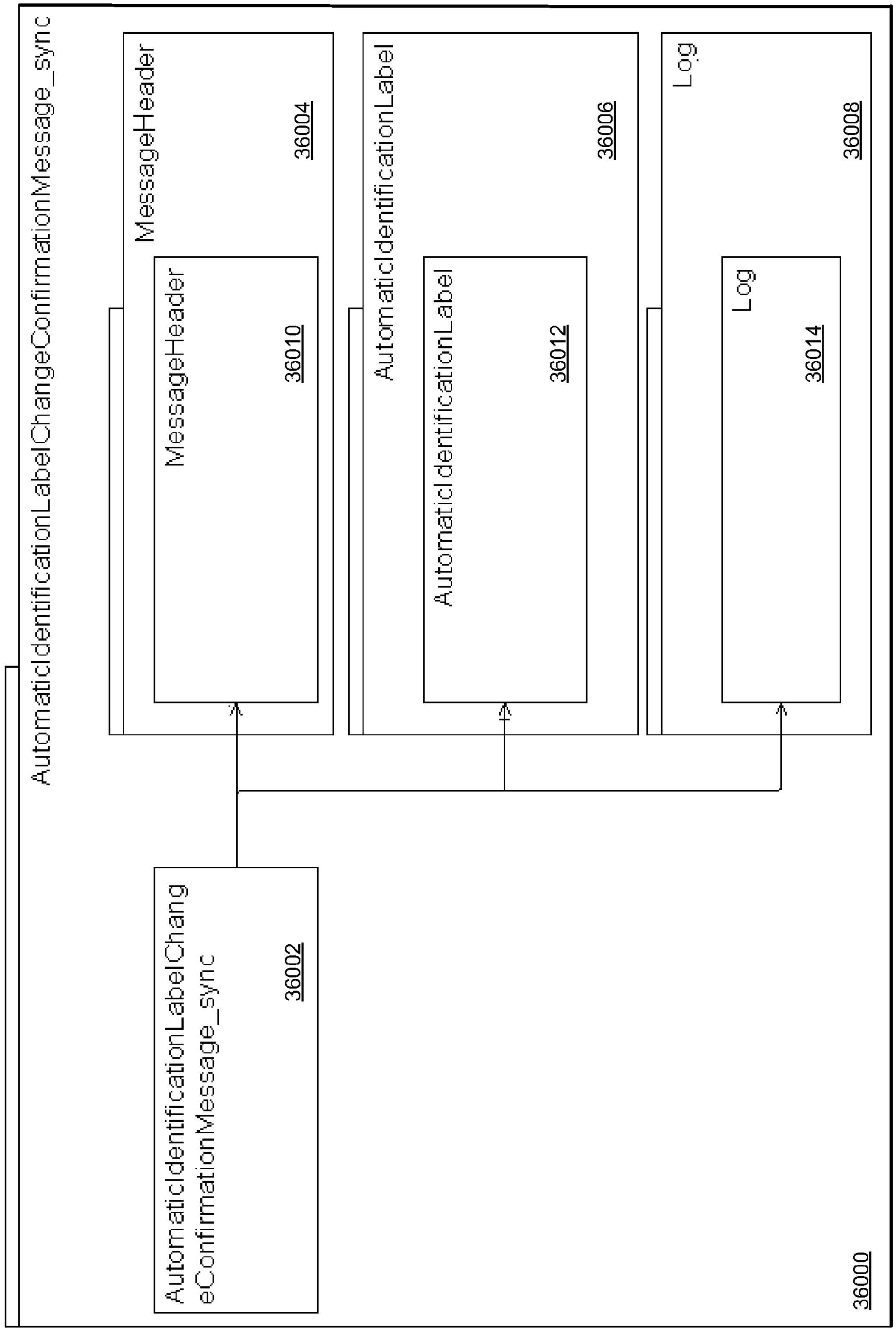
FIG. 36 shows an exemplary AutomaticIdentificationLabelChangeConfirmationMessage_sync Message Data Type.

Additionally, FIG. 36 illustrates one example logical configuration of AutomaticIdentificationLabel-ChangeConfirmationMessage_sync message 36000. Specifically, this figure depicts the arrangement and hierarchy of various components such as one or more levels of packages, entities, and datatypes, shown here as 36000 through 36014. As described above, packages may be used to represent hierarchy levels. Entities are discrete business elements that are used during a business transaction. Data types are used to type object entities and interfaces with a structure. For example, AutomaticIdentificationLabel-ChangeConfirmationMessage_sync message 36000 includes, among other things, AutomaticIdentificationLabel 36006. Accordingly, heterogeneous applications may communicate using this consistent message configured as such.

Figure 37:
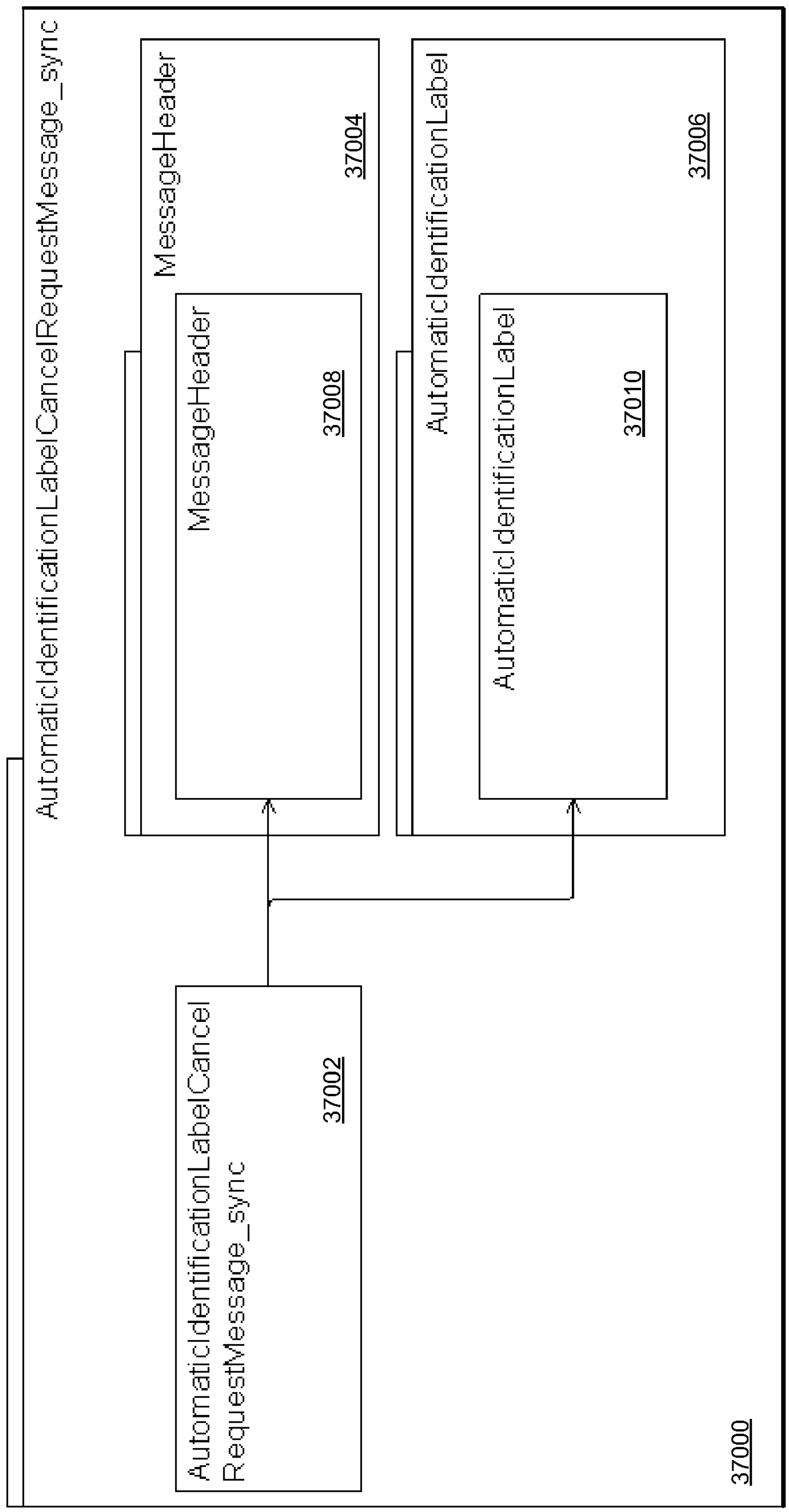
FIG. 37 shows an exemplary AutomaticIdentificationLabelCancelRequestMessage_sync Message Data Type.

Additionally, FIG. 37 illustrates one example logical configuration of AutomaticIdentificationLabel-CancelRequestMessage_sync message 37000. Specifically, this figure depicts the arrangement and hierarchy of various components such as one or more levels of packages, entities, and datatypes, shown here as 37000 through 37010. As described above, packages may be used to represent hierarchy levels. Entities are discrete business elements that are used during a business transaction. Data types are used to type object entities and interfaces with a structure. For example, AutomaticIdentificationLabelCancelRequestMessage_sync message 37000 includes, among other things, AutomaticIdentificationLabel 37006. Accordingly, heterogeneous applications may communicate using this consistent message configured as such.

Figure 38:
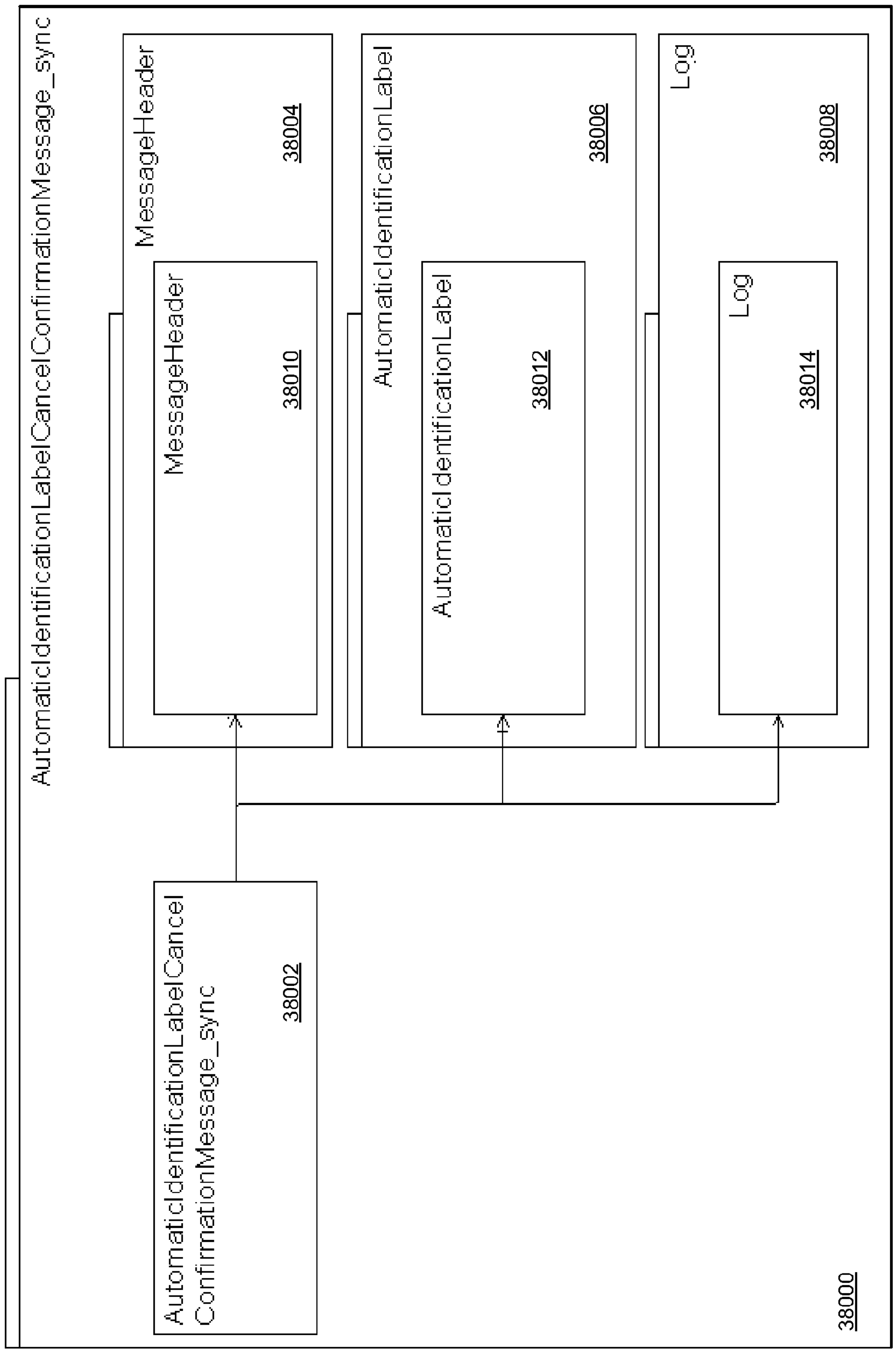
FIG. 38 shows an exemplary AutomaticIdentificationLabelCancelConfirmationMessage_sync Message Data Type.

Additionally, FIG. 38 illustrates one example logical configuration of AutomaticIdentificationLabel-CancelConfirmationMessage_sync message 38000. Specifically, this figure depicts the arrangement and hierarchy of various components such as one or more levels of packages, entities, and datatypes, shown here as 38000 through 38014. As described above, packages may be used to represent hierarchy levels. Entities are discrete business elements that are used during a business transaction. Data types are used to type object entities and interfaces with a structure. For example, AutomaticIdentificationLabel-CancelConfirmationMessage_sync message 38000 includes, among other things, AutomaticIdentificationLabel 38006. Accordingly, heterogeneous applications may communicate using this consistent message configured as such.

Figure 39:
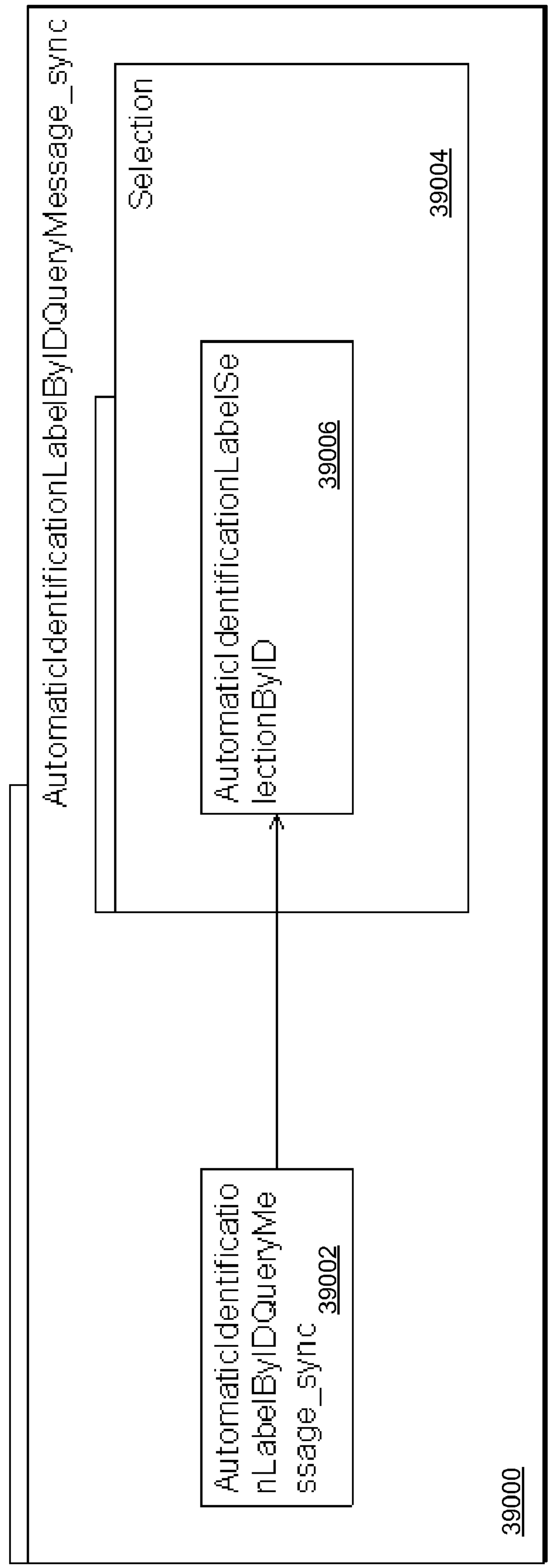
FIG. 39 shows an exemplary AutomaticIdentificationLabelByIDQueryMessage_sync Message Data Type.

Additionally, FIG. 39 illustrates one example logical configuration of AutomaticIdentificationLabelByIDQueryMessage_sync message 39000. Specifically, this figure depicts the arrangement and hierarchy of various components such as one or more levels of packages, entities, and datatypes, shown here as 39000 through 39006. As described above, packages may be used to represent hierarchy levels. Entities are discrete business elements that are used during a business transaction. Data types are used to type object entities and interfaces with a structure. For example, AutomaticIdentificationLabelByIDQueryMessage_sync message 39000 includes, among other things, AutomaticIdentificationLabelSelectionByID 39006. Accordingly, heterogeneous applications may communicate using this consistent message configured as such.

Figure 40:
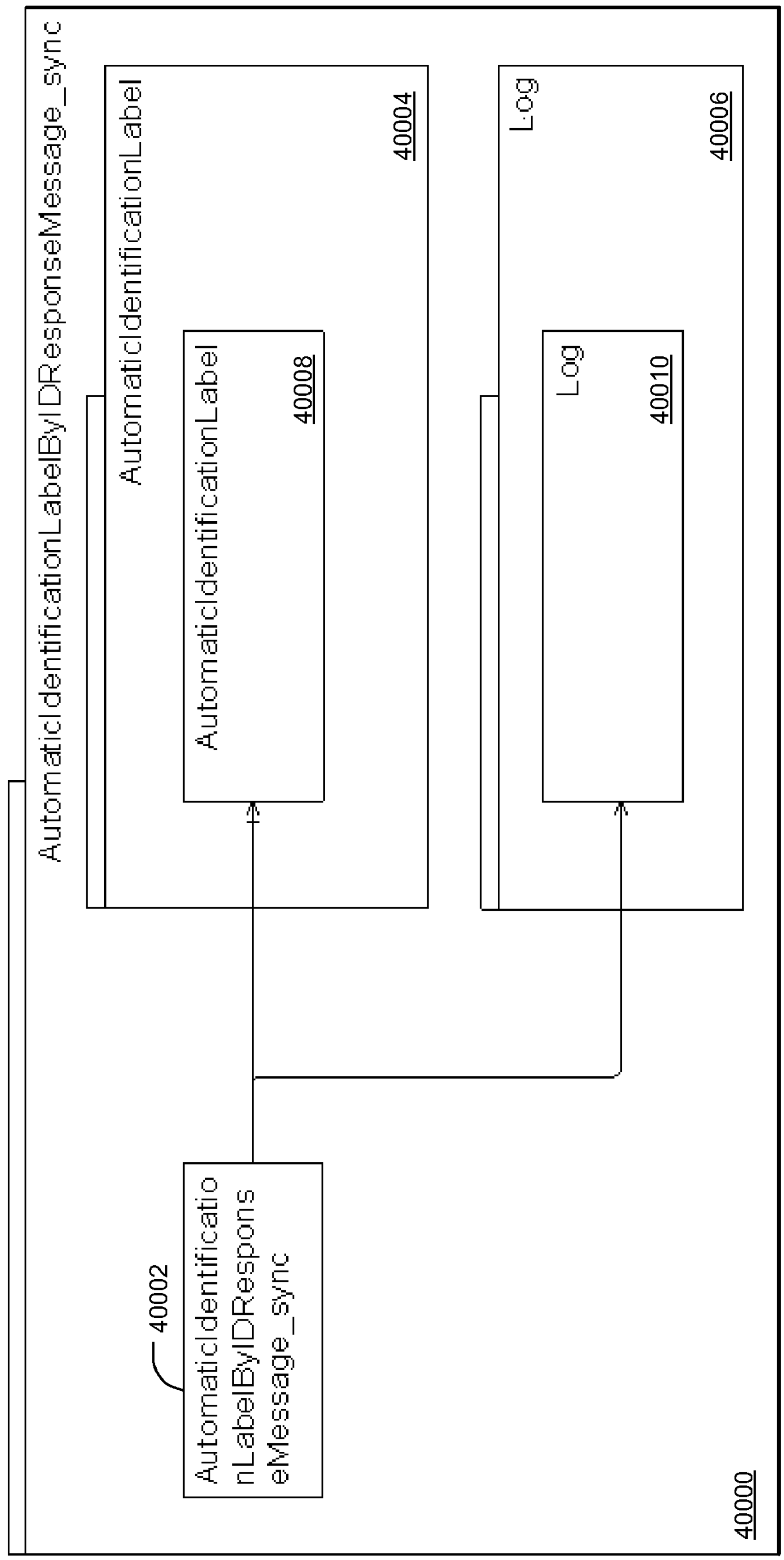
FIG. 40 shows an exemplary AutomaticIdentificationLabelByIDResponseMessage_sync Message Data Type.

Additionally, FIG. 40 illustrates one example logical configuration of AutomaticIdentificationLabelByIDResponseMessage_sync message 40000. Specifically, this figure depicts the arrangement and hierarchy of various components such as one or more levels of packages, entities, and datatypes, shown here as 40000 through 40010. As described above, packages may be used to represent hierarchy levels. Entities are discrete business elements that are used during a business transaction. Data types are used to type object entities and interfaces with a structure. For example, AutomaticIdentificationLabelByIDResponseMessage_sync message 40000 includes, among other things, AutomaticIdentificationLabel 40004. Accordingly, heterogeneous applications may communicate using this consistent message configured as such.

Figure 41:
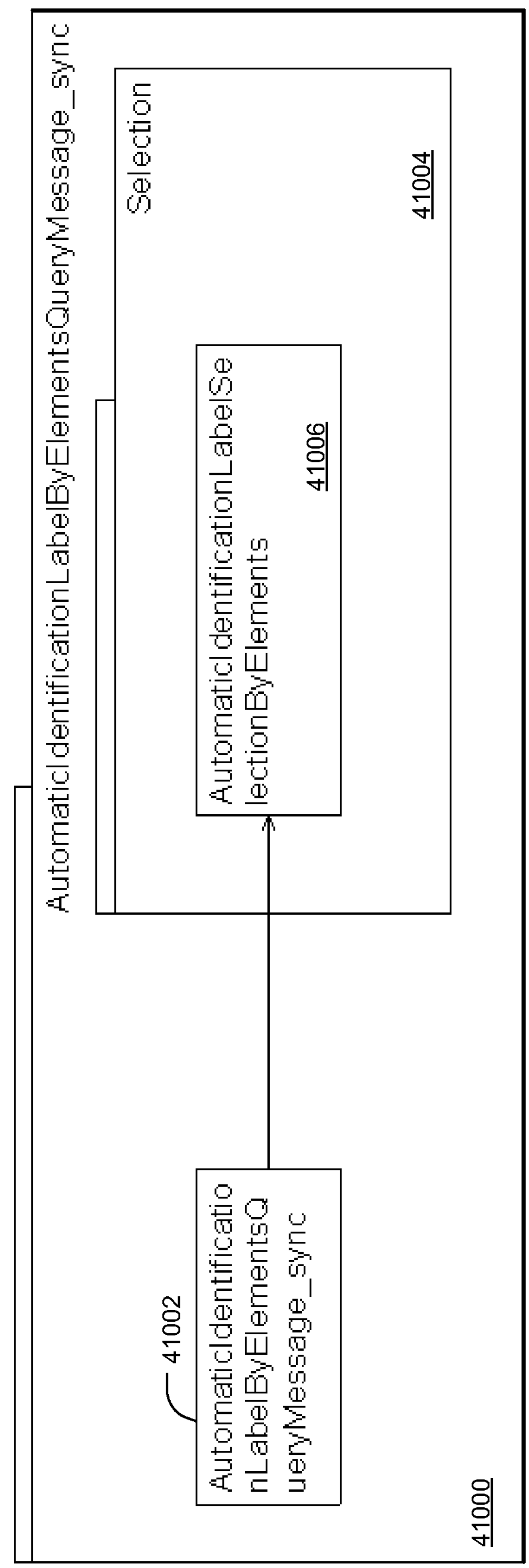
FIG. 41 shows an exemplary AutomaticIdentificationLabelByElementsQueryMessage_sync Message Data Type.

Additionally, FIG. 41 illustrates one example logical configuration of AutomaticIdentificationLabelByElementsQueryMessage_sync message 41000. Specifically, this figure depicts the arrangement and hierarchy of various components such as one or more levels of packages, entities, and datatypes, shown here as 41000 through 41006. As described above, packages may be used to represent hierarchy levels. Entities are discrete business elements that are used during a business transaction. Data types are used to type object entities and interfaces with a structure. For example, AutomaticIdentificationLabelByElementsQueryMessage_sync message 41000 includes, among other things, AutomaticIdentificationLabelByElements 41006. Accordingly, heterogeneous applications may communicate using this consistent message configured as such.

Figure 42:
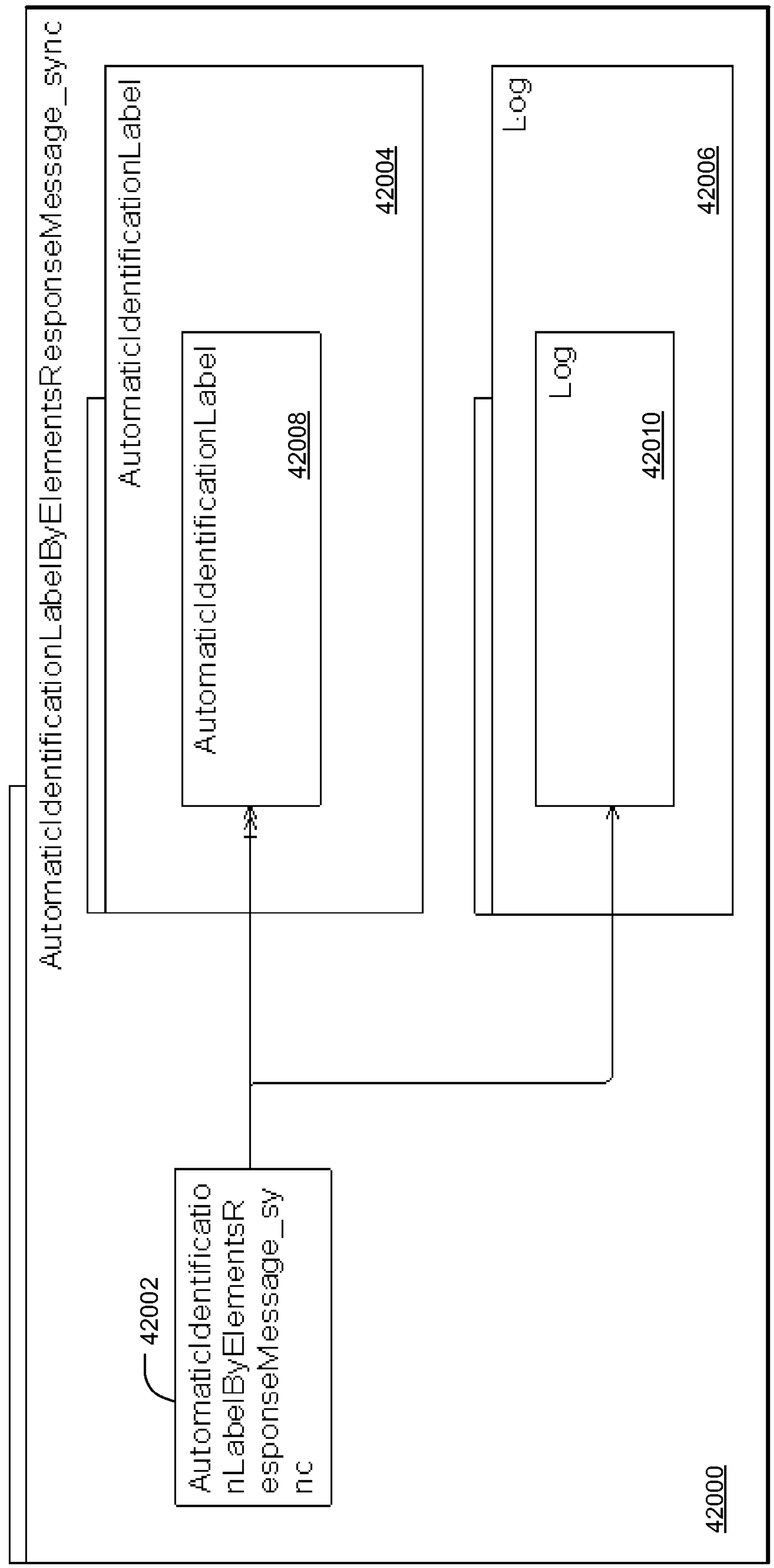
FIG. 42 shows an exemplary AutomaticIdentificationLabelByElementsResponseMessage_sync Message Data Type.

Additionally, FIG. 42 illustrates one example logical configuration of AutomaticIdentificationLabelByElementsResponseMessage_sync message 42000. Specifically, this figure depicts the arrangement and hierarchy of various components such as one or more levels of packages, entities, and datatypes, shown here as 42000 through 42010. As described above, packages may be used to represent hierarchy levels. Entities are discrete business elements that are used during a business transaction. Data types are used to type object entities and interfaces with a structure. For example, AutomaticIdentificationLabelByElementsResponseMessage_sync message 42000 includes, among other things, AutomaticIdentificationLabel 42004. Accordingly, heterogeneous applications may communicate using this consistent message configured as such.

Figure 43:
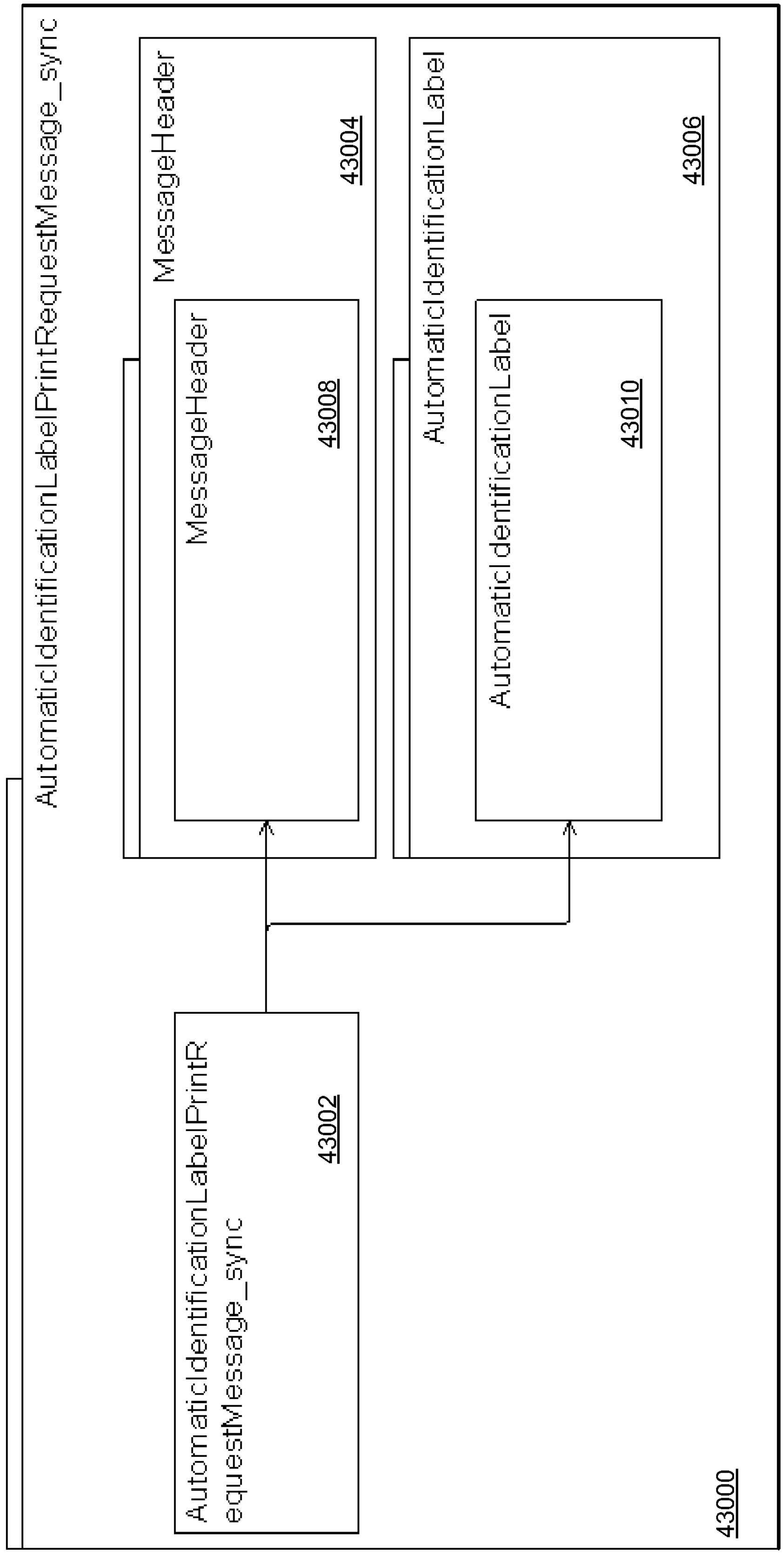
FIG. 43 shows an exemplary AutomaticIdentificationLabelPrintRequestMessage_sync Message Data Type.

Additionally, FIG. 43 illustrates one example logical configuration of AutomaticIdentificationLabelPrintRequestMessage_sync message 43000. Specifically, this figure depicts the arrangement and hierarchy of various components such as one or more levels of packages, entities, and datatypes, shown here as 43000 through 43010. As described above, packages may be used to represent hierarchy levels. Entities are discrete business elements that are used during a business transaction. Data types are used to type object entities and interfaces with a structure. For example, AutomaticIdentificationLabelPrintRequestMessage_sync message 43000 includes, among other things, AutomaticIdentificationLabel 43006. Accordingly, heterogeneous applications may communicate using this consistent message configured as such.

Figure 44:
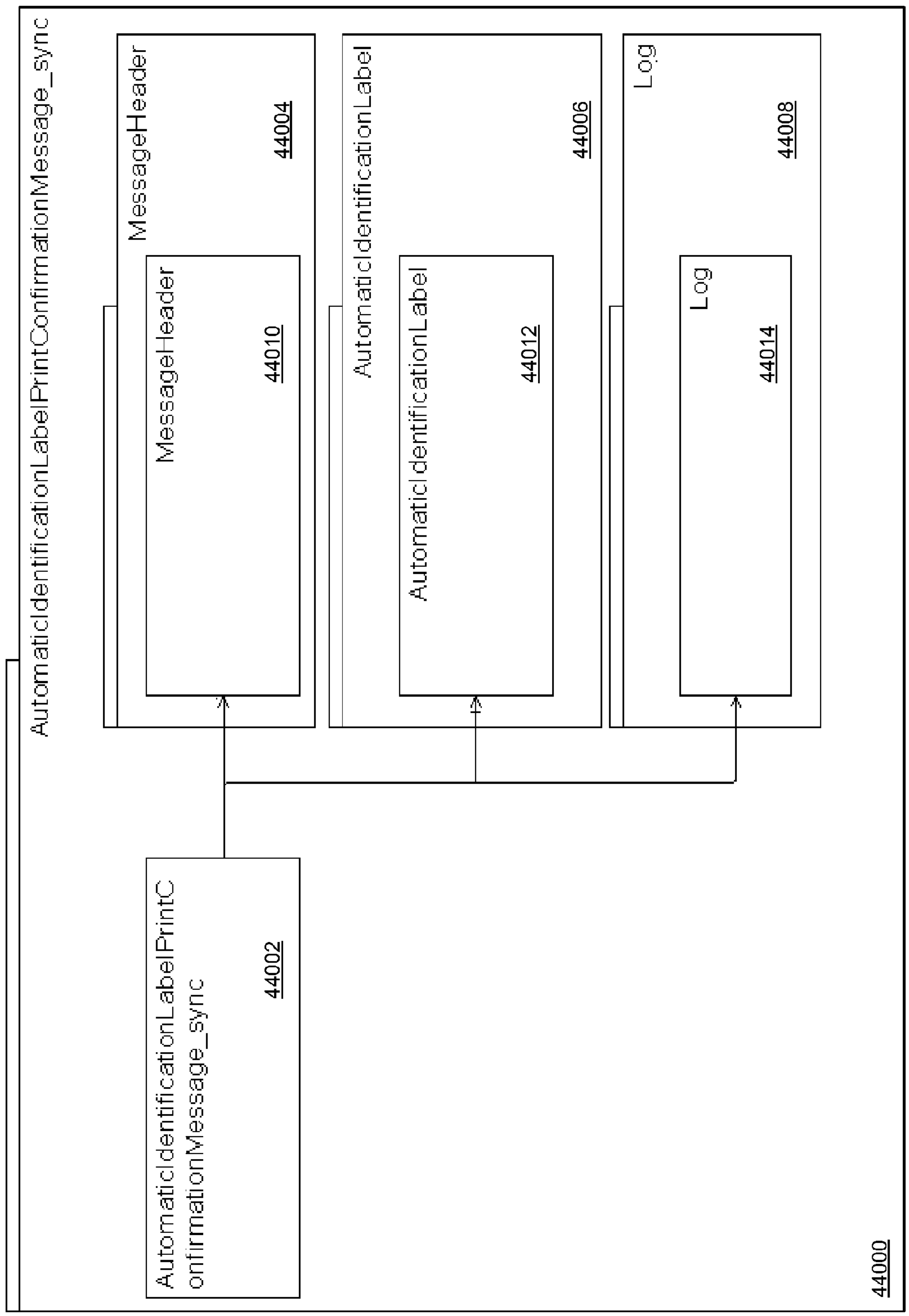
FIG. 44 shows an exemplary AutomaticIdentificationLabelPrintConfirmationMessage_sync Message Data Type.

Additionally, FIG. 44 illustrates one example logical configuration of AutomaticIdentificationLabelPrintConfirmationMessage_sync message 44000. Specifically, this figure depicts the arrangement and hierarchy of various components such as one or more levels of packages, entities, and datatypes, shown here as 44000 through 44014. As described above, packages may be used to represent hierarchy levels. Entities are discrete business elements that are used during a business transaction. Data types are used to type object entities and interfaces with a structure. For example, AutomaticIdentificationLabelPrintConfirmationMessage_sync message 44000 includes, among other things, AutomaticIdentificationLabel 44006. Accordingly, heterogeneous applications may communicate using this consistent message configured as such.

Figure 45:
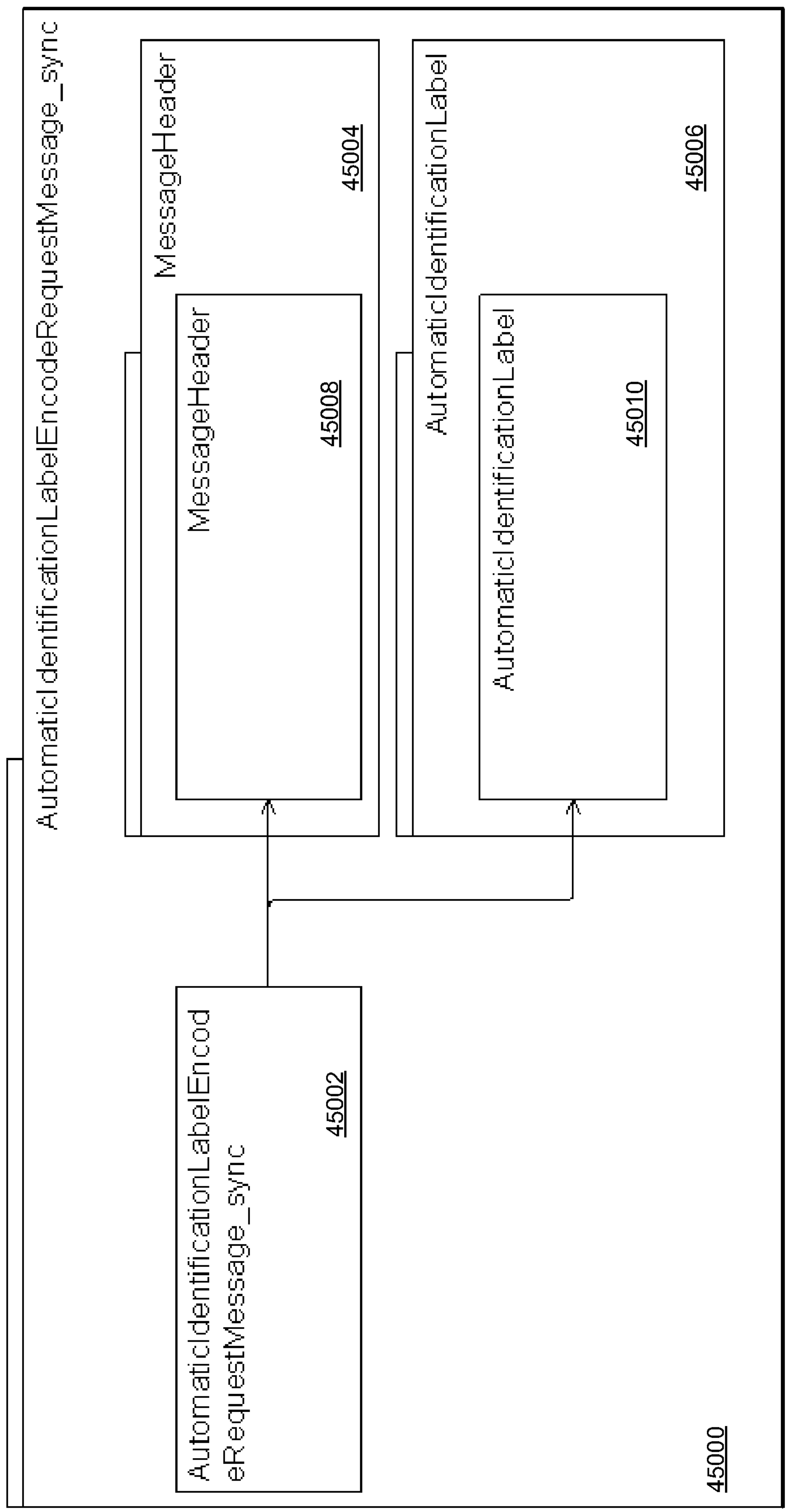
FIG. 45 shows an exemplary AutomaticIdentificationLabelEncodeRequestMessage_sync Message Data Type.

Additionally, FIG. 45 illustrates one example logical configuration of AutomaticIdentificationLabelEncodeRequestMessage_sync message 45000. Specifically, this figure depicts the arrangement and hierarchy of various components such as one or more levels of packages, entities, and datatypes, shown here as 45000 through 45010. As described above, packages may be used to represent hierarchy levels. Entities are discrete business elements that are used during a business transaction. Data types are used to type object entities and interfaces with a structure. For example, AutomaticIdentificationLabelEncodeRequestMessage_sync message 45000 includes, among other things, AutomaticIdentificationLabel 45006. Accordingly, heterogeneous applications may communicate using this consistent message configured as such.

Figure 46:
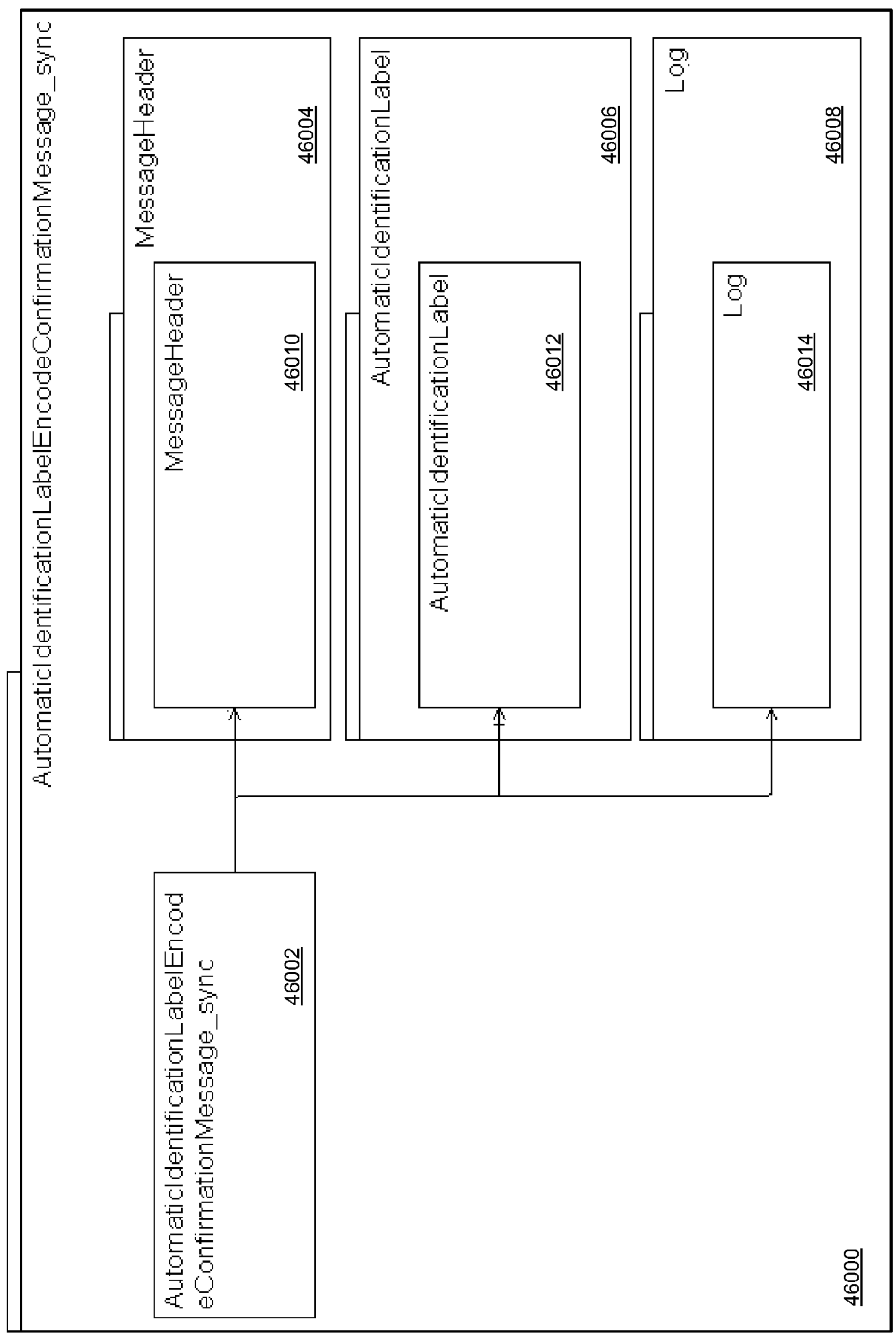
FIG. 46 shows an exemplary AutomaticIdentificationLabelEncodeConfirmationMessage_sync Message Data Type.

Additionally, FIG. 46 illustrates one example logical configuration of AutomaticIdentificationLabelEncodeConfirmationMessage_sync message 46000. Specifically, this figure depicts the arrangement and hierarchy of various components such as one or more levels of packages, entities, and datatypes, shown here as 46000 through 46014. As described above, packages may be used to represent hierarchy levels. Entities are discrete business elements that are used during a business transaction. Data types are used to type object entities and interfaces with a structure. For example, AutomaticIdentificationLabelEncodeConfirmationMessage_sync message 46000 includes, among other things, AutomaticIdentificationLabel 46006. Accordingly, heterogeneous applications may communicate using this consistent message configured as such.

Figure 47:
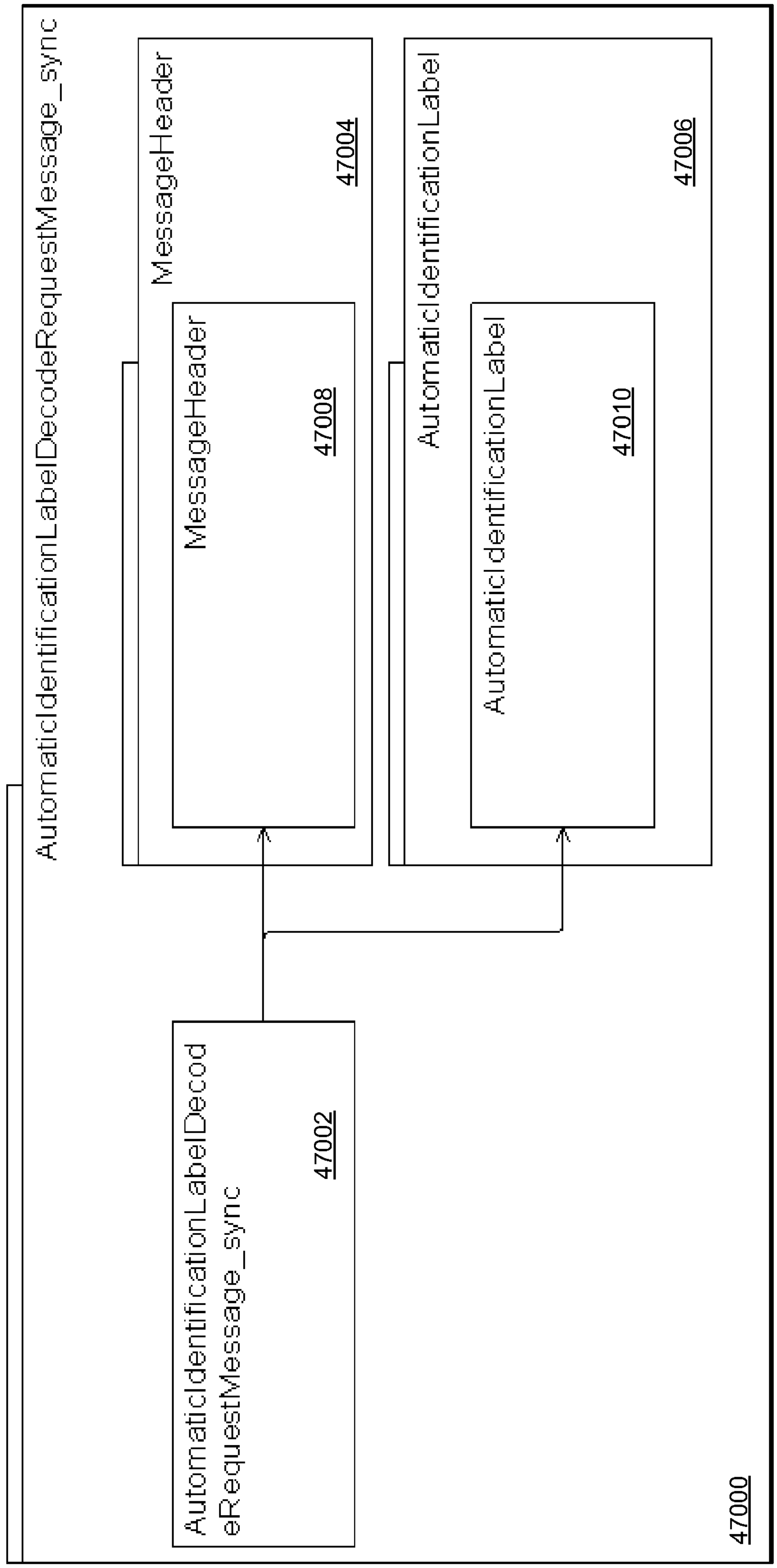
FIG. 47 shows an exemplary AutomaticIdentificationLabelDecodeRequestMessage_sync Message Data Type.

Additionally, FIG. 47 illustrates one example logical configuration of AutomaticIdentificationLabelDecodeRequestMessage_sync message 47000. Specifically, this figure depicts the arrangement and hierarchy of various components such as one or more levels of packages, entities, and datatypes, shown here as 47000 through 47010. As described above, packages may be used to represent hierarchy levels. Entities are discrete business elements that are used during a business transaction. Data types are used to type object entities and interfaces with a structure. For example, AutomaticIdentificationLabelDecodeRequestMessage_sync message 47000 includes, among other things, AutomaticIdentificationLabel 47006. Accordingly, heterogeneous applications may communicate using this consistent message configured as such.

Figure 48:
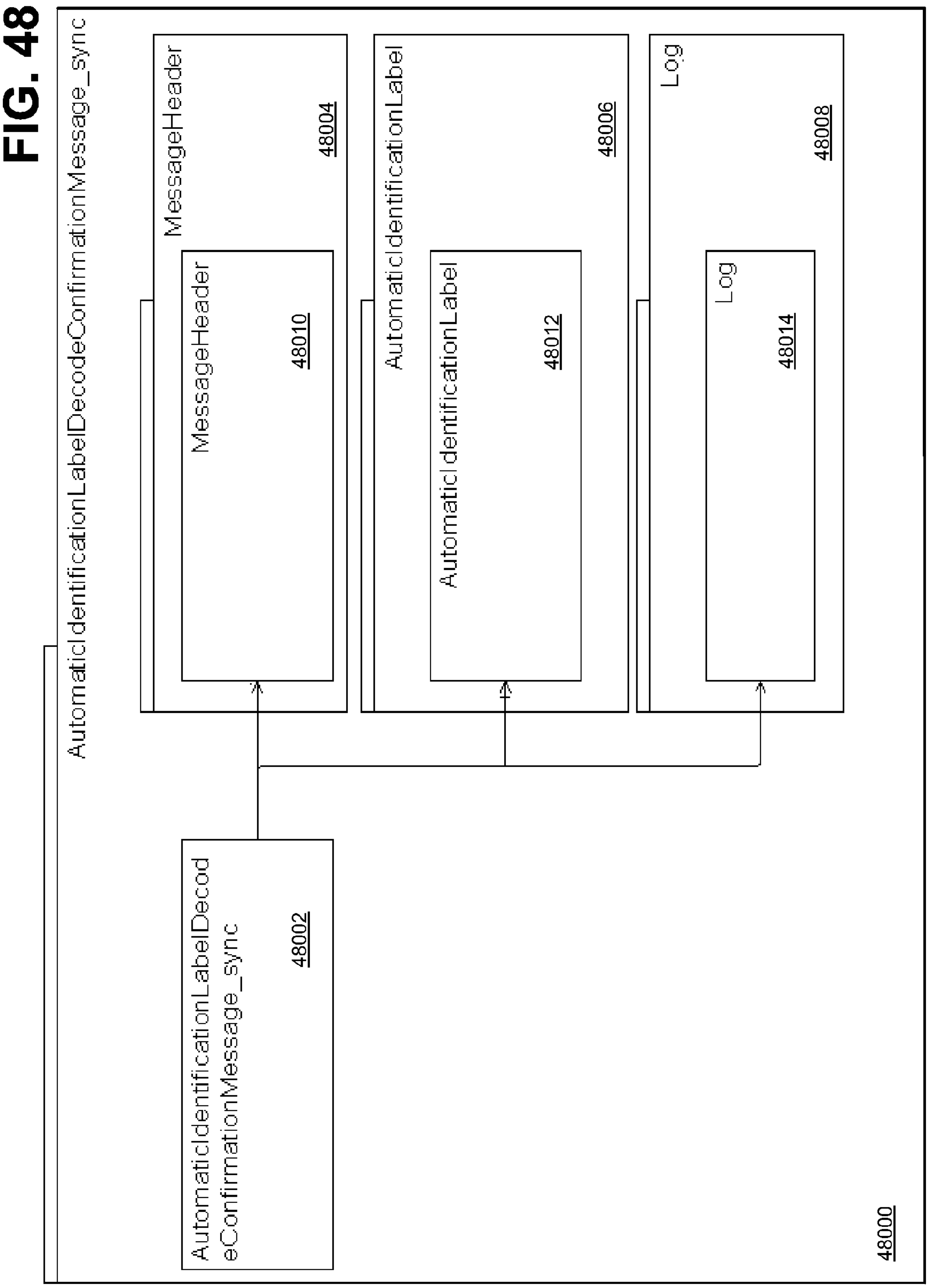
FIG. 48 shows an exemplary AutomaticIdentificationLabelDecodeConfirmationMessage_sync Message Data Type.

Additionally, FIG. 48 illustrates one example logical configuration of AutomaticIdentificationLabelDecodeConfirmationMessage_sync message 48000. Specifically, this figure depicts the arrangement and hierarchy of various components such as one or more levels of packages, entities, and datatypes, shown here as 48000 through 48014. As described above, packages may be used to represent hierarchy levels. Entities are discrete business elements that are used during a business transaction. Data types are used to type object entities and interfaces with a structure. For example, AutomaticIdentificationLabelDecodeConfirmationMessage_sync message 48000 includes, among other things, AutomaticIdentificationLabel 48006. Accordingly, heterogeneous applications may communicate using this consistent message configured as such.

FIG. 49 illustrates one example logical configuration of an AutomaticIdentificationLabelDeviceByElementsResponseMessage_sync 49000 element structure. Specifically, this figure depicts the arrangement and hierarchy of various components such as one or more levels of packages, entities, and datatypes, shown here as 49000 through 49030. As described above, packages may be used to represent hierarchy levels. Entities are discrete business elements that are used during a business transaction. Data types are used to type object entities and interfaces with a structure. For example, the AutomaticIdentificationLabelDeviceByElementsResponseMessage_sync 49000 includes, among other things, an AutomaticIdentificationLabelDeviceByElementsResponseMessage_sync 49002. Accordingly, heterogeneous applications may communicate using this consistent message configured as such.

FIG. 50 illustrates one example logical configuration of an AutomaticIdentificationLabelByElementsQueryMessage_sync 50000 element structure. Specifically, this figure depicts the arrangement and hierarchy of various components such as one or more levels of packages, entities, and datatypes, shown here as 50000 through 50028. As described above, packages may be used to represent hierarchy levels. Entities are discrete business elements that are used during a business transaction. Data types are used to type object entities and interfaces with a structure. For example, the AutomaticIdentificationLabelByElementsQueryMessage_sync 50000 includes, among other things, an AutomaticIdentificationLabelByElementsQueryMessage_sync 50002. Accordingly, heterogeneous applications may communicate using this consistent message configured as such.

FIGS. 51-1 through 51-2 illustrate one example logical configuration of an AutomaticIdentificationLabelByElementsResponseMessage_sync 51000 element structure. Specifically, these figures depict the arrangement and hierarchy of various components such as one or more levels of packages, entities, and datatypes, shown here as 51000 through 51042. As described above, packages may be used to represent hierarchy levels. Entities are discrete business elements that are used during a business transaction. Data types are used to type object entities and interfaces with a structure. For example, the AutomaticIdentificationLabelByElementsResponseMessage_sync 51000 includes, among other things, an AutomaticIdentificationLabelByElementsResponseMessage_sync 51002. Accordingly, heterogeneous applications may communicate using this consistent message configured as such.

FIG. 52 illustrates one example logical configuration of an AutomaticIdentificationLabelByIDQueryMessage_sync 52000 element structure. Specifically, this figure depicts the arrangement and hierarchy of various components such as one or more levels of packages, entities, and datatypes, shown here as 52000 through 52016. As described above, packages may be used to represent hierarchy levels. Entities are discrete business elements that are used during a business transaction. Data types are used to type object entities and interfaces with a structure. For example, the AutomaticIdentificationLabelByIDQueryMessage_sync 52000 includes, among other things, an AutomaticIdentificationLabelByIDQueryMessage_sync 52002. Accordingly, heterogeneous applications may communicate using this consistent message configured as such.

FIGS. 53-1 through 53-2 illustrate one example logical configuration of an AutomaticIdentificationLabelByIDResponseMessage_sync 53000 element structure. Specifically, these figures depict the arrangement and hierarchy of various components such as one or more levels of packages, entities, and datatypes, shown here as 53000 through 53042. As described above, packages may be used to represent hierarchy levels. Entities are discrete business elements that are used during a business transaction. Data types are used to type object entities and interfaces with a structure. For example, the AutomaticIdentificationLabelByIDResponseMessage_sync 53000 includes, among other things, an AutomaticIdentificationLabelByIDResponseMessage_sync 53002. Accordingly, heterogeneous applications may communicate using this consistent message configured as such.

FIG. 54 illustrates one example logical configuration of an AutomaticIdentificationLabelChangeConfirmationMessage_sync 54000 element structure. Specifically, this figure depicts the arrangement and hierarchy of various components such as one or more levels of packages, entities, and datatypes, shown here as 54000 through 54036. As described above, packages may be used to represent hierarchy levels. Entities are discrete business elements that are used during a business transaction. Data types are used to type object entities and interfaces with a structure. For example, the AutomaticIdentificationLabelChangeConfirmationMessage_sync 54000 includes, among other things, an AutomaticIdentificationLabelCancelConfirmationMessage_sync 54002. Accordingly, heterogeneous applications may communicate using this consistent message configured as such.

FIG. 55 illustrates one example logical configuration of an AutomaticIdentificationLabelCancelRequestMessage_sync 55000 element structure. Specifically, this figure depicts the arrangement and hierarchy of various components such as one or more levels of packages, entities, and datatypes, shown here as 55000 through 55028. As described above, packages may be used to represent hierarchy levels. Entities are discrete business elements that are used during a business transaction. Data types are used to type object entities and interfaces with a structure. For example, the AutomaticIdentificationLabelCancelRequestMessage_sync 55000 includes, among other things, an AutomaticIdentificationLabelCancelRequestMessage_sync 55002. Accordingly, heterogeneous applications may communicate using this consistent message configured as such.

FIGS. 56-1 through 56-2 illustrate one example logical configuration of an AutomaticIdentificationLabelChangeConfirmationMessage_sync 56000 element structure. Specifically, these figures depict the arrangement and hierarchy of various components such as one or more levels of packages, entities, and datatypes, shown here as 56000 through 56054. As described above, packages may be used to represent hierarchy levels. Entities are discrete business elements that are used during a business transaction. Data types are used to type object entities and interfaces with a structure. For example, the AutomaticIdentificationLabel-ChangeConfirmationMessage_sync 56000 includes, among other things, an AutomaticIdentificationLabel-ChangeConfirmationMessage_sync 56002. Accordingly, heterogeneous applications may communicate using this consistent message configured as such.

FIGS. 57-1 through 57-2 illustrate one example logical configuration of an AutomaticIdentificationLabel-ChangeRequestMessage_sync 57000 element structure. Specifically, these figures depict the arrangement and hierarchy of various components such as one or more levels of packages, entities, and datatypes, shown here as 57000 through 57046. As described above, packages may be used to represent hierarchy levels. Entities are discrete business elements that are used during a business transaction. Data types are used to type object entities and interfaces with a structure. For example, the AutomaticIdentificationLabel-ChangeRequestMessage_sync 57000 includes, among other things, an AutomaticIdentificationLabel-ChangeRequestMessage_sync 57002. Accordingly, heterogeneous applications may communicate using this consistent message configured as such.

FIGS. 58-1 through 58-2 illustrate one example logical configuration of an AutomaticIdentificationLabel-CreateConfirmationMessage_sync 58000 element structure. Specifically, these figures depict the arrangement and hierarchy of various components such as one or more levels of packages, entities, and datatypes, shown here as 58000 through 58054. As described above, packages may be used to represent hierarchy levels. Entities are discrete business elements that are used during a business transaction. Data types are used to type object entities and interfaces with a structure. For example, the AutomaticIdentificationLabel-CreateConfirmationMessage_sync 58000 includes, among other things, an AutomaticIdentificationLabel-CreateConfirmationMessage_sync 58002. Accordingly, heterogeneous applications may communicate using this consistent message configured as such.

FIGS. 59-1 through 59-2 illustrate one example logical configuration of an AutomaticIdentificationLabel-CreateRequestMessage_sync 59000 element structure. Specifically, these figures depict the arrangement and hierarchy of various components such as one or more levels of packages, entities, and datatypes, shown here as 59000 through 59046. As described above, packages may be used to represent hierarchy levels. Entities are discrete business elements that are used during a business transaction. Data types are used to type object entities and interfaces with a structure. For example, the AutomaticIdentificationLabel-CreateRequestMessage_sync 59000 includes, among other things, an AutomaticIdentificationLabel-CreateRequestMessage_sync 59002. Accordingly, heterogeneous applications may communicate using this consistent message configured as such.

FIGS. 60-1 through 60-2 illustrate one example logical configuration of an AutomaticIdentificationLabel-DecodeConfirmationMessage_sync 60000 element structure. Specifically, these figures depict the arrangement and hierarchy of various components such as one or more levels of packages, entities, and datatypes, shown here as 60000 through 60042. As described above, packages may be used to represent hierarchy levels. Entities are discrete business elements that are used during a business transaction. Data types are used to type object entities and interfaces with a structure. For example, the AutomaticIdentificationLabel-DecodeConfirmationMessage_sync 60000 includes, among other things, an AutomaticIdentificationLabel-DecodeConfirmationMessage_sync 60002. Accordingly, heterogeneous applications may communicate using this consistent message configured as such.

FIG. 61 illustrates one example logical configuration of an AutomaticIdentificationLabelDecodeRequestMessage_sync 61000 element structure. Specifically, this figure depicts the arrangement and hierarchy of various components such as one or more levels of packages, entities, and datatypes, shown here as 61000 through 61028. As described above, packages may be used to represent hierarchy levels. Entities are discrete business elements that are used during a business transaction. Data types are used to type object entities and interfaces with a structure. For example, the AutomaticIdentificationLabel-DecodeRequestMessage_sync 61000 includes, among other things, an AutomaticIdentificationLabel-DecodeRequestMessage_sync 61002. Accordingly, heterogeneous applications may communicate using this consistent message configured as such.

FIGS. 62-1 through 62-2 illustrate one example logical configuration of an AutomaticIdentificationLabelEncodeConfirmationMessage_sync 62000 element structure. Specifically, these figures depict the arrangement and hierarchy of various components such as one or more levels of packages, entities, and datatypes, shown here as 62000 through 62042. As described above, packages may be used to represent hierarchy levels. Entities are discrete business elements that are used during a business transaction. Data types are used to type object entities and interfaces with a structure. For example, the AutomaticIdentificationLabelEncodeConfirmationMessage_sync 62000 includes, among other things, an AutomaticIdentificationLabelEncodeConfirmationMessage_sync 62002. Accordingly, heterogeneous applications may communicate using this consistent message configured as such.

FIG. 63 illustrates one example logical configuration of an AutomaticIdentificationLabelEncodeRequestMessage_sync 63000 element structure. Specifically, this figure depicts the arrangement and hierarchy of various components such as one or more levels of packages, entities, and datatypes, shown here as 63000 through 63028. As described above, packages may be used to represent hierarchy levels. Entities are discrete business elements that are used during a business transaction. Data types are used to type object entities and interfaces with a structure. For example, the AutomaticIdentificationLabelEncodeRequestMessage_sync 63000 includes, among other things, an AutomaticIdentificationLabelEncodeRequestMessage_sync 63002. Accordingly, heterogeneous applications may communicate using this consistent message configured as such.

FIGS. 64-1 through 64-2 illustrate one example logical configuration of an AutomaticIdentificationLabel-PrintConfirmationMessage_sync 64000 element structure. Specifically, these figures depict the arrangement and hierarchy of various components such as one or more levels of packages, entities, and datatypes, shown here as 64000 through 64042. As described above, packages may be used to represent hierarchy levels. Entities are discrete business elements that are used during a business transaction. Data types are used to type object entities and interfaces with a structure. For example, the AutomaticIdentificationLabel-PrintConfirmationMessage_sync 64000 includes, among other things, an AutomaticIdentificationLabel- PrintConfirmationMessage_sync 64002. Accordingly, heterogeneous applications may communicate using this consistent message configured as such.

FIG. 65 illustrates one example logical configuration of an AutomaticIdentificationLabelPrintRequestMessage_sync 65000 element structure. Specifically, this figure depicts the arrangement and hierarchy of various components such as one or more levels of packages, entities, and datatypes, shown here as 65000 through 65034. As described above, packages may be used to represent hierarchy levels. Entities are discrete business elements that are used during a business transaction. Data types are used to type object entities and interfaces with a structure. For example, the AutomaticIdentificationLabelPrintRequestMessage_sync 65000 includes, among other things, an AutomaticIdentificationLabelPrintRequestMessage_sync 65002. Accordingly, heterogeneous applications may communicate using this consistent message configured as such.

Message Data Type AutomaticIdentificationLabelCreateRequestMessage_sync

The message data type AutomaticIdentificationLabelCreateRequestMessage_sync includes the business information that is relevant for sending a business document in a message and the AutomaticIdentificationLabel included in the business document. It can include the packages MessageHeader and AutomaticIdentificationLabel. A MessageHeader package groups the business information that is relevant for sending a business document in a message. It can include an entity of MessageHeader. A MessageHeader groups the following business information from the perspective of the sending application: information to identify the business document in a message, information about the sender, and information about the recipient. The MessageHeader can include the entities SenderParty and RecipientParty. It is a GDT of type BasicBusinessDocumentMessageHeader. MessageHeader can include the elements of the GDT: ID, ReferenceID, SenderParty, RecipientParty, and CreationDateTime. A SenderParty is the party responsible for sending the business document at a business application level. The SenderParty is of type GDT:BusinessDocumentMessageHeaderParty. A RecipientParty is the party responsible for receiving the business document at a business application level. The RecipientParty is of type GDT:BusinessDocumentMessageHeaderParty.

An AutomaticIdentificationLabel package includes the data of an AutomaticIdentificationLabel. It can include the entity: AutomaticIdentificationLabel. An AutomaticIdentificationLabel is a label that can be automatically identified. The AutomaticIdentificationLabel entity can include elements ID, HexadecimalAutomaticIdentificationLabelID, ReferenceObjectID, and ReferenceObjectType. An ID is the identifier of an AutomaticIdentificationLabel in 'Pure ID' (pure) format. It is a GDT of type AutomaticIdentificationLabelID. The HexadecimalAutomaticIdentificationLabelID is the identifier of an AutomaticIdentificationLabel in 'Hex ID' (hexadecimal) format and can be optional. It is a GDT of type AutomaticIdentificationLabelID. The ReferenceObjectID is the ID of a business object to which the AutomaticIdentificationLabel is assigned and can be optional. It is a GDT of type ObjectID. The ReferenceObjectType is the type of a business object to which the AutomaticIdentificationLabel is assigned and can be optional. It is a GDT of type BusinessObjectTypeCode. The ID can be given in 'Pure ID' format and the HexadecimalAutomaticIdentificationLabelID can be given in 'Hex ID' format, which are specified in the code list of the GDT AutomaticIdentificationLabelEncodingFormatCode. If the ReferenceObjectID is specified then the ReferenceObjectType can also be specified.

Message Data Type AutomaticIdentificationLabelCreateConfirmationMessage_sync

The message data type AutomaticIdentificationLabelCreateConfirmationMessage_sync includes the business information that is relevant for sending a business document in a message, the AutomaticIdentificationLabel included in the business document, and the information of the message log. It can include the packages MessageHeader, AutomaticIdentificationLabel, and Log. A Log package groups the messages used for user interaction. It can include the entity Log. A log is a sequence of messages that result when an application executes a task. The entity Log is a GDT of type Log.

Message Data Type AutomaticIdentificationLabelChangeRequestMessage_sync

The message data type AutomaticIdentificationLabelChangeRequestMessage_sync includes the business information that is relevant for sending a business document in a message and the AutomaticIdentificationLabel included in the business document. It includes the packages MessageHeader and AutomaticIdentificationLabel.

Message Data Type AutomaticIdentificationLabelChangeConfirmationMessage_sync

The message data type AutomaticIdentificationLabelChangeConfirmationMessage_sync includes the business information that is relevant for sending a business document in a message, the AutomaticIdentificationLabel included in the business document and the information of the message log. It can include the packages MessageHeader, AutomaticIdentificationLabel, and Log.

Message Data Type AutomaticIdentificationLabelCancelRequestMessage_sync

The message data type AutomaticIdentificationLabelCancelRequestMessage_sync includes the business information that is relevant for sending a business document in a message and the AutomaticIdentificationLabel included in the business document. It can include the packages MessageHeader and AutomaticIdentificationLabel. An AutomaticIdentificationLabel package includes the data of an AutomaticIdentificationLabel. It can include the entity AutomaticIdentificationLabel. An AutomaticIdentificationLabel is a label that can be automatically identified. The AutomaticIdentificationLabel entity can include the element ID. The ID is an identifier of an AutomaticIdentificationLabel in 'Pure ID' (pure) format. It is a GDT of type AutomaticIdentificationLabelID. The ID can be given in 'Pure ID' format, which can be specified in the code list of the GDT AutomaticIdentificationLabelEncodingFormatCode.

Message Data Type AutomaticIdentificationLabelCancelConfirmationMessage_sync

The message data type AutomaticIdentificationLabelCancelConfirmationMessage_sync includes the business information that is relevant for sending a business document in a message, the AutomaticIdentificationLabel included in the business document, and the information of the message log. It can include the packages MessageHeader, AutomaticIdentificationLabel, and Log.

Message Data Type AutomaticIdentificationLabelByIDQueryMessage_sync

The message data type AutomaticIdentificationLabelByIDQueryMessage_sync includes the Selection included in the business document. It can include the package Selection. The Selection package groups the AutomaticIdentificationLabel selection criteria. Selection can include the entity AutomaticIdentificationLabelSelectionByID. AutomaticIdentificationLabelSelectionByID specifies the ID to select an AutomaticIdentificationLabel. The AutomaticIdentificationLabelSelectionByID entity includes an element ID. ID can be the identifier of an AutomaticIdentificationLabel in 'Pure ID' (pure) format. It is a GDT of type AutomaticIdentificationLabelID. The ID can be given in 'Pure ID' format, which is specified in the code list of the GDT AutomaticIdentificationLabelEncodingFormatCode.

Message Data Type AutomaticIdentificationLabelByIDResponseMessage_sync

The message data type AutomaticIdentificationLabelByIDResponseMessage_sync includes the AutomaticIdentificationLabel included in the business document and the information of the message log. It can include the packages AutomaticIdentificationLabel and Log.

Message Data Type AutomaticIdentificationLabelByElementsQueryMessage_sync

The message data type AutomaticIdentificationLabelByElementsMessage_sync includes the Selection included in the business document. It can include the package Selection. The Selection package groups the AutomaticIdentificationLabel selection criteria. Selection can include the entity AutomaticIdentificationLabelSelectionByElements. AutomaticIdentificationLabelSelectionByElements specifies elements to select an AutomaticIdentificationLabel. The AutomaticIdentificationLabelSelectionByElements entity can include the elements HexadecimalAutomaticIdentificationLabelID, ReferenceObjectID, and ReferenceObjectType. The HexadecimalAutomaticIdentificationLabelID is the identifier of an AutomaticIdentificationLabel in 'Hex ID' (hexadecimal) format and can be optional. It is a GDT of type AutomaticIdentificationLabelID. The ReferenceObjectID is the ID of a business object to which the AutomaticIdentificationLabel is assigned and it can be optional. It is a GDT of type ObjectID. The ReferenceObjectType is the type of a business object to which the AutomaticIdentificationLabel is assigned and it can be optional. It is a GDT of type BusinessObjectObjectTypeCode. The HexadecimalAutomaticIdentificationLabelID can be given in 'Hex ID' format, which is specified in the code list of the GDT AutomaticIdentificationLabelEncodingFormatCode. Either HexadecimalAutomaticIdentificationLabelID or ReferenceObjectID can be specified. If the ReferenceObjectID is specified then the ReferenceObjectType can also be specified.

Message Data Type AutomaticIdentificationLabelByElementsResponseMessage_sync

The message data type AutomaticIdentificationLabelByElementsResponseMessage_sync includes the AutomaticIdentificationLabel included in the business document and the information of the message log. It can include the packages AutomaticIdentificationLabel and Log.

Message Data Type AutomaticIdentificationLabelPrintRequestMessage_sync

The message data type AutomaticIdentificationLabelPrintRequestMessage_sync includes business information that is relevant for sending a business document in a message and an AutomaticIdentificationLabel included in the business document. It can include the packages MessageHeader and AutomaticIdentificationLabel. An AutomaticIdentificationLabel package includes the data of an AutomaticIdentificationLabel. It can include the entity AutomaticIdentificationLabel. An AutomaticIdentificationLabel is a label that can be automatically identified. The AutomaticIdentificationLabel entity can include the elements HexadecimalAutomaticIdentificationLabelID.

The HexadecimalAutomaticIdentificationLabelID is the identifier of an AutomaticIdentificationLabel in 'Hex ID' (hexadecimal) format. It is a GDT of type AutomaticIdentificationLabelID. The HexadecimalAutomaticIdentificationLabelID can be given in 'Hex ID' format, which is specified in the code list of the GDT AutomaticIdentificationLabelEncodingFormatCode.

Message Data Type AutomaticIdentificationLabelPrintConfirmationMessage_sync

The message data type AutomaticIdentificationLabelPrintConfirmationMessage_sync includes the business information that is relevant for sending a business document in a message, the AutomaticIdentificationLabel included in the business document, and the information of the message log. It can include the packages MessageHeader, AutomaticIdentificationLabel, and Log.

Message Data Type AutomaticIdentificationLabelEncodeRequestMessage_sync

The message data type AutomaticIdentificationLabelEncodeRequestMessage_sync includes the business information that is relevant for sending a business document in a message and the AutomaticIdentificationLabel included in the business document. It can include the packages MessageHeader and AutomaticIdentificationLabel.

Message Data Type AutomaticIdentificationLabelEncodeConfirmationMessage_sync

The message data type AutomaticIdentificationLabelEncodeConfirmationMessage_sync includes the business information that is relevant for sending a business document in a message, the AutomaticIdentificationLabel included in the business document, and the information of the message log. It can include the packages MessageHeader, AutomaticIdentificationLabel and Log. An AutomaticIdentificationLabel package includes the data of an AutomaticIdentificationLabel. It includes an entity AutomaticIdentificationLabel. An AutomaticIdentificationLabel is a label that can be automatically identified. The AutomaticIdentificationLabel entity can include the elements ID and HexadecimalAutomaticIdentificationLabelID. The ID is the identifier of an AutomaticIdentificationLabel in 'Pure ID' (pure) format. It is a GDT of type AutomaticIdentificationLabelID. The HexadecimalAutomaticIdentificationLabelID is the identifier of an AutomaticIdentificationLabel in 'Hex ID' (hexadecimal) format and it can be optional. It is a GDT of type AutomaticIdentificationLabelID. The ID is given in 'Pure ID' format and the HexadecimalAutomaticIdentificationLabelID is given in 'Hex ID' format, which are specified in the code list of the GDT AutomaticIdentificationLabelEncodingFormatCode.

Message Data Type AutomaticIdentificationLabelDecodeRequestMessage_sync

The message data type AutomaticIdentificationLabelDecodeRequestMessage_sync includes the business information that is relevant for sending a business document in a message and the AutomaticIdentificationLabel included in the business document. It can include the packages MessageHeader and AutomaticIdentificationLabel. An AutomaticIdentificationLabel package includes the data of an AutomaticIdentificationLabel. It can include the entity AutomaticIdentificationLabel. An AutomaticIdentificationLabel is a label that can be automatically identified. The AutomaticIdentificationLabel entity includes an element HexadecimalAutomaticIdentificationLabelID. The HexadecimalAutomaticIdentificationLabelID is the identifier of an AutomaticIdentificationLabel in 'Hex ID' (hexadecimal) format. It is a GDT of type AutomaticIdentificationLabelID. The HexadecimalAutomaticIdentificationLabelID is given in 'Hex ID' format, which can be specified in the code list of the GDT AutomaticIdentificationLabelEncodingFormatCode.

Message Data Type AutomaticIdentificationLabelDecodeConfirmationMessage_sync

The message data type AutomaticIdentificationLabelDecodeConfirmationMessage_sync includes business information that is relevant for sending a business document in a message, AutomaticIdentificationLabel included in the business document, and information of the message log. It can include the packages MessageHeader, AutomaticIdentificationLabel, and Log. An AutomaticIdentificationLabel package includes the data of an AutomaticIdentificationLabel. It can include the entity AutomaticIdentificationLabel. An AutomaticIdentificationLabel is a label that can be automatically identified. The AutomaticIdentificationLabel entity can include the following elements: ID and HexadecimalAutomaticIdentificationLabelID. ID is the identifier of an AutomaticIdentificationLabel in 'Pure ID' (pure) format and it can be optional. It is a GDT of type AutomaticIdentificationLabelID. HexadecimalAutomaticIdentificationLabelID is the identifier of an AutomaticIdentificationLabel in 'Hex ID' (hexadecimal) format. It is a GDT of type AutomaticIdentificationLabelID. The ID can be given in 'Pure ID' format and the HexadecimalAutomaticIdentificationLabelID can be given in 'Hex ID' format, which are specified in the code list of the GDT AutomaticIdentificationLabelEncodingFormatCode.

AutomaticIdentificationLabelDevice Interfaces

One of the benefits of barcode and RFID technology is the automation of logistic processes. Such processes are handled for example by Kanban Processing, where movements of goods are manually reported. With the automatically identifiable labels, movements of goods, which are registered via barcode or RFID technology, can be automatically reported. Devices to read and print automatically identifiable labels are modelled by the business object AutomaticIdentificationLabelDevice.

An AutomaticIdentificationLabelDevice is a (logical) device, which is used to read and print automatically identifiable labels. A logical device can also represent a group of devices at a common location. Such devices are used, for example, in RFID technology. The business object AutomaticIdentificationLabelDevice is represented by its root node, which does not have any subnodes.

Figure 66:
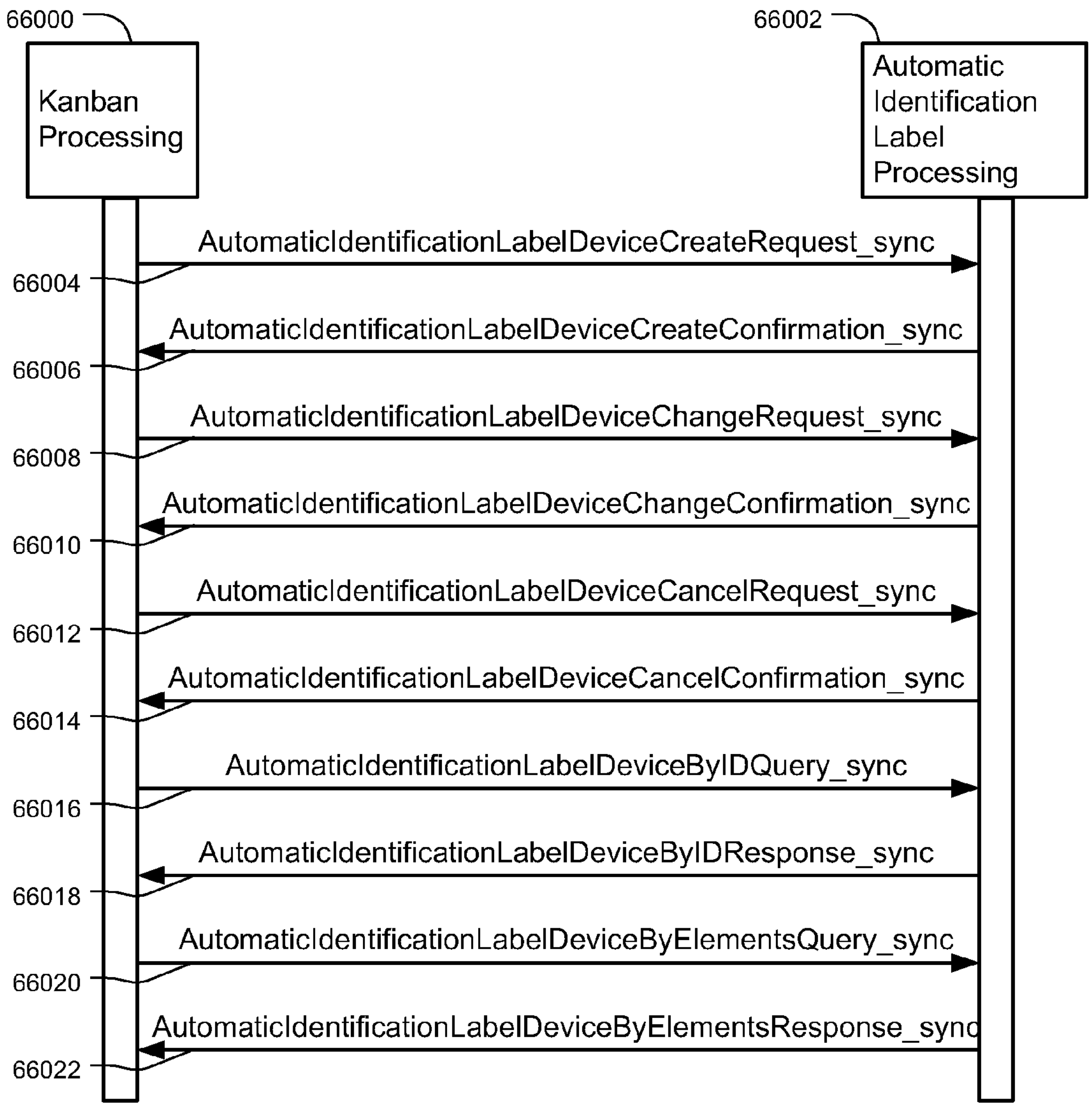
FIG. 66 shows an exemplary AutomaticIdentificationLabelDevice Message Choreography.

The message choreography of FIG. 66 describes a possible logical sequence of messages that can be used to realize an Automatic Identification Label Device business scenario. A "Kanban Processing" system 66000 can request the creation of an Automatic Identification Label Device using an AutomaticIdentificationLabelDeviceCreateRequest_sync message 66004 as shown, for example, in FIG. 66. An "Automatic Identification Label Processing" system 66002 can confirm the request using an AutomaticIdentificationLabelDeviceCreateConfirmation_sync message 66006 as shown, for example, in FIG. 66.

The "Kanban Processing" system 66000 can request the change of an Automatic Identification Label Device using an AutomaticIdentificationLabelDeviceChangeRequest_sync message 66008 as shown, for example, in FIG. 66. The "Automatic Identification Label Processing" system 66002 can confirm the request using an AutomaticIdentificationLabelDeviceChangeConfirmation_sync message 66010 as shown, for example, in FIG. 66.

The "Kanban Processing" system 66000 can request the cancellation of an Automatic Identification Label Device using an AutomaticIdentificationLabelDeviceCancelRequest_sync message 66012 as shown, for example, in FIG. 66. The "Automatic Identification Label Processing" system 66002 can confirm the request using an AutomaticIdentificationLabelDeviceCancelConfirmation_sync message 66014 as shown, for example, in FIG. 66.

The "Kanban Processing" system 66000 can query an Automatic Identification Label Device by ID using an AutomaticIdentificationLabelDeviceByIDQuery_sync message 66016 as shown, for example, in FIG. 66. The "Automatic Identification Label Processing" system 66002 can respond to the query using an AutomaticIdentificationLabelDeviceByIDResponse_sync message 66018 as shown, for example, in FIG. 66.

The "Kanban Processing" system 66000 can query an Automatic Identification Label Device by elements using an AutomaticIdentificationLabelDeviceByElementsQuery_sync message 66020 as shown, for example, in FIG. 66. The "Automatic Identification Label Processing" system 66002 can respond to the query using an AutomaticIdentificationLabelDeviceByElementsResponse_sync message 66022 as shown, for example, in FIG. 66.

An AutomaticIdentificationLabelDeviceCreateRequest_sync is a request to AutomaticIdentificationLabel Processing to create an AutomaticIdentificationLabelDevice. The structure of the message type AutomaticIdentificationLabelDeviceCreateRequest_sync is specified by the message data type AutomaticIdentificationLabelDeviceCreateRequestMessage_sync. An AutomaticIdentificationLabelDeviceCreateConfirmation_sync is the confirmation of an AutomaticIdentificationLabelDeviceCreateRequest_sync. The structure of the message type AutomaticIdentificationLabelDeviceCreateConfirmation_sync is specified by the message data type AutomaticIdentificationLabelDeviceCreateConfirmationMessage_sync.

An AutomaticIdentificationLabelDeviceChangeRequest_sync is a request to AutomaticIdentificationLabel Processing to change an AutomaticIdentificationLabelDevice. The structure of the message type AutomaticIdentificationLabelDeviceChangeRequest_sync is specified by the message data type AutomaticIdentificationLabelDeviceChangeRequestMessage_sync. An AutomaticIdentificationLabelDeviceChangeConfirmation_sync is the confirmation of an AutomaticIdentificationLabelDeviceChangeRequest_sync. The structure of the message type AutomaticIdentificationLabelDeviceChangeConfirmation_sync is specified by the message data type AutomaticIdentificationLabelDeviceChangeConfirmationMessage_sync.

An AutomaticIdentificationLabelDeviceCancelRequest_sync is a request to AutomaticIdentificationLabel Processing to cancel an AutomaticIdentificationLabelDevice. The structure of the message type AutomaticIdentificationLabelDeviceCancelRequest_sync is specified by the message data type AutomaticIdentificationLabelDeviceCancelRequestMessage_sync. An AutomaticIdentificationLabelCancelDeviceConfirmation_sync is the confirmation of an AutomaticIdentificationLabelDeviceCancelRequest_sync. The structure of the message type AutomaticIdentificationLabelDeviceCancelConfirmation_sync is specified by the message data type AutomaticIdentificationLabelDeviceCancelConfirmationMessage_sync.

An AutomaticIdentificationLabelDeviceDeviceByIDDeviceQuery_sync is an inquiry to get an AutomaticIdentificationLabelDevice by specifying its identifier (ID). The structure of the message type AutomaticIdentificationLabelDeviceByIDQuery_sync is specified by the message data type AutomaticIdentificationLabelDeviceByIDQueryMessage_sync. An AutomaticIdentificationLabelDeviceByIDResponse_sync is the reply to an AutomaticIdentificationLabelDeviceByIDQuery_sync. The structure of the message type AutomaticIdentificationLabelDeviceByIDResponse_sync is specified by the message data type AutomaticIdentificationLabelDeviceByIDResponseMessage_sync. An AutomaticIdentificationLabelDeviceByElementsQuery_sync is an inquiry to get one or more AutomaticIdentificationLabelDevice(s) by specifying some elements. The structure of the message type AutomaticIdentificationLabelDeviceByElementsQuery_sync is specified by the message data type AutomaticIdentificationLabelDeviceByElementsQueryMessage_sync.

An AutomaticIdentificationLabelDeviceByElementsResponse_sync is the reply to an AutomaticIdentificationLabelDeviceByElementsQuery_sync. The structure of the message type AutomaticIdentificationLabelDeviceByElementsResponse_sync is specified by the message data type AutomaticIdentificationLabelDeviceByElementsResponseMessage_sync.

A number of interfaces can exist, such as AutomaticIdentificationLabelDeviceCreateRequestConfirmation_In, AutomaticIdentificationLabelDeviceChangeRequestConfirmation_In, AutomaticIdentificationLabelDeviceCancelRequestConfirmation_In, AutomaticIdentificationLabelDeviceByIDQueryResponse_In, and AutomaticIdentificationLabelDeviceByElementsQueryResponse_In.

Figure 67:
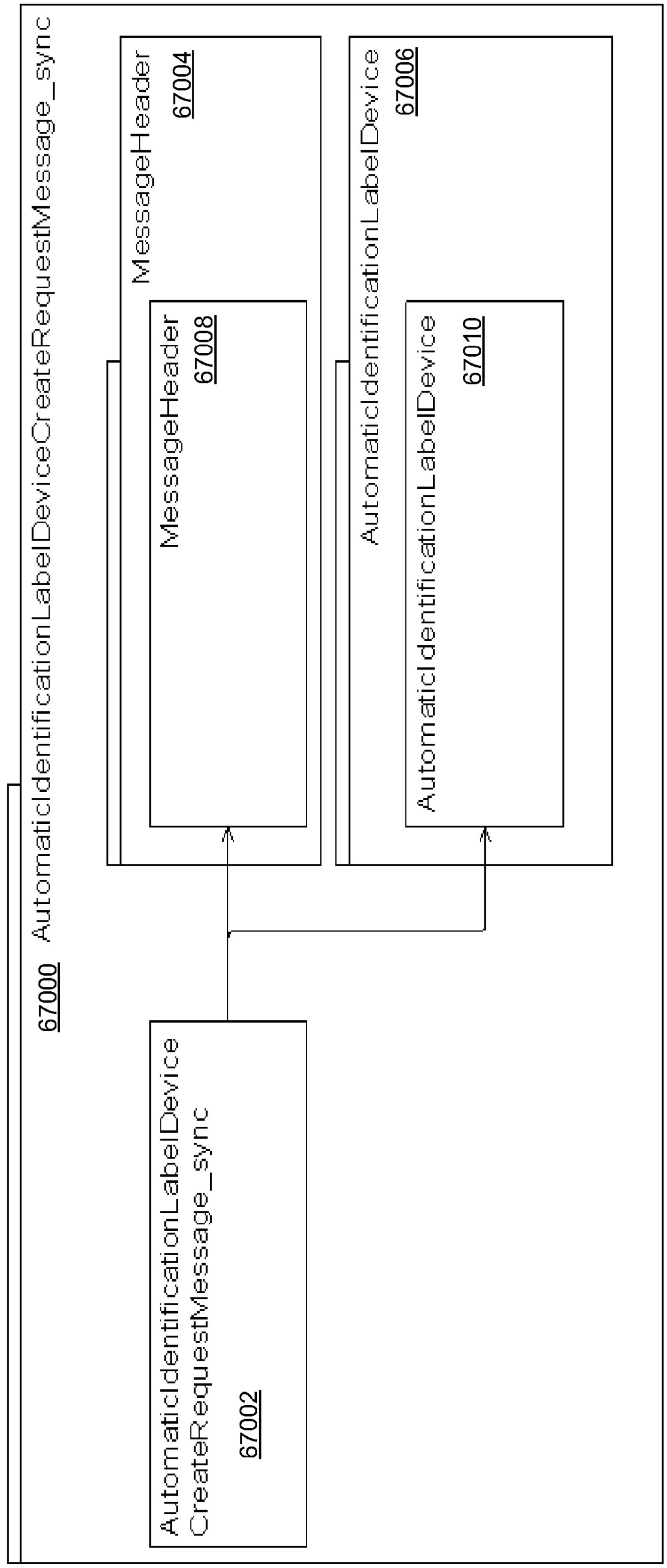
FIG. 67 shows an exemplary AutomaticIdentificationLabelDeviceCreateRequestMessage_sync Message Data Type.

FIG. 67 illustrates one example logical configuration of AutomaticIdentificationLabelDeviceCreateRequestMessage_sync message 67000. Specifically, this figure depicts the arrangement and hierarchy of various components such as one or more levels of packages, entities, and datatypes, shown here as 67000 through 67010. As described above, packages may be used to represent hierarchy levels. Entities are discrete business elements that are used during a business transaction. Data types are used to type object entities and interfaces with a structure. For example, AutomaticIdentificationLabelDeviceCreateRequestMessage_sync message 67000 includes, among other things, AutomaticIdentificationLabelDevice 67006. Accordingly, heterogeneous applications may communicate using this consistent message configured as such.

Figure 68:
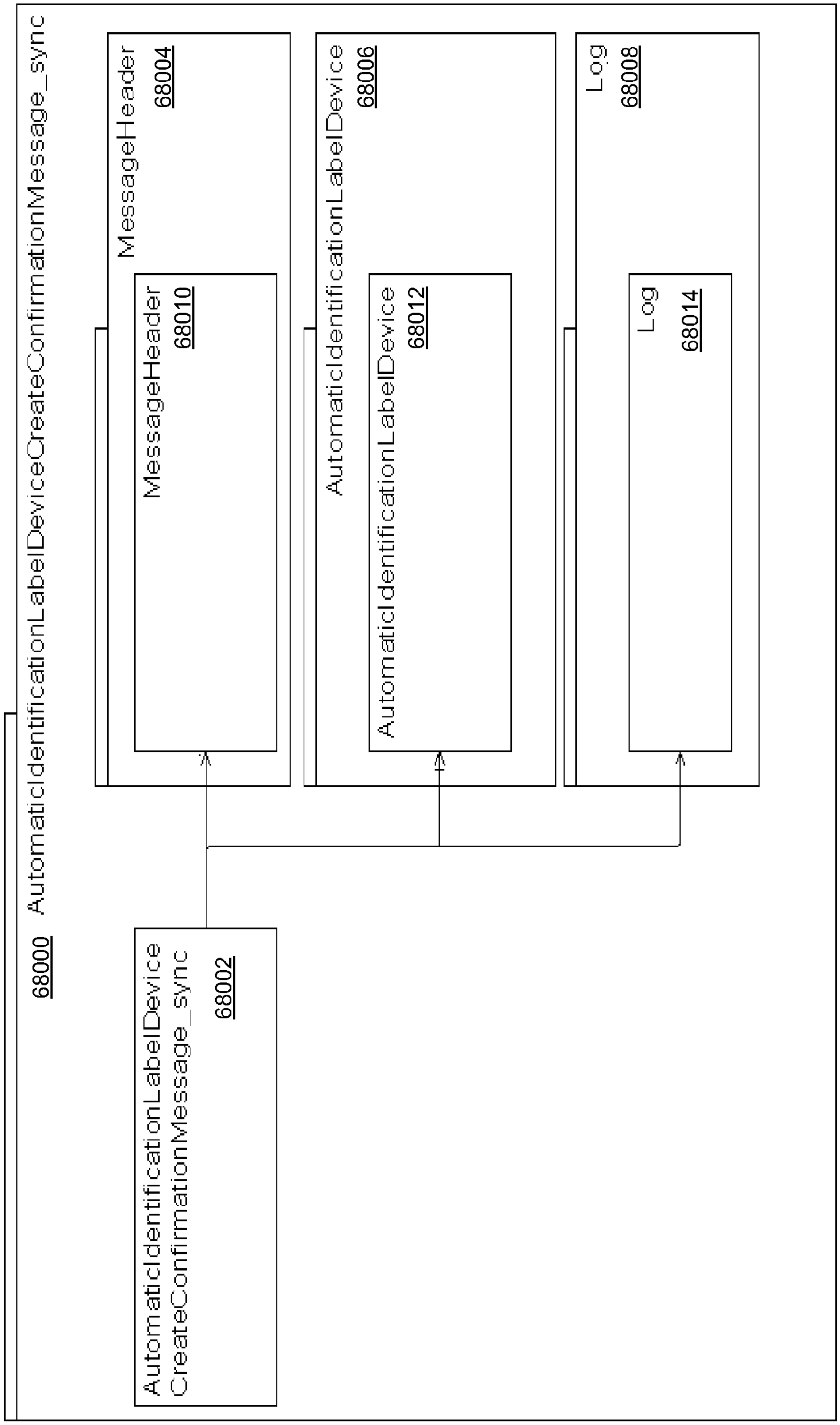
FIG. 68 shows an exemplary AutomaticIdentificationLabelDeviceCreateConfirmationMessage_sync Message Data Type.

Additionally, FIG. 68 illustrates one example logical configuration of AutomaticIdentificationLabelDeviceCreateConfirmationMessage_sync message 68000. Specifically, this figure depicts the arrangement and hierarchy of various components such as one or more levels of packages, entities, and datatypes, shown here as 68000 through 68014. As described above, packages may be used to represent hierarchy levels. Entities are discrete business elements that are used during a business transaction. Data types are used to type object entities and interfaces with a structure. For example, AutomaticIdentificationLabelDeviceCreateConfirmationMessage_sync message 68000 includes, among other things, AutomaticIdentificationLabelDevice 68006. Accordingly, heterogeneous applications may communicate using this consistent message configured as such.

Figure 69:
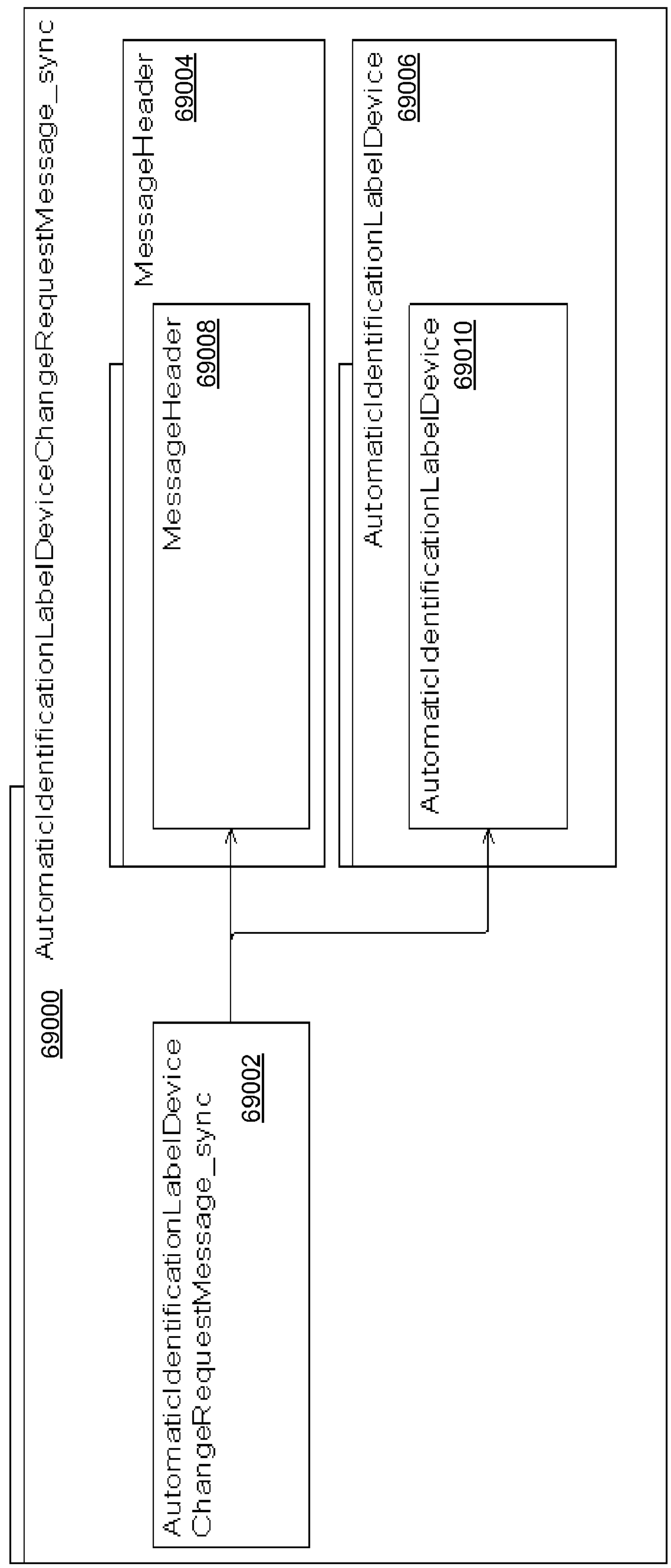
FIG. 69 shows an exemplary AutomaticIdentificationLabelDeviceChangeRequestMessage_sync Message Data Type.

Additionally, FIG. 69 illustrates one example logical configuration of AutomaticIdentificationLabelDeviceChangeRequestMessage_sync message 69000. Specifically, this figure depicts the arrangement and hierarchy of various components such as one or more levels of packages, entities, and datatypes, shown here as 69000 through 69010. As described above, packages may be used to represent hierarchy levels. Entities are discrete business elements that are used during a business transaction. Data types are used to type object entities and interfaces with a structure. For example, AutomaticIdentificationLabelDeviceChangeRequestMessage_sync message 69000 includes, among other things, AutomaticIdentificationLabelDevice 69006. Accordingly, heterogeneous applications may communicate using this consistent message configured as such.

Figure 70:
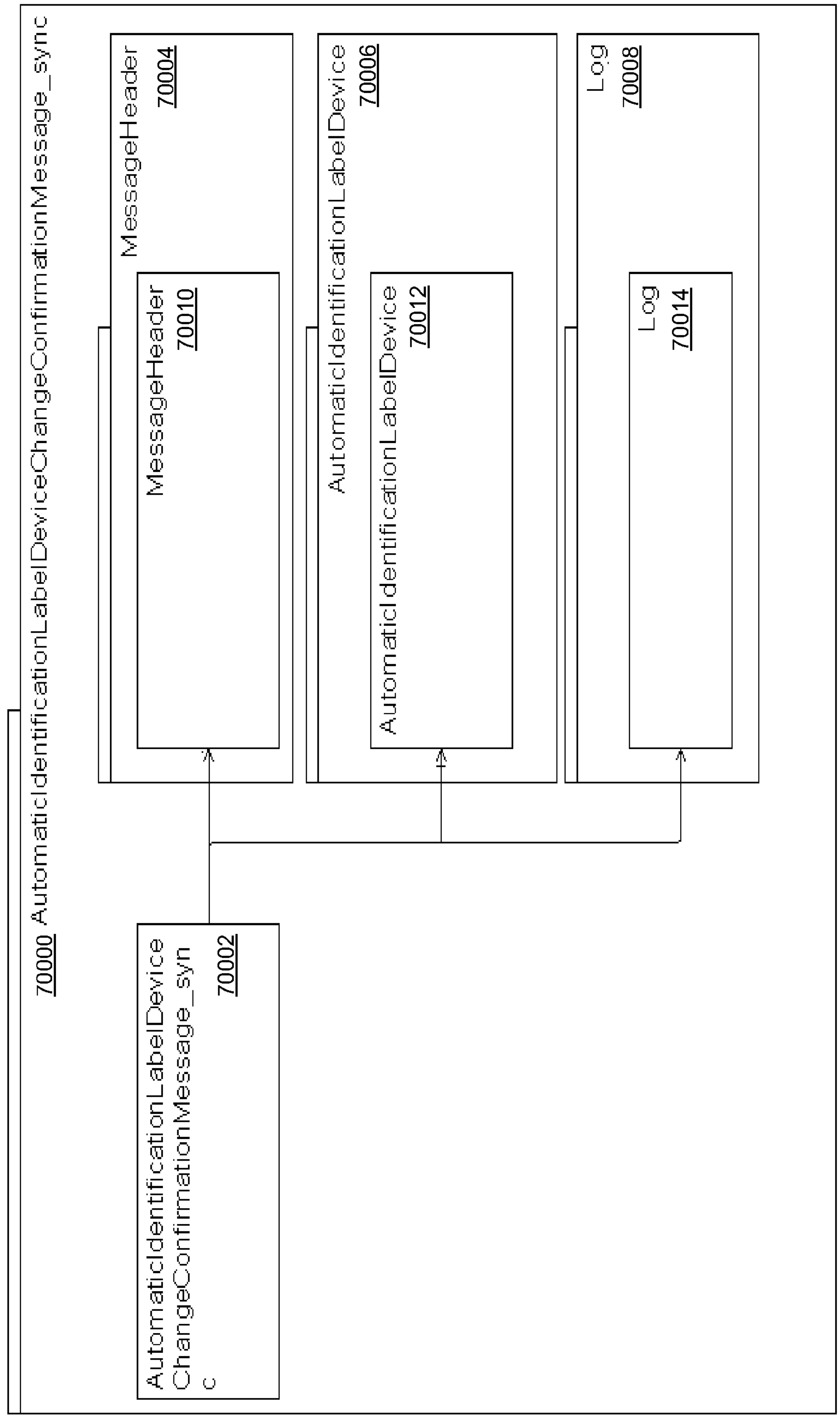
FIG. 70 shows an exemplary AutomaticIdentificationLabelDeviceChangeConfirmationMessage_sync Message Data Type.

Additionally, FIG. 70 illustrates one example logical configuration of AutomaticIdentificationLabelDeviceChangeConfirmationMessage_sync message 70000. Specifically, this figure depicts the arrangement and hierarchy of various components such as one or more levels of packages, entities, and datatypes, shown here as 70000 through 70014. As described above, packages may be used to represent hierarchy levels. Entities are discrete business elements that are used during a business transaction. Data types are used to type object entities and interfaces with a structure. For example, AutomaticIdentificationLabelDeviceChangeConfirmationMessage_sync message 70000 includes, among other things, AutomaticIdentificationLabelDevice 70006. Accordingly, heterogeneous applications may communicate using this consistent message configured as such.

Figure 71:
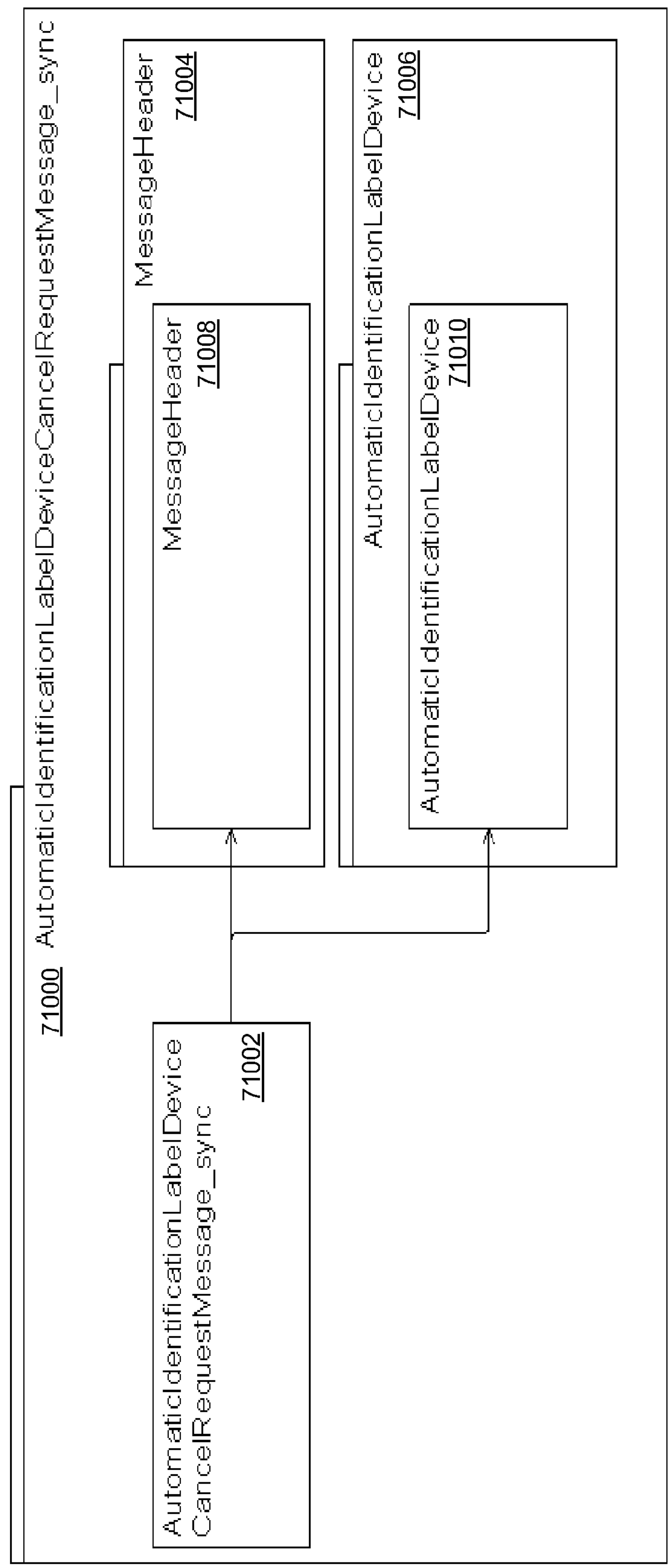
FIG. 71 shows an exemplary AutomaticIdentificationLabelDeviceCancelRequestMessage_sync Message Data Type.

Additionally, FIG. 71 illustrates one example logical configuration of AutomaticIdentificationLabelDeviceCancelRequestMessage_sync message 71000. Specifically, this figure depicts the arrangement and hierarchy of various components such as one or more levels of packages, entities, and datatypes, shown here as 71000 through 71010. As described above, packages may be used to represent hierarchy levels. Entities are discrete business elements that are used during a business transaction. Data types are used to type object entities and interfaces with a structure. For example, AutomaticIdentificationLabelDeviceCancelRequestMessage_sync message 71000 includes, among other things, AutomaticIdentificationLabelDevice 71006. Accordingly, heterogeneous applications may communicate using this consistent message configured as such.

Figure 72:
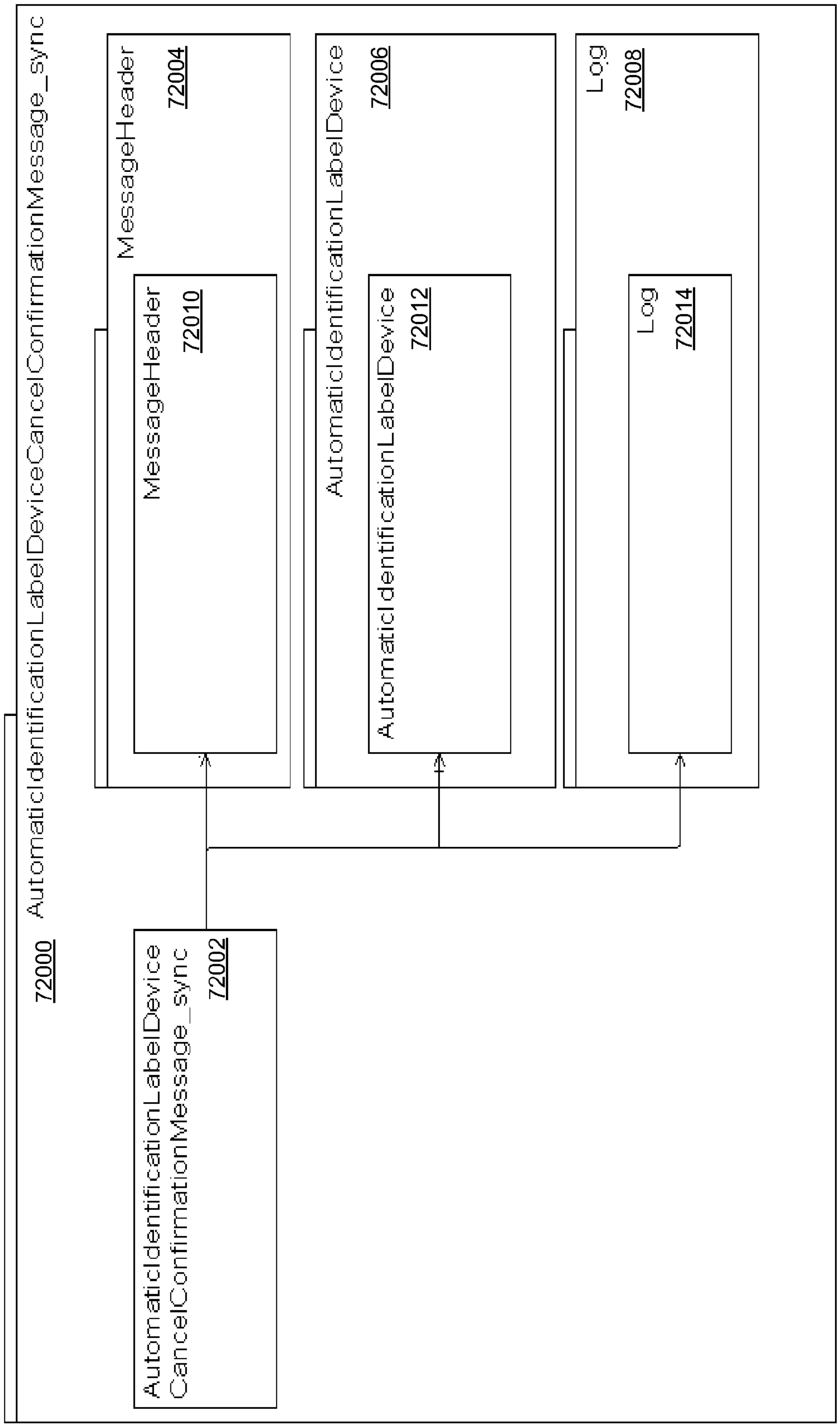
FIG. 72 shows an exemplary AutomaticIdentificationLabelDeviceCancelConfirmationMessage_sync Message Data Type.

Additionally, FIG. 72 illustrates one example logical configuration of AutomaticIdentificationLabelDeviceCancelConfirmationMessage_sync message 72000. Specifically, this figure depicts the arrangement and hierarchy of various components such as one or more levels of packages, entities, and datatypes, shown here as 72000 through 72014. As described above, packages may be used to represent hierarchy levels. Entities are discrete business elements that are used during a business transaction. Data types are used to type object entities and interfaces with a structure. For example, AutomaticIdentificationLabelDeviceCancelConfirmationMessage_sync message 72000 includes, among other things, AutomaticIdentificationLabelDevice 72006. Accordingly, heterogeneous applications may communicate using this consistent message configured as such.

Figure 73:
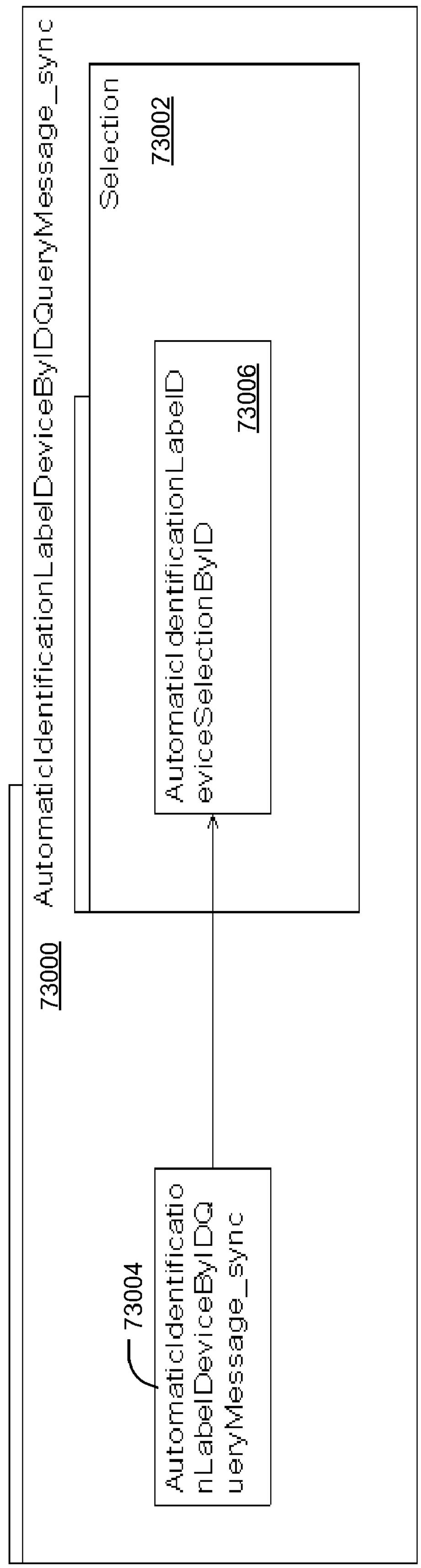
FIG. 73 shows an exemplary AutomaticIdentificationLabelDeviceByIDQueryMessage_sync Message Data Type.

Additionally, FIG. 73 illustrates one example logical configuration of AutomaticIdentificationLabelDeviceByIDQueryMessage_sync message 73000. Specifically, this figure depicts the arrangement and hierarchy of various components such as one or more levels of packages, entities, and datatypes, shown here as 73000 through 73006. As described above, packages may be used to represent hierarchy levels. Entities are discrete business elements that are used during a business transaction. Data types are used to type object entities and interfaces with a structure. For example, AutomaticIdentificationLabelDeviceByIDQueryMessage_sync message 73000 includes, among other things, AutomaticIdentificationLabelDeviceSelectionByID 73006. Accordingly, heterogeneous applications may communicate using this consistent message configured as such.

Figure 74:
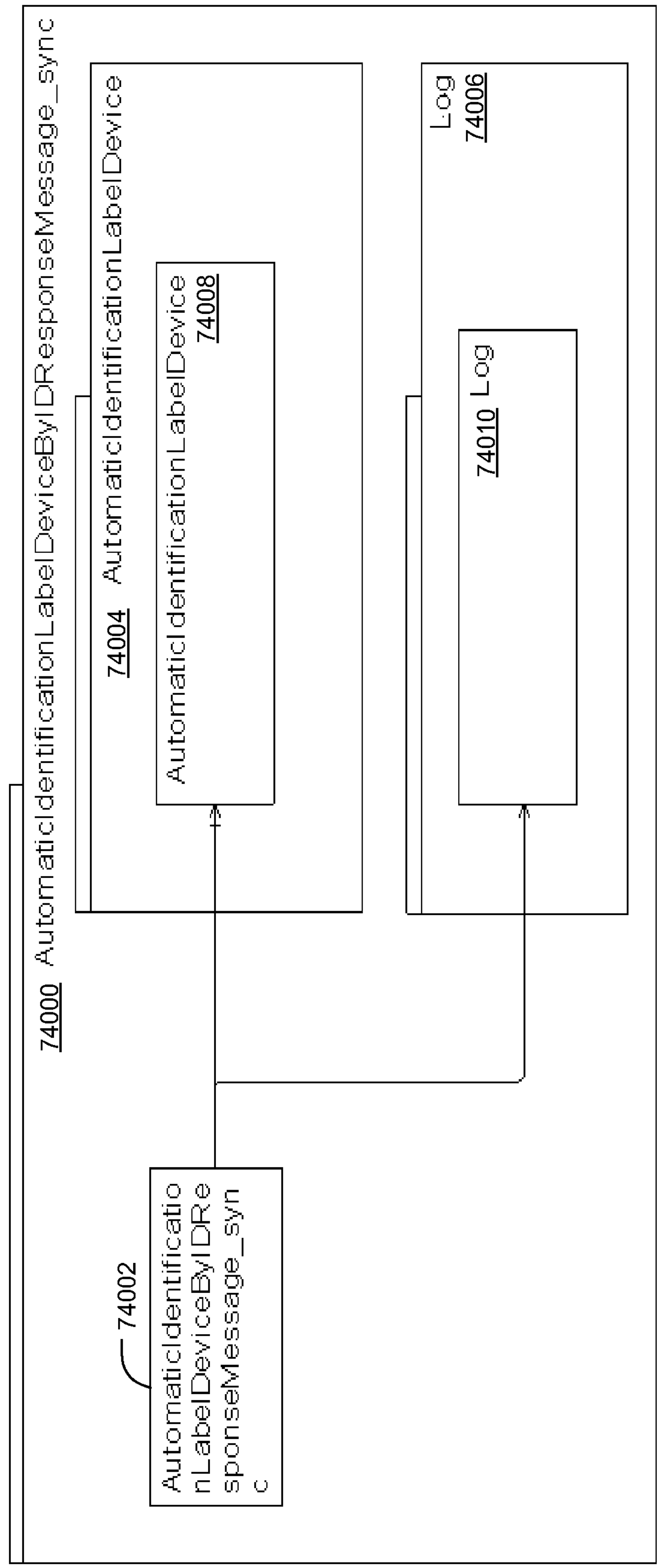
FIG. 74 shows an exemplary AutomaticIdentificationLabelDeviceByIDResponseMessage_sync Message Data Type.

Additionally, FIG. 74 illustrates one example logical configuration of AutomaticIdentificationLabelDeviceByIDResponseMessage_sync message 74000. Specifically, this figure depicts the arrangement and hierarchy of various components such as one or more levels of packages, entities, and datatypes, shown here as 74000 through 74010. As described above, packages may be used to represent hierarchy levels. Entities are discrete business elements that are used during a business transaction. Data types are used to type object entities and interfaces with a structure. For example, AutomaticIdentificationLabelDeviceByIDResponseMessage_sync message 74000 includes, among other things, AutomaticIdentificationLabelDevice 74004. Accordingly, heterogeneous applications may communicate using this consistent message configured as such.

Figure 75:
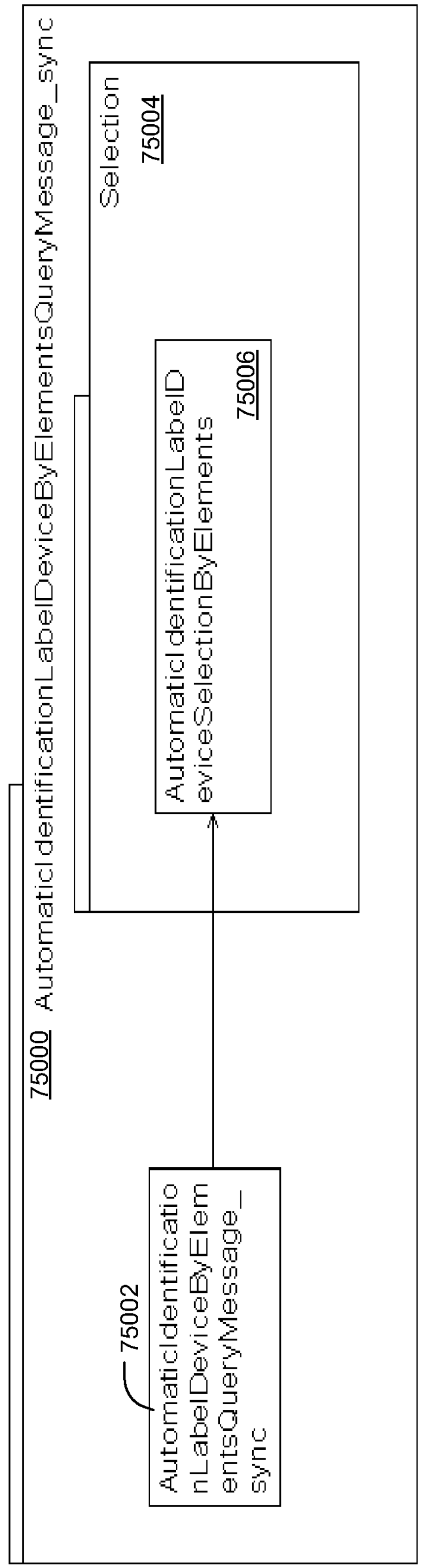
FIG. 75 shows an exemplary AutomaticIdentificationLabelDeviceByElementsQueryMessage_sync Message Data Type.

Additionally, FIG. 75 illustrates one example logical configuration of AutomaticIdentificationLabelDeviceByElementsQueryMessage_sync message 75000. Specifically, this figure depicts the arrangement and hierarchy of various components such as one or more levels of packages, entities, and datatypes, shown here as 75000 through 75006. As described above, packages may be used to represent hierarchy levels. Entities are discrete business elements that are used during a business transaction. Data types are used to type object entities and interfaces with a structure. For example, AutomaticIdentificationLabelDeviceByElementsQueryMessage_sync message 75000 includes, among other things, AutomaticIdentificationLabelDeviceSelectionByElements 75006. Accordingly, heterogeneous applications may communicate using this consistent message configured as such.

Figure 76:
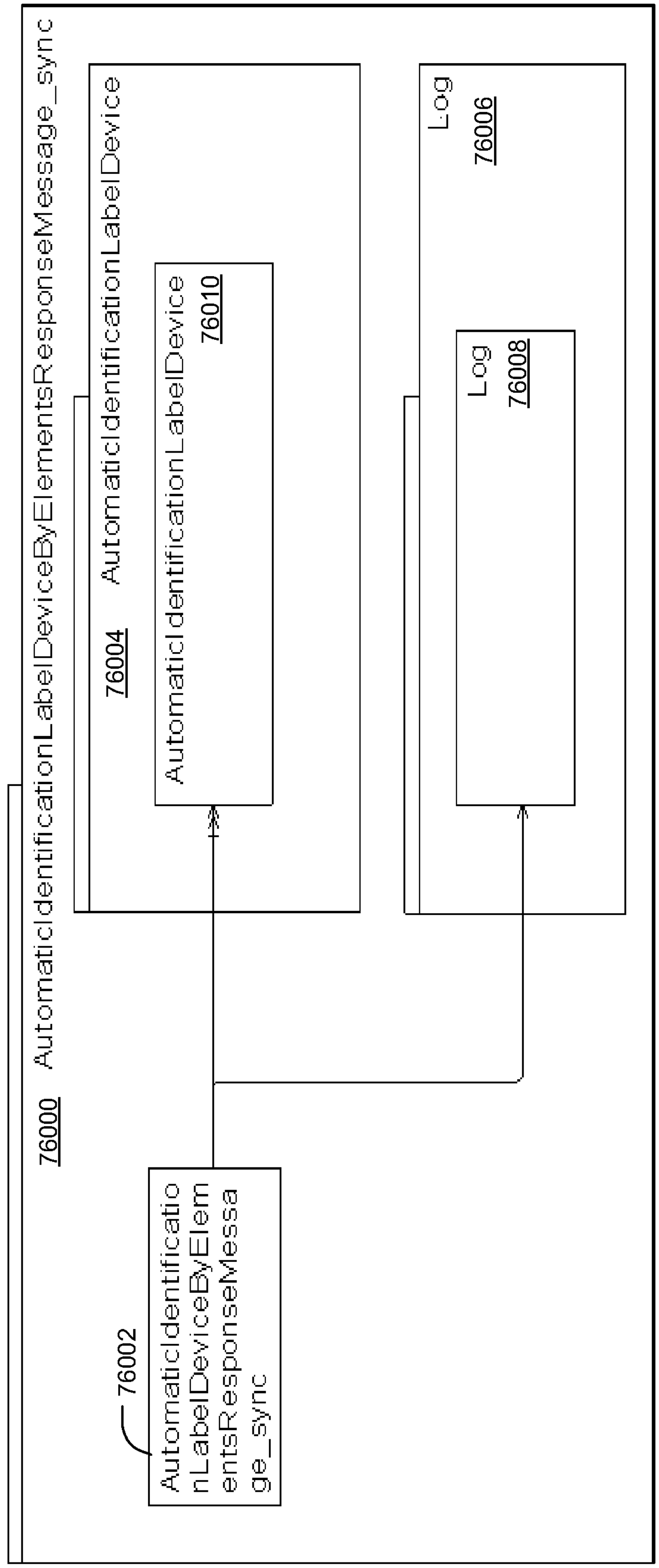
FIG. 76 shows an exemplary AutomaticIdentificationLabelDeviceByElementsResponseMessage_sync Message Data Type.

Additionally, FIG. 76 illustrates one example logical configuration of AutomaticIdentificationLabelDeviceByElementsResponseMessage_sync message 76000. Specifically, this figure depicts the arrangement and hierarchy of various components such as one or more levels of packages, entities, and datatypes, shown here as 76000 through 76010. As described above, packages may be used to represent hierarchy levels. Entities are discrete business elements that are used during a business transaction. Data types are used to type object entities and interfaces with a structure. For example, AutomaticIdentificationLabelDeviceByElementsResponseMessage_sync message 76000 includes, among other things, AutomaticIdentificationLabelDevice 76006. Accordingly, heterogeneous applications may communicate using this consistent message configured as such.

FIG. 77 illustrates one example logical configuration of an AutomaticIdentificationLabelDeviceByElementsResponseMessage_sync 77000 element structure. Specifically, this figure depicts the arrangement and hierarchy of various components such as one or more levels of packages, entities, and datatypes, shown here as 77000 through 77030. As described above, packages may be used to represent hierarchy levels. Entities are discrete business elements that are used during a business transaction. Data types are used to type object entities and interfaces with a structure. For example, the AutomaticIdentificationLabelDeviceByElementsResponseMessage_sync 77000 includes, among other things, an AutomaticIdentificationLabelDeviceByElementsResponseMessage_sync 77002. Accordingly, heterogeneous applications may communicate using this consistent message configured as such.

FIG. 78 illustrates one example logical configuration of an AutomaticIdentificationLabelDeviceByElementsQueryMessage_sync 78000 element structure. Specifically, this figure depicts the arrangement and hierarchy of various components such as one or more levels of packages, entities, and datatypes, shown here as 78000 through 78016. As described above, packages may be used to represent hierarchy levels. Entities are discrete business elements that are used during a business transaction. Data types are used to type object entities and interfaces with a structure. For example, the AutomaticIdentificationLabelDeviceByElementsQueryMessage_sync 78000 includes, among other things, an AutomaticIdentificationLabelDeviceByElementsQueryMessage_sync 78002. Accordingly, heterogeneous applications may communicate using this consistent message configured as such.

FIG. 79 illustrates one example logical configuration of an AutomaticIdentificationLabelDeviceByIDQueryMessage_sync 79000 element structure. Specifically, this figure depicts the arrangement and hierarchy of various components such as one or more levels of packages, entities, and datatypes, shown here as 79000 through 79016. As described above, packages may be used to represent hierarchy levels. Entities are discrete business elements that are used during a business transaction. Data types are used to type object entities and interfaces with a structure. For example, the AutomaticIdentificationLabelDeviceByIDQueryMessage_sync 79000 includes, among other things, an AutomaticIdentificationLabelDeviceByIDQueryMessage_sync 79002. Accordingly, heterogeneous applications may communicate using this consistent message configured as such.

FIG. 80 illustrates one example logical configuration of an AutomaticIdentificationLabelDeviceByIDResponseMessage_sync 80000 element structure. Specifically, this figure depicts the arrangement and hierarchy of various components such as one or more levels of packages, entities, and datatypes, shown here as 80000 through 80030. As described above, packages may be used to represent hierarchy levels. Entities are discrete business elements that are used during a business transaction. Data types are used to type object entities and interfaces with a structure. For example, the AutomaticIdentificationLabelDeviceByIDResponseMessage_sync 80000 includes, among other things, an AutomaticIdentificationLabelDeviceByIDResponseMessage_sync 80002. Accordingly, heterogeneous applications may communicate using this consistent message configured as such.

FIG. 81 illustrates one example logical configuration of an AutomaticIdentificationLabelDeviceCancelConfirmationMessage_sync 81000 element structure. Specifically, this figure depicts the arrangement and hierarchy of various components such as one or more levels of packages, entities, and datatypes, shown here as 81000 through 81036. As described above, packages may be used to represent hierarchy levels. Entities are discrete business elements that are used during a business transaction. Data types are used to type object entities and interfaces with a structure. For example, the AutomaticIdentificationLabelDeviceCancelConfirmationMessage_sync 81000 includes, among other things, an AutomaticIdentificationLabelDeviceCancelConfirmationMessage_sync 81002. Accordingly, heterogeneous applications may communicate using this consistent message configured as such.

FIG. 82 illustrates one example logical configuration of an AutomaticIdentificationLabelDeviceCancelRequestMessage_sync 82000 element structure. Specifically, this figure depicts the arrangement and hierarchy of various components such as one or more levels of packages, entities, and datatypes, shown here as 82000 through 82028. As described above, packages may be used to represent hierarchy levels. Entities are discrete business elements that are used during a business transaction. Data types are used to type object entities and interfaces with a structure. For example, the AutomaticIdentificationLabelDeviceCancelRequestMessage_sync 82000 includes, among other things, an AutomaticIdentificationLabelDeviceCancelRequestMessage_sync 82002. Accordingly, heterogeneous applications may communicate using this consistent message configured as such.

FIGS. 83-1 through 83-2 illustrate one example logical configuration of an AutomaticIdentificationLabelDeviceChangeConfirmationMessage_sync 83000 element structure. Specifically, these figures depict the arrangement and hierarchy of various components such as one or more levels of packages, entities, and datatypes, shown here as 83000 through 83042. As described above, packages may be used to represent hierarchy levels. Entities are discrete business elements that are used during a business transaction. Data types are used to type object entities and interfaces with a structure. For example, the AutomaticIdentificationLabelDeviceChangeConfirmationMessage_sync 83000 includes, among other things, an AutomaticIdentificationLabelDeviceChangeConfirmationMessage_sync 83002. Accordingly, heterogeneous applications may communicate using this consistent message configured as such.

FIG. 84 illustrates one example logical configuration of an AutomaticIdentificationLabelDeviceChangeRequestMessage_sync 84000 element structure. Specifically, this figure depicts the arrangement and hierarchy of various components such as one or more levels of packages, entities, and datatypes, shown here as 84000 through 84034. As described above, packages may be used to represent hierarchy levels. Entities are discrete business elements that are used during a business transaction. Data types are used to type object entities and interfaces with a structure. For example, the AutomaticIdentificationLabelDeviceChangeRequestMessage_sync 84000 includes, among other things, an AutomaticIdentificationLabelDeviceChangeRequestMessage_sync 84002. Accordingly, heterogeneous applications may communicate using this consistent message configured as such.

FIGS. 85-1 through 85-2 illustrate one example logical configuration of an AutomaticIdentificationLabelDeviceCreateConfirmationMessage_sync 85000 element structure. Specifically, these figures depict the arrangement and hierarchy of various components such as one or more levels of packages, entities, and datatypes, shown here as 85000 through 85042. As described above, packages may be used to represent hierarchy levels. Entities are discrete business elements that are used during a business transaction. Data types are used to type object entities and interfaces with a structure. For example, the AutomaticIdentificationLabelDeviceCreateConfirmationMessage_sync 85000 includes, among other things, an AutomaticIdentificationLabelDeviceCreateConfirmationMessage_sync 85002. Accordingly, heterogeneous applications may communicate using this consistent message configured as such.

FIG. 86 illustrates one example logical configuration of an AutomaticIdentificationLabelDeviceCreateRequestMessage_sync 86000 element structure. Specifically, this figure depicts the arrangement and hierarchy of various components such as one or more levels of packages, entities, and datatypes, shown here as 86000 through 86034. As described above, packages may be used to represent hierarchy levels. Entities are discrete business elements that are used during a business transaction. Data types are used to type object entities and interfaces with a structure. For example, the AutomaticIdentificationLabelDeviceCreateRequestMessage_sync 86000 includes, among other things, an AutomaticIdentificationLabelDeviceCreateRequestMessage_sync 86002. Accordingly, heterogeneous applications may communicate using this consistent message configured as such.

Message Data Type AutomaticIdentificationLabelDeviceCreateRequestMessage_sync

The message data type AutomaticIdentificationLabelDeviceCreateRequestMessage_sync includes the business information that is relevant for sending a business document in a message and the AutomaticIdentificationLabelDevice included in the business document. It includes the MessageHeader and AutomaticIdentificationLabelDevice packages. A MessageHeader package groups the business information that is relevant for sending a business document in a message. It includes the MessageHeader entity. A MessageHeader groups the following business information from the perspective of the sending application: information to identify the business document in a message, information about the sender, and information about the recipient. The MessageHeader includes the following entities: SenderParty and RecipientParty. MessageHeader is of type GDT: BasicBusinessDocumentMessageHeader. MessageHeader includes the following elements of the GDT: ID, ReferenceID, SenderParty, RecipientParty, and CreationDateTime. A SenderParty is the party responsible for sending the business document at a business application level. The SenderParty is of type GDT: BusinessDocumentMessageHeaderParty. A RecipientParty is the party responsible for receiving the business document at a business application level. The RecipientParty is of type GDT:BusinessDocumentMessageHeaderParty.

An AutomaticIdentificationLabelDevice package includes the data of an AutomaticIdentificationLabelDevice. It includes the AutomaticIdentificationLabelDevice entity. An AutomaticIdentificationLabelDevice is a (logical) device, which is used to read and print automatically identifiable labels. In some implementations, the AutomaticIdentificationLabelDevice entity includes the ID and LocationID elements. The ID is a unique identifier for an AutomaticIdentificationLabelDevice and may be based on GDT: DeviceID. The LocationID is a unique identifier of a Location at which an AutomaticIdentificationLabelDevice is placed. LocationID may be based on GDT: LocationID.

Message Data Type AutomaticIdentificationLabelDeviceCreateConfirmationMessage_sync The message data type AutomaticIdentificationLabelDeviceCreateConfirmationMessage_sync includes the business information that is relevant for sending a business document in a message, the AutomaticIdentificationLabelDevice included in the business document, and the information of the message log. It includes the MessageHeader, AutomaticIdentificationLabelDevice, and Log packages. A Log package groups the messages used for user interaction. It includes the Log entity. A log is a sequence of messages that result when an application executes a task. The entity Log is of type GDT:Log.

Message Data Type AutomaticIdentificationLabelDeviceChangeRequestMessage_sync

The message data type AutomaticIdentificationLabelDeviceChangeRequestMessage_sync includes the business information that is relevant for sending a business document in a message, and the AutomaticIdentificationLabelDevice included in the business document. It includes the MessageHeader and AutomaticIdentificationLabelDevice packages.

Message Data Type AutomaticIdentificationLabelDeviceChangeConfirmationMessage_sync The message data type AutomaticIdentificationLabelDeviceChangeConfirmationMessage_sync includes the business information that is relevant for sending a business document in a message, the AutomaticIdentificationLabelDevice included in the business document, and the information of the message log. It includes the MessageHeader, AutomaticIdentificationLabelDevice and Log packages.

Message Data Type AutomaticIdentificationLabelDeviceCancelRequestMessage_sync

The message data type AutomaticIdentificationLabelDeviceCancelRequestMessage_sync includes the business information that is relevant for sending a business document in a message, and the AutomaticIdentificationLabelDevice included in the business document. It includes the MessageHeader and AutomaticIdentificationLabelDevice packages. An AutomaticIdentificationLabelDevice package includes the data of an AutomaticIdentificationLabelDevice. It includes the AutomaticIdentificationLabelDevice entity.

An AutomaticIdentificationLabelDevice is a (logical) device, which is used to read and print automatically identifiable labels. In some implementations, the AutomaticIdentificationLabelDevice entity includes the ID element. The ID is a unique identifier for an AutomaticIdentificationLabelDevice and may be based on GDT: DeviceID.

Message Data Type AutomaticIdentificationLabelDeviceCancelConfirmationMessage_sync The message data type AutomaticIdentificationLabelDeviceCancelConfirmationMessage_sync includes the business information that is relevant for sending a business document in a message, the AutomaticIdentificationLabelDevice included in the business document, and the information of the message log. It includes the MessageHeader, AutomaticIdentificationLabelDevice, and Log packages.

Message Data Type AutomaticIdentificationLabelDeviceByIDQueryMessage_sync

The message data type AutomaticIdentificationLabelDeviceByIDQueryMessage_sync includes the Selection included in the business document. It includes the Selection package. The Selection package groups the AutomaticIdentificationLabelDevice selection criteria. Selection includes the AutomaticIdentificationLabelDeviceSelectionByID entity. AutomaticIdentificationLabelDeviceSelectionByID specifies the ID used to select an AutomaticIdentificationLabelDevice. In some implementations, the AutomaticIdentificationLabelSelectionByID entity includes the ID element. The AutomaticIdentificationLabelDeviceID is a unique identifier for an AutomaticIdentificationLabelDevice, and may be based on GDT: DeviceID.

Message Data Type AutomaticIdentificationLabelDeviceByIDResponseMessage_sync

The message data type AutomaticIdentificationLabelDeviceByIDResponseMessage_sync includes the AutomaticIdentificationLabelDevice included in the business document and the information of the message log. It includes the AutomaticIdentificationLabelDevice and Log packages.

Message Data Type AutomaticIdentificationLabelDeviceByElementsQueryMessage_sync

The message data type AutomaticIdentificationLabelDeviceByElementsQueryMessage includes the Selection included in the business document. It includes the Selection package. The Selection package groups the AutomaticIdentificationLabelDevice selection criteria. Selection includes the AutomaticIdentificationLabelDeviceSelectionByElements entity.

AutomaticIdentificationLabelDeviceSelectionByElements specifies elements used to select one or more AutomaticIdentificationLabelDevices. In some implementations, the AutomaticIdentificationLabelSelectionByElements entity includes the LocationID element. The LocationID is a unique identifier of a Location at which an AutomaticIdentificationLabelDevice is placed. LocationID may be based on GDT: LocationID.

AutomaticIdentificationLabelDeviceObservation Interfaces

One of the benefits of barcode and RFID technology is the automation of logistic processes. Such processes are handled for example by Kanban Processing, where movements of goods are manually reported. With automatically identifiable labels, movements of goods, which are registered via barcode or RFID technology, can be automatically reported. Observations of devices to read and print automatically identifiable labels are modelled by the business object AutomaticIdentificationLabelDeviceObservation. The services listed in this document can enable this scenario. A number of interfaces can exist, such as AutomaticIdentificationLabelDeviceObservationCreateRequestConfirmation_In and AutomaticIdentificationLabelDeviceObservationByElementsQueryResponse_In.

Figure 87:
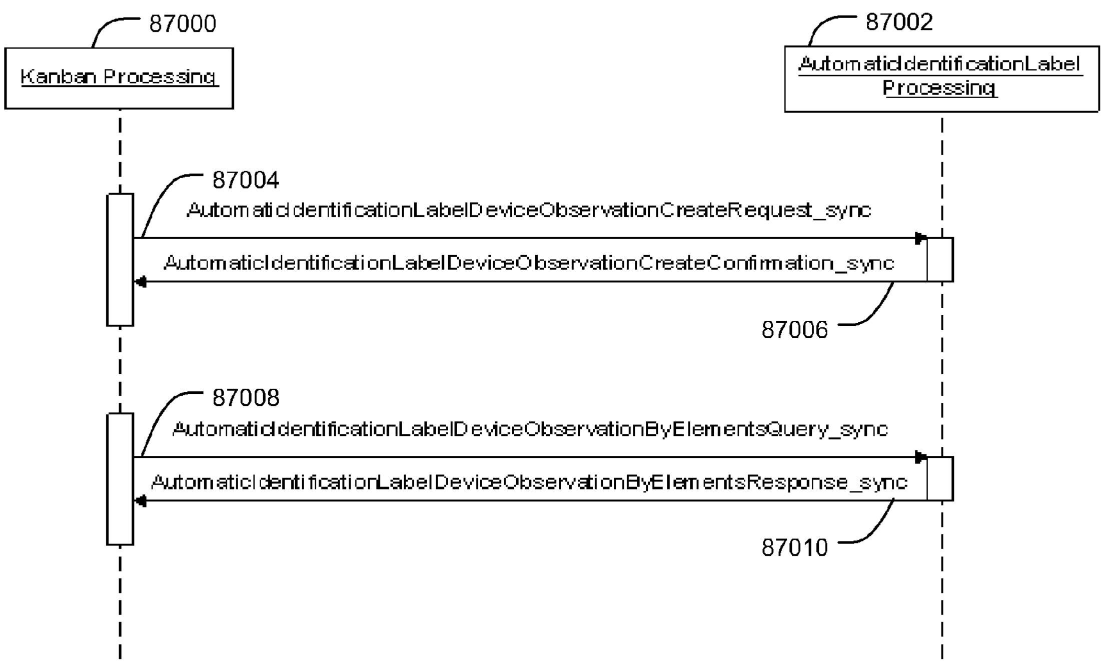
FIG. 87 shows an exemplary AutomaticIdentificationLabelDeviceObservation Message Choreography.

The message choreography of FIG. 87 describes a possible logical sequence of messages that can be used to realize an Automatic Identification Label Device Observation business scenario. A "Kanban Processing" system 87000 can request the creation of an Automatic Identification Label Device Observation using an AutomaticIdentificationLabelDeviceObservationCreateRequest_sync message 87004 as shown, for example, in FIG. 87. An "Automatic Identification Label Processing" system 87002 can confirm the request using an AutomaticIdentificationLabelDeviceObservationCreateConfirmation_sync message 87006 as shown, for example, in FIG. 87.

The "Kanban Processing" system 87000 can query an Automatic Identification Label Device Observation by elements using an AutomaticIdentificationLabelDeviceObservationByElementsQuery_sync message 87008 as shown, for example, in FIG. 87. The "Automatic Identification Label Processing" system 87002 can respond to the query using an AutomaticIdentificationLabelDeviceObservationByElementsResponse_sync message 87010 as shown, for example, in FIG. 87.

An AutomaticIdentificationLabelDeviceObservationCreateRequest_sync is a request to AutomaticIdentificationLabel Processing to create an AutomaticIdentificationLabelDeviceObservation. The structure of the message type AutomaticIdentificationLabelDeviceObservationCreateRequest_sync is specified by the message data type AutomaticIdentificationLabelDeviceObservationCreateRequestMessage_sync. An AutomaticIdentificationLabelDeviceObservationCreateConfirmation_sync is the confirmation of an AutomaticIdentificationLabelDeviceObservationCreateRequest_sync. The structure of the message type AutomaticIdentificationLabelDeviceObservationCreateConfirmation_sync is specified by the message data type AutomaticIdentificationLabelDeviceObservationCreateConfirmationMessage_sync.

An AutomaticIdentificationLabelDeviceObservationByElementsQuery_sync is an inquiry to get one or more AutomaticIdentificationLabelDeviceObservation(s) by specifying some elements. The structure of the message type AutomaticIdentificationLabelDeviceObservationByElementsQuery_sync is specified by the message data type AutomaticIdentificationLabelDeviceObservationByElementsQueryMessage_sync. An AutomaticIdentificationLabelDeviceObservationByElementsResponse_sync is the reply to an AutomaticIdentificationLabelDeviceObservationByElementsQuery_sync. The structure of the message type AutomaticIdentificationLabelDeviceObservationByElementsResponse_sync is specified by the message data type AutomaticIdentificationLabelDeviceObservationByElementsResponseMessage_sync.

Figure 88:
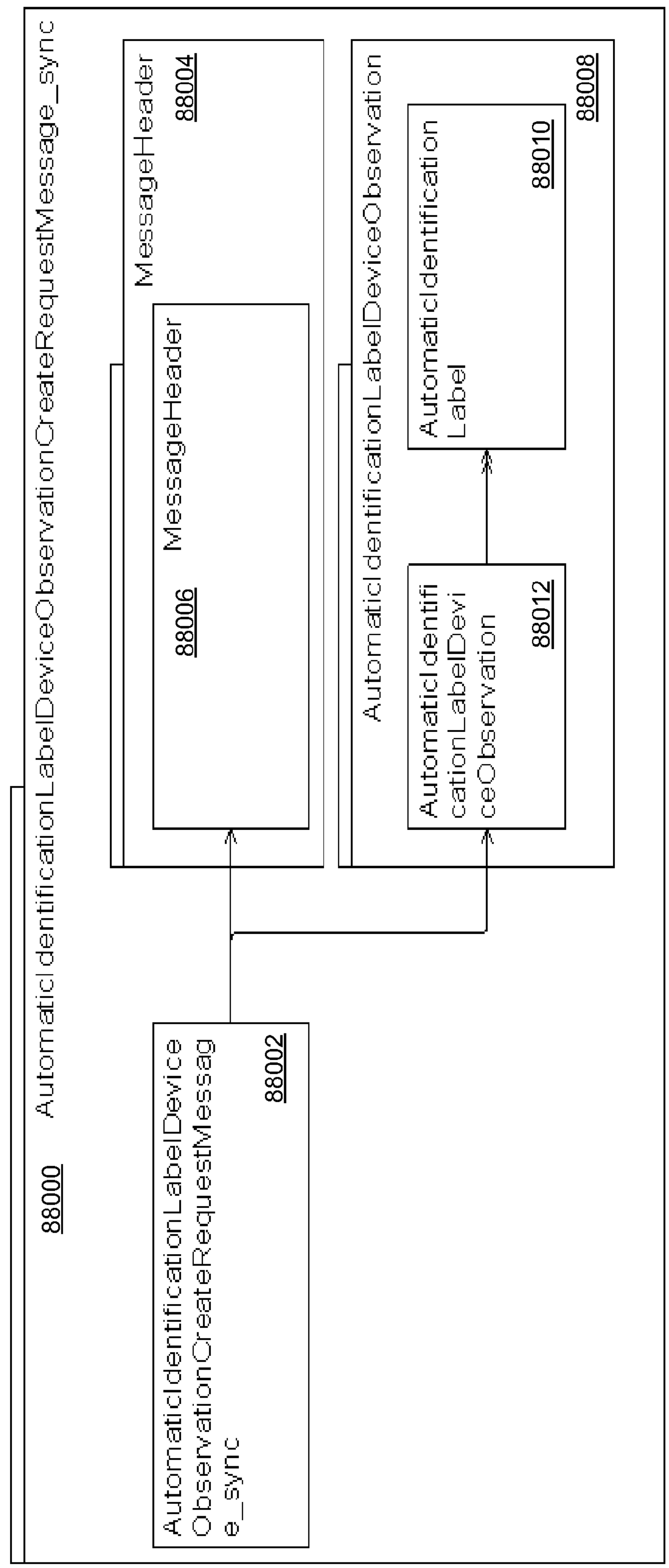
FIG. 88 shows an exemplary AutomaticIdentificationLabelDeviceObservationCreateRequestMessage_sync Message Data Type.

FIG. 88 illustrates one example logical configuration of AutomaticIdentificationLabelDeviceObservationCreateRequestMessage_sync message 88000. Specifically, this figure depicts the arrangement and hierarchy of various components such as one or more levels of packages, entities, and datatypes, shown here as 88000 through 88012. As described above, packages may be used to represent hierarchy levels. Entities are discrete business elements that are used during a business transaction. Data types are used to type object entities and interfaces with a structure. For example, AutomaticIdentificationLabelDeviceObservationCreateRequestMessage_sync message 88000 includes, among other things, AutomaticIdentificationLabelDeviceObservation 88008. Accordingly, heterogeneous applications may communicate using this consistent message configured as such.

Figure 89:
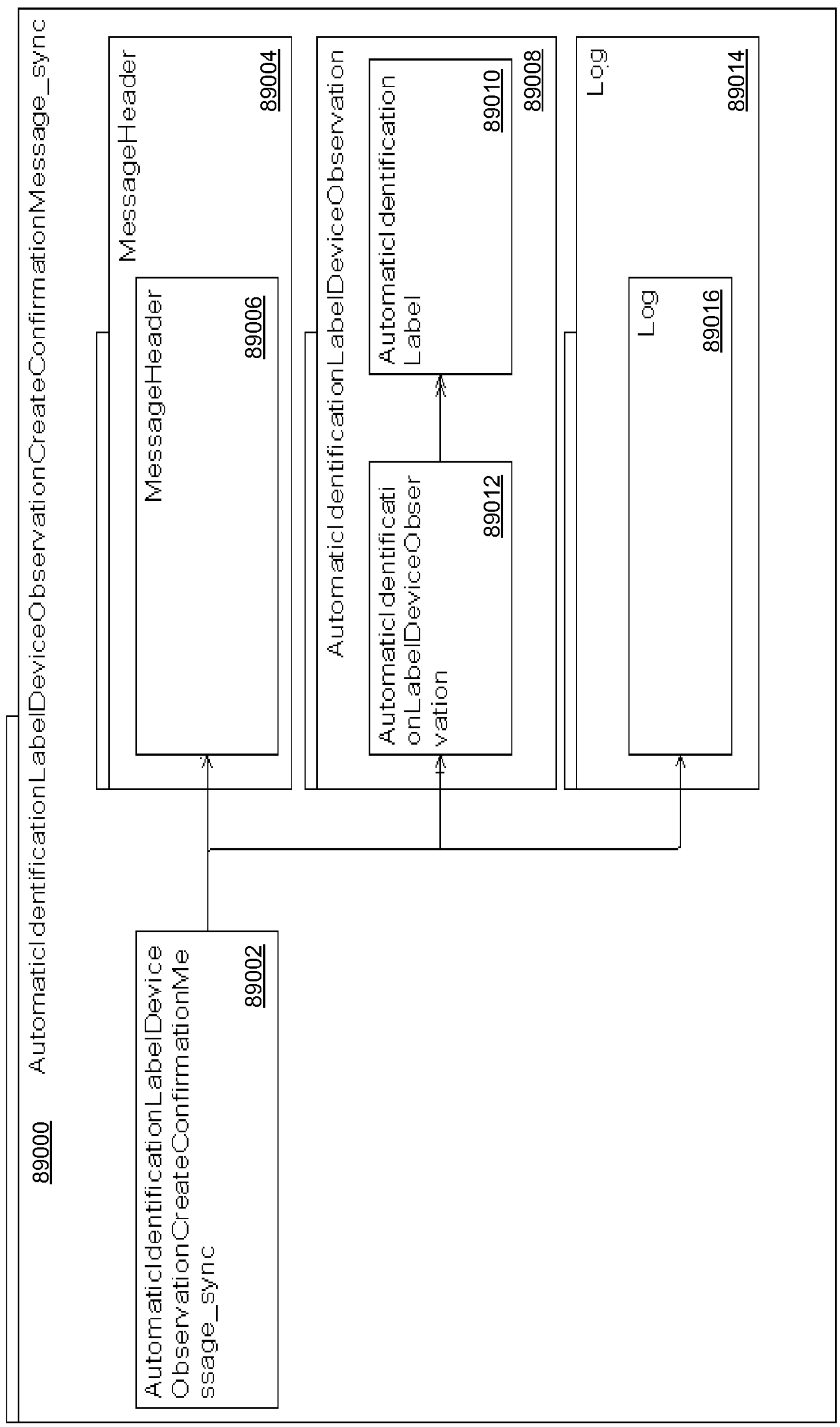
FIG. 89 shows an exemplary AutomaticIdentificationLabelDeviceObservationCreateConfirmnationMessage_sync Message Data Type.

Additionally, FIG. 89 illustrates one example logical configuration of AutomaticIdentificationLabelDeviceObservationCreateConfirmationMessage_sync message 89000. Specifically, this figure depicts the arrangement and hierarchy of various components such as one or more levels of packages, entities, and datatypes, shown here as 89000 through 89016. As described above, packages may be used to represent hierarchy levels. Entities are discrete business elements that are used during a business transaction. Data types are used to type object entities and interfaces with a structure. For example, AutomaticIdentificationLabelDeviceObservationCreateConfirmationMessage_sync message 89000 includes, among other things, AutomaticIdentificationLabelDeviceObservation 89008. Accordingly, heterogeneous applications may communicate using this consistent message configured as such.

Figure 90:
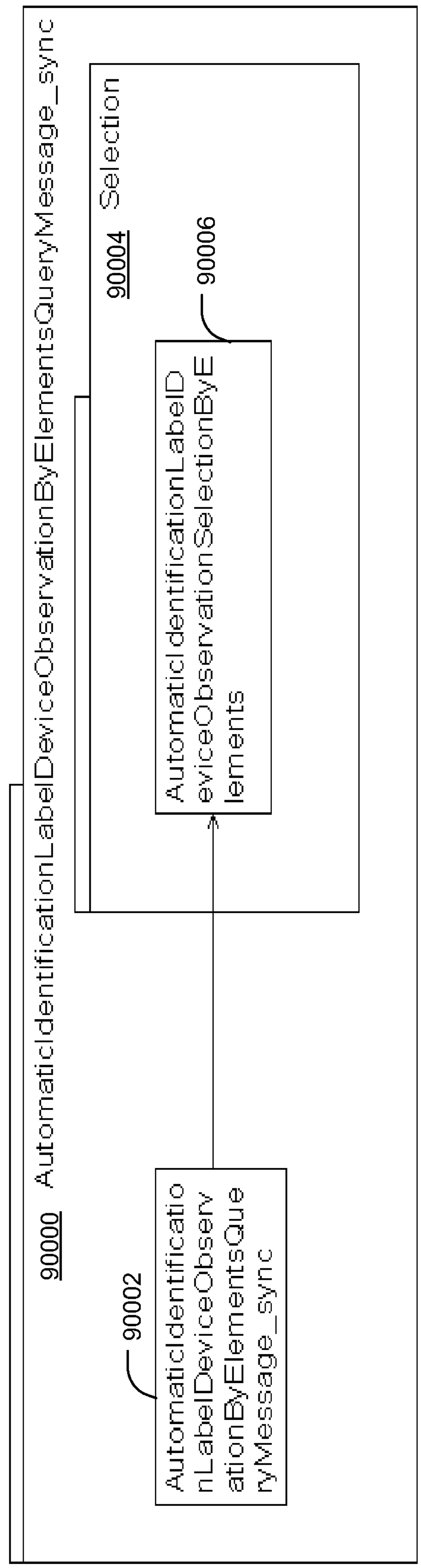
FIG. 90 shows an exemplary AutomaticIdentificationLabelDeviceObservationByElementsQueryMessage_sync Message Data Type.

Additionally, FIG. 90 illustrates one example logical configuration of AutomaticIdentificationLabelDeviceObservationByElementsQueryMessage_sync message 90000. Specifically, this figure depicts the arrangement and hierarchy of various components such as one or more levels of packages, entities, and datatypes, shown here as 90000 through 90006. As described above, packages may be used to represent hierarchy levels. Entities are discrete business elements that are used during a business transaction. Data types are used to type object entities and interfaces with a structure. For example, AutomaticIdentificationLabelDeviceObservationByElementsQueryMessage_sync message 90000 includes, among other things, AutomaticIdentificationLabelDeviceObservationSelectionByElements 90006. Accordingly, heterogeneous applications may communicate using this consistent message configured as such.

Figure 91:
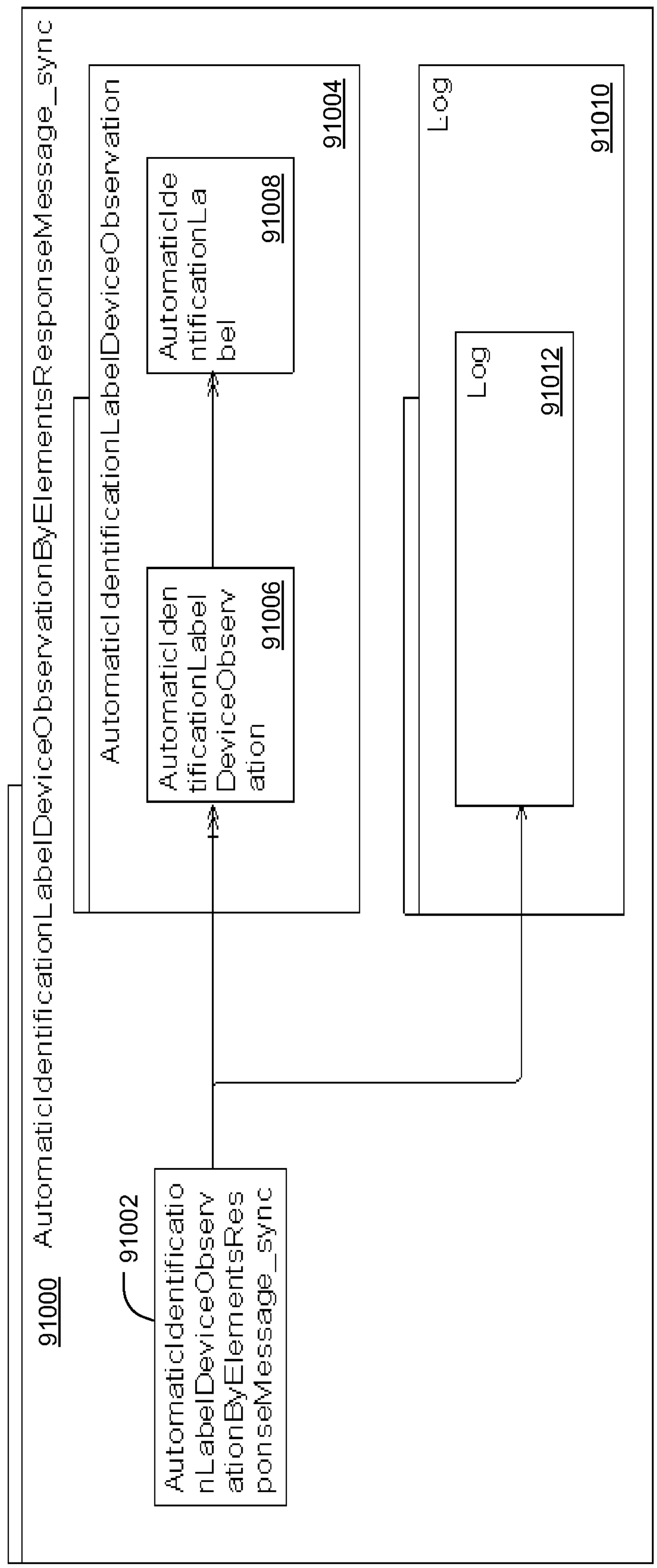
FIG. 91 shows an exemplary AutomaticIdentificationLabelDeviceObservationByElementsResponseMessage_sync Message Data Type.

Additionally, FIG. 91 illustrates one example logical configuration of AutomaticIdentificationLabelDeviceObservationByElementsResponseMessage_sync message 91000. Specifically, this figure depicts the arrangement and hierarchy of various components such as one or more levels of packages, entities, and datatypes, shown here as 91000 through 91012. As described above, packages may be used to represent hierarchy levels. Entities are discrete business elements that are used during a business transaction. Data types are used to type object entities and interfaces with a structure. For example, AutomaticIdentificationLabelDeviceObservationByElementsResponseMessage_sync message 91000 includes, among other things, AutomaticIdentificationLabelDeviceObservation 91004. Accordingly, heterogeneous applications may communicate using this consistent message configured as such.

FIG. 92 illustrates one example logical configuration of an AutomaticIdentificationLabelDeviceObservationByElementsQueryMessage_sync 92000 element structure. Specifically, this figure depicts the arrangement and hierarchy of various components such as one or more levels of packages, entities, and datatypes, shown here as 92000 through 92028. As described above, packages may be used to represent hierarchy levels. Entities are discrete business elements that are used during a business transaction. Data types are used to type object entities and interfaces with a structure. For example, the AutomaticIdentificationLabelDeviceObservationByElementsQueryMessage_sync 92000 includes, among other things, an AutomaticIdentificationLabelDeviceObservationByElementsQueryMessage_sync 92002. Accordingly, heterogeneous applications may communicate using this consistent message configured as such.

FIG. 93 illustrates one example logical configuration of an AutomaticIdentificationLabelDeviceObservationByElementsResponseMessage_sync 93000 element structure. Specifically, this figure depicts the arrangement and hierarchy of various components such as one or more levels of packages, entities, and datatypes, shown here as 93000 through 93034. As described above, packages may be used to represent hierarchy levels. Entities are discrete business elements that are used during a business transaction. Data types are used to type object entities and interfaces with a structure. For example, the AutomaticIdentificationLabelDeviceObservationByElementsResponseMessage_sync 93000 includes, among other things, an AutomaticIdentificationLabelDeviceObservationByElementsResponseMessage_sync 93002. Accordingly, heterogeneous applications may communicate using this consistent message configured as such.

FIGS. 94-1 through 94-2 illustrate one example logical configuration of an AutomaticIdentificationLabelDeviceObservationCreateConfirmationMessage_sync 94000 element structure. Specifically, these figures depict the arrangement and hierarchy of various components such as one or more levels of packages, entities, and datatypes, shown here as 94000 through 94046. As described above, packages may be used to represent hierarchy levels. Entities are discrete business elements that are used during a business transaction. Data types are used to type object entities and interfaces with a structure. For example, the AutomaticIdentificationLabelDeviceObservationCreateConfirmationMessage_sync 94000 includes, among other things, an AutomaticIdentificationLabelDeviceObservationCreateConfirmationMessage_sync 94002. Accordingly, heterogeneous applications may communicate using this consistent message configured as such.

FIGS. 95-1 through 95-2 illustrate one example logical configuration of an AutomaticIdentificationLabelDeviceObservationCreateRequestMessage_sync 95000 element structure. Specifically, these figures depict the arrangement and hierarchy of various components such as one or more levels of packages, entities, and datatypes, shown here as 95000 through 95038. As described above, packages may be used to represent hierarchy levels. Entities are discrete business elements that are used during a business transaction. Data types are used to type object entities and interfaces with a structure. For example, the AutomaticIdentificationLabelDeviceObservationCreateRequestMessage_sync 95000 includes, among other things, an AutomaticIdentificationLabelDeviceObservationCreateRequestMessage_sync 95002. Accordingly, heterogeneous applications may communicate using this consistent message configured as such.

Message Data Type AutomaticIdentificationLabelDeviceObservationCreateRequestMessage_sync The message data type AutomaticIdentificationLabelDeviceObservationCreateRequestMessage_sync includes the business information that is relevant for sending a business document in a message and the AutomaticIdentificationLabelDeviceObservation included in the business document. It includes the MessageHeader and AutomaticIdentificationLabelDeviceObservation packages. A MessageHeader package groups the business information that is relevant for sending a business document in a message. It includes the MessageHeader entity. A MessageHeader groups the following business information from the perspective of the sending application: information to identify the business document in a message, information about the sender, and information about the recipient. The MessageHeader includes the following entities: SenderParty and RecipientParty. MessageHeader is of type GDT: BasicBusinessDocumentMessageHeader. MessageHeader includes the following elements of the GDT: ID, ReferenceID, SenderParty, RecipientParty, and CreationDateTime. A SenderParty is the party responsible for sending the business document at a business application level. The SenderParty is of type GDT: BusinessDocumentMessageHeaderParty. A RecipientParty is the party responsible for receiving the business document at a business application level. The RecipientParty is of type GDT:BusinessDocumentMessageHeaderParty.

An AutomaticIdentificationLabelDeviceObservation package includes the data of an AutomaticIdentificationLabelDeviceObservation. It includes the entities: AutomaticIdentificationLabelDeviceObservation and AutomaticIdentificationLabel. An AutomaticIdentificationLabelDeviceObservation is a registered observation of automatically identifiable labels by a (logical) device. In some implementations, the AutomaticIdentificationLabelDeviceObservation entity can include the DeviceID element. The DeviceID is a unique identifier for an AutomaticIdentificationLabelDevice, and may be based on GDT: DeviceID. The entity AutomaticIdentificationLabel refers to a label that can be automatically identified. In some implementations, the AutomaticIdentificationLabel entity includes the ID element. The ID is the identifier of an AutomaticIdentificationLabel in 'Pure ID' (pure) format, and may be based on GDT: AutomaticIdentificationLabelID. In some implementations, the ID is given in 'Pure ID', which is specified in the code list of the GDT AutomaticIdentificationLabelEncodingFormatCode.

Message Data Type AutomaticIdentificationLabelDeviceObservationCreateConfirmationMessage_sync The message data type AutomaticIdentificationLabelDeviceObservationCreateConfirmationMessage_sync includes the business information that is relevant for sending a business document in a message, the AutomaticIdentificationLabelDeviceObservation included in the business document, and the information of the message log. It includes the MessageHeader, AutomaticIdentificationLabelDeviceObservation, and Log packages. A Log package groups the messages used for user interaction. It includes the Log entity. A log is a sequence of messages that result when an application executes a task. The entity Log is of type GDT:Log.

Message Data Type AutomaticIdentificationLabelDeviceObservationByElementsQueryMessage_sync The message data type AutomaticIdentificationLabelDeviceObservationByElementsQueryMessage_sync includes the Selection included in the business document. It includes the Selection package. The Selection package groups the AutomaticIdentificationLabelDeviceObservation selection criteria. Selection includes the AutomaticIdentificationLabelDeviceObservationSelectionByElements entity. AutomaticIdentificationLabelDeviceObservationSelectionByElements specifies elements to select one or more AutomaticIdentificationLabelDeviceObservations. In some implementations, the AutomaticIdentificationLabelDeviceObservationSelectionByElements entity can include the following elements: DeviceID, CreationDateTimePeriod, and LabelID. The AutomaticIdentificationLabelDeviceID is a unique identifier for an AutomaticIdentificationLabelDevice, and may be based on GDT: DeviceID. The CreationDateTimePeriod specifies the time period in which an AutomaticIdentificationLabelDeviceObservation is created, and may be based on GDT: UPPEROPEN_GLOBAL_DateTimePeriod. The LabelID is the identifier of an AutomaticIdentificationLabel in 'Pure ID' (pure) format, and may be based on GDT: AutomaticIdentificationLabelID. In some implementations, the LabelID is given in 'Pure ID' format, which is specified in the code list of the GDT AutomaticIdentificationLabelEncodingFormatCode.

Message Data Type AutomaticIdentificationLabelDeviceObservationByElementsResponseMessage_sync The message data type AutomaticIdentificationLabelDeviceObservationByElementsResponseMessage_sync includes the AutomaticIdentificationLabelDeviceObservation (s) included in the business document and the information of the message log. It includes the AutomaticIdentificationLabelDeviceObservation and Log packages.

Message Data Type AutomaticIdentificationLabelDeviceByElementsResponseMessage_sync The message data type AutomaticIdentificationLabelDeviceByElementsResponseMessage_sync includes the AutomaticIdentificationLabelDevice(s) included in the business document and the information of the message log. It includes the AutomaticIdentificationLabelDevice and Log packages.

A number of implementations have been described. Nevertheless, it will be understood that various modifications may be made without departing from the spirit and scope of the disclosure. For example, processing can mean creating, updating, deleting, or some other massaging of information. Accordingly, other implementations are within the scope of the following claims.

What is claimed is:

1. A non-transitory, computer-readable storage medium including program code for providing a message-based interface for performing an automatic identification label service, the storage medium comprising:

program code for receiving via a message-based interface derived from a common business object model, where the common business object model includes business objects having relationships that enable derivation of message-based interfaces and message packages, the message-based interfaces exposing at least one service as defined in a service registry and from a heterogeneous application executing in an environment of computer systems providing message-based services, a first message for requesting creation of an automatic identification label to automatic identification label processing, the automatic identification label for attachment to items in a supply chain movement of goods registered via barcode or Radio Frequency Identification (RFID) technology, the first message including a first message package derived from the common business object model and hierarchically organized as:

an automatic identification label create request message entity; and an automatic identification label package comprising an automatic identification label entity, where the automatic identification label entity includes an identifier, a hexadecimal automatic identification label identifier, a reference object identifier, and a reference object type;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

2. A non-transitory, computer-readable storage medium including program code for providing a message-based interface for performing an automatic identification label device service, the storage medium comprising: program code for receiving via a message-based interface derived from a common business object model, where the common business object model includes business objects having relationships that enable derivation of message-based interfaces and message packages, the message-based interfaces exposing at least one service as defined in a service registry and from a heterogeneous application executing in an environment of computer systems providing message-based services, a first message for requesting creation of an automatic identification label device, the automatic identification label device comprising a device used to read and print automatically identifiable labels registered via barcode or Radio Frequency Identification (RFID) technology, the first message including a first message package derived from the common business object model and hierarchically organized as:

an automatic identification label device create request message entity; and an automatic identification label device package comprising an automatic identification label device entity, where the automatic identification label device entity includes an identifier and a location identifier; and program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

3. A non-transitory, computer-readable storage medium including program code for providing a message-based interface for performing an automatic identification label device observation service, the storage medium comprising:

program code for receiving via a message-based interface derived from a common business object model, where the common business object model includes business objects having relationships that enable derivation of message-based interfaces and message packages, the message-based interfaces exposing at least one service as defined in a service registry and from a heterogeneous application executing in an environment of computer systems providing message-based services, a first message for requesting creation of an automatic identification label device observation model, the automatic identification label device observation model comprising a model of a registered observation of a device used to read and print one or more automatically identifiable labels registered via barcode or Radio Frequency Identification (RFID) technology, the first message including a first message package derived from the common business object model and hierarchically organized as:

an automatic identification label device observation create request message entity; and an automatic identification label device observation package comprising an automatic identification label device observation entity, where the automatic identification label device observation entity includes a device identifier and at least one automatic identification label, where each automatic identification label includes an identifier; and program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

* * * * *